United States Patent [19]

Chatfield

[11] 4,183,083
[45] Jan. 8, 1980

[54] METHOD OF OPERATING A MULTIPROGRAMMED COMPUTING SYSTEM

[75] Inventor: Glen F. Chatfield, Bethel Park, Pa.

[73] Assignee: Duquesne Systems, Inc., Pittsburgh, Pa.

[21] Appl. No.: 243,951

[22] Filed: Apr. 14, 1972

[51] Int. Cl.² .............................................. G06F 9/18
[52] U.S. Cl. .................................... 364/200; 364/300
[58] Field of Search .................... 340/172.5; 444/1; 364/200 MS File, 900 MS File, 300

[56] References Cited

U.S. PATENT DOCUMENTS

| | | | |
|---|---|---|---|
| 3,363,236 | 1/1968 | Robertson | 340/172.5 |
| 3,504,347 | 3/1970 | Harmon et al. | 340/172.5 |
| 3,528,062 | 9/1970 | Lehman et al. | 340/172.5 |
| 3,588,837 | 6/1971 | Rash et al. | 364/200 |
| 3,593,299 | 7/1971 | Driscoll et al. | 340/172.5 |
| 3,648,253 | 3/1972 | Mullery et al. | 340/172.5 |
| 3,766,524 | 10/1973 | Maring et al. | 364/200 |

*Primary Examiner*—Mark E. Nusbaum
*Attorney, Agent, or Firm*—Webb, Burden, Robinson & Webb

[57] ABSTRACT

A unique method of operating a multiprogrammed computing system by dynamically regulating central processing unit (CPU) and/or peripheral resource access such that the parallel processing capability, i.e., thruput of the computing system, is increased and/or such that all programs efficiently share the computing system. The embodiment selected is dependent upon the complexity of the computing system and the amount of computing capability available for regulation. In one embodiment CPU and peripheral access is regulated in an unlike manner. In another embodiment the solution of a dynamic linear programming model, that describes the current resource requirements of two or more of the programs operating in the system, is used to regulate resource access. In yet another embodiment, the system is shared while minimizing the degradation of degradable resources. A more elaborate embodiment of this invention has the capability of alternating between two or more different regulating algorithms providing the computing system with an almost unlimited number of different operational modes. In addition, the mode itself can vary with time to allow the computing system to meet the requirements of a changing workload.

14 Claims, 24 Drawing Figures

OPERATING SYSTEM INTERFACE AND REGULATING PROGRAM OF EMBODIMENT I

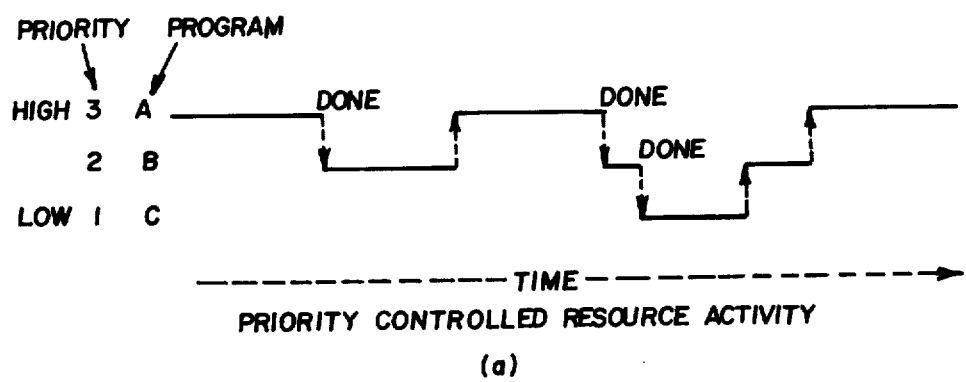
PRIORITY CONTROLLED RESOURCE ACTIVITY
(a)
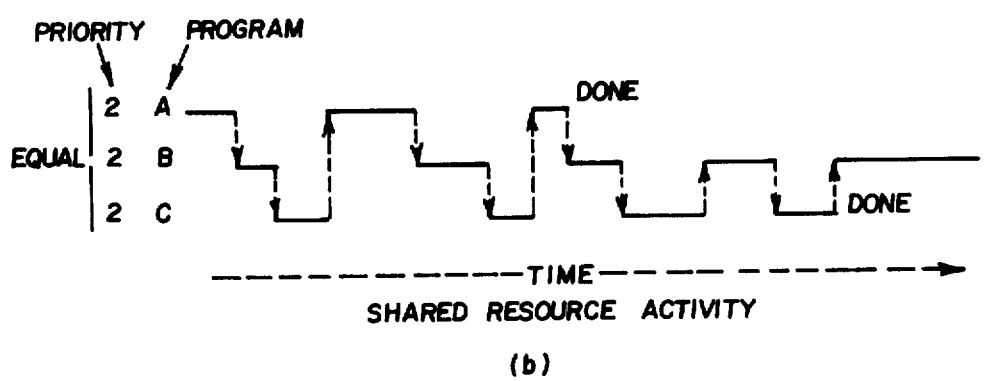
SHARED RESOURCE ACTIVITY
(b)
Fig. 3

ACCUMULATED PROGRAM RESOURCE TIMES

DATA GATHERING SUB PROGRAM (DISPATCHER)

DATA GATHERING SUB PROGRAM (START I/O)

DATA GATHERING SUB PROGRAM (ASYNCHRONOUS I/O INTERRUPT)

OPERATING SYSTEM INTERFACE
AND
REGULATING PROGRAM OF EMBODIMENT I

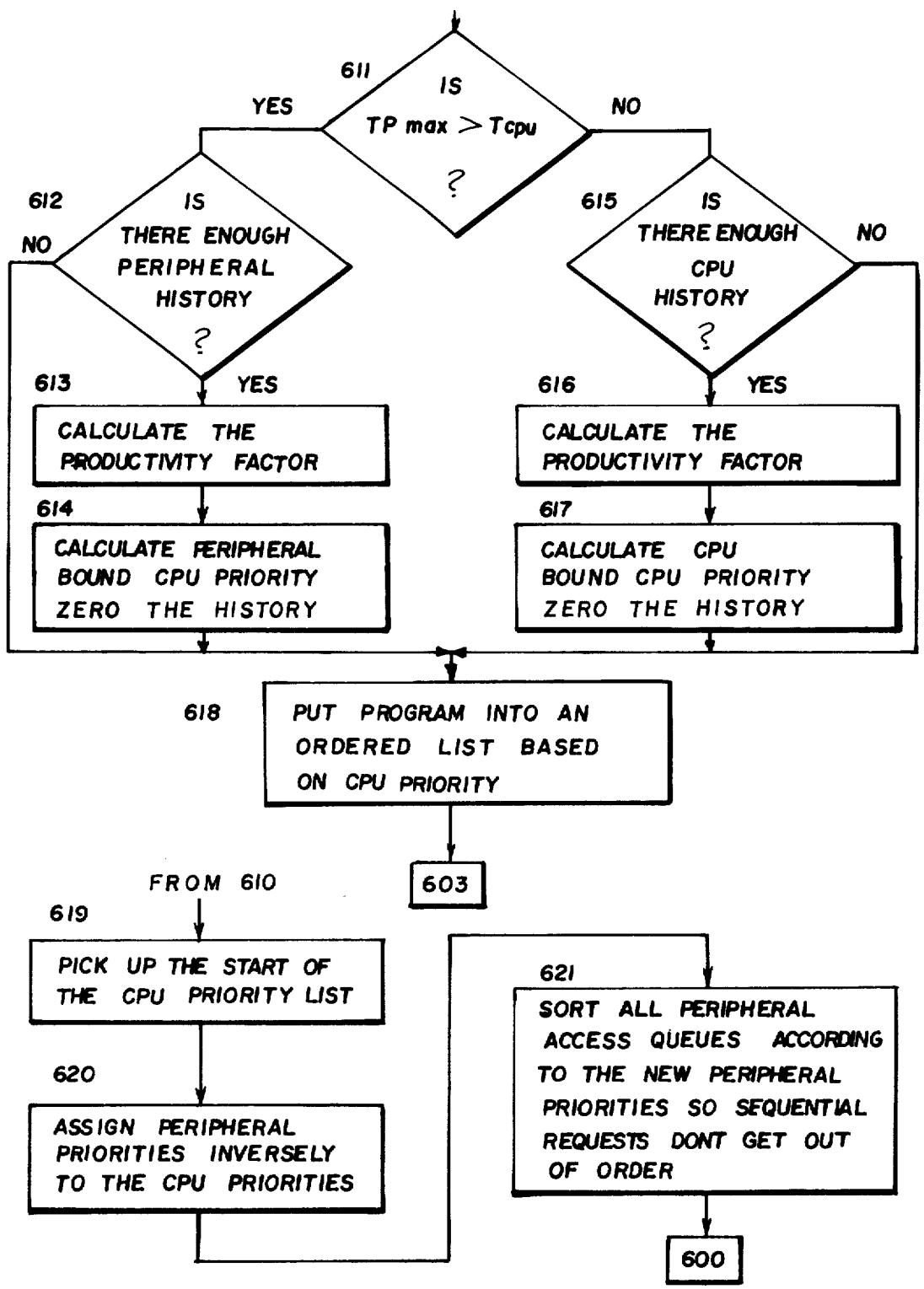

PROGRAM A

| | TIME | PRIORITY |
|---|---|---|
| CPU | 13 | 0 |
| 1 d | | 6 |
| 2 d | | 6 |
| 3 d | | 6 |
| 4 | | 6 |
| 5 | | 6 |
| 6 | | 6 |
| TOTAL | 13 | |
| DEGRADATION | | |
| P. F. | 1 | |

PROGRAM B

| | TIME | PRIORITY |
|---|---|---|
| CPU | 10 | 2.6 |
| 1 d | 10 | 5 |
| 2 d | 9 | 5 |
| 3 d | | 5 |
| 4 | 6 | 5 |
| 5 | | 5 |
| 6 | 1 | 5 |
| TOTAL | 36 | |
| DEGRADATION | | |
| P. F. | 3.6 | |

PROGRAM C

| | TIME | PRIORITY |
|---|---|---|
| CPU | 1 | 6.835 |
| 1 d | 15 | 1 |
| 2 d | 1 | 1 |
| 3 d | 1 | 1 |
| 4 | | 1 |
| 5 | | 1 |
| 6 | | 1 |
| TOTAL | 18 | |
| DEGRADATION | 30 | |
| P. F. | 1.21 | |

PROGRAM D

| | TIME | PRIORITY |
|---|---|---|
| CPU | 1 | 6.5 |
| 1 d | 11 | 3 |
| 2 d | | 3 |
| 3 d | | 3 |
| 4 | 10 | 3 |
| 5 | | 3 |
| 6 | | 3 |
| TOTAL | 22 | |
| DEGRADATION | 10 | |
| P. F. | 2 | |

PROGRAM E

| | TIME | PRIORITY |
|---|---|---|
| CPU | 3 | 6.435 |
| 1 d | | 4 |
| 2 d | 10 | 4 |
| 3 d | | 4 |
| 4 | | 4 |
| 5 | 10 | 4 |
| 6 | | 4 |
| TOTAL | 23 | |
| DEGRADATION | 11 | |
| P. F. | 2.3 | |

PROGRAM F

| | TIME | PRIORITY |
|---|---|---|
| CPU | 2 | 6.8 |
| 1 d | | 2 |
| 2 d | | 2 |
| 3 d | 2 | 2 |
| 4 | | 2 |
| 5 | | 2 |
| 6 | 16 | 2 |
| TOTAL | 20 | |
| DEGRADATION | | |
| P. F. | 1.24 | |

PRIORITY ASSIGNMENT BY EMBODIMENT I

Fig. 7

REGULATING PROGRAM OF EMBODIMENT II

| | PROGRAM A | | PROGRAM B | | PROGRAM C | |
|---|---|---|---|---|---|---|
| | TIME | PRIORITY | TIME | PRIORITY | TIME | PRIORITY |
| CPU | 13 | 1 | 10 | 3.6 | 1 | 18 |
| 1d | | 95 | 10 | 3.6 | 15 | 1.2 |
| 2d | | 95 | 9 | 4 | 1 | 18 |
| 3d | | 95 | | 100 | 1 | 18 |
| 4 | | 95 | 6 | 6 | | 97 |
| 5 | | 95 | | 100 | | 97 |
| 6 | | 95 | 1 | 36 | | 97 |
| TOTAL | 13 | | 36 | | 18 | |
| DEGRADATION | | | | | 30 | |
| P.F. | 1 | | 3.6 | | 1.21 | |

| | PROGRAM D | | PROGRAM E | | PROGRAM F | |
|---|---|---|---|---|---|---|
| | TIME | PRIORITY | TIME | PRIORITY | TIME | PRIORITY |
| CPU | 1 | 22 | 3 | 7.67 | 2 | 10 |
| 1d | 11 | 2 | | 99 | | 96 |
| 2d | | 98 | 10 | 2.3 | | 96 |
| 3d | | 98 | | 99 | 2 | 10 |
| 4 | 10 | 2.2 | | 99 | | 96 |
| 5 | | 98 | 10 | 2.3 | | 96 |
| 6 | | 98 | | 99 | 16 | 1.25 |
| TOTAL | 22 | | 23 | | 20 | |
| DEGRADATION | 10 | | 11 | | | |
| P.F. | 2 | | 2.3 | | 1.24 | |

PRIORITY ASSIGNMENT BY EMBODIMENT II

Fig. 9

| | PROGRAM A | | | PROGRAM B | | | PROGRAM C | | |
|---|---|---|---|---|---|---|---|---|---|
| | TIME | % of max | Qm1 | TIME | % of max | Qm2 | TIME | % of max | Qm3 |
| CPU | 13 | 100 | 1 | 10 | 100 | 1 | 1 | 7 | 0 |
| 1d | | | 0 | 10 | 100 | 1 | 15 | 100 | 1 |
| 2d | | | 0 | 9 | 90 | 1 | 1 | 7 | 1 |
| 3d | | | 0 | | | 0 | 1 | 7 | 0 |
| 4 | | | 0 | 6 | 60 | 1 | | | 0 |
| 5 | | | 0 | | | 0 | | | 0 |
| 6 | | | 0 | 1 | 10 | 0 | | | 0 |
| DEGRADATION | | | | | | | 30 | | |
| P. F. | 1 | | | 3.6 | | | 1.21 | | |

| | PROGRAM D | | | PROGRAM E | | | PROGRAM F | | |
|---|---|---|---|---|---|---|---|---|---|
| | TIME | % of max | Qm4 | TIME | % of max | Qm5 | TIME | % of max | Qm6 |
| CPU | 1 | 9 | 0 | 3 | 30 | 0 | 2 | 12 | 0 |
| 1d | 11 | 100 | 1 | | | 0 | | | 0 |
| 2d | | | 0 | 10 | 100 | 1 | | | 0 |
| 3d | | | 0 | | | 0 | 2 | 12 | 0 |
| 4 | 10 | 91 | 1 | | | 0 | | | 0 |
| 5 | | | 0 | 10 | 100 | 1 | | | 0 |
| 6 | | | 0 | | | 0 | 16 | 100 | 1 |
| DEGRADATION | 10 | | | 11 | | | | | |
| P. F. | 2 | | | 23 | | | 1.24 | | |

PRIORITY ASSIGNMENT BY EMBODIMENT III

Fig. 11

| PROGRAM A | | |
|---|---|---|
| | TIME | PRIORITY |
| CPU | 13 | 500 |
| 1d | | 500 |
| 2d | | 500 |
| 3d | | 500 |
| 4 | | 500 |
| 5 | | 500 |
| 6 | | 500 |
| TOTAL | 13 | |

| PROGRAM B | | |
|---|---|---|
| | TIME | PRIORITY |
| CPU | 10 | 0 |
| 1d | 10 | 0 |
| 2d | 9 | 0 |
| 3d | | 0 |
| 4 | 6 | 0 |
| 5 | | 0 |
| 6 | 1 | 0 |
| TOTAL | 36 | |

| PROGRAM C | | |
|---|---|---|
| | TIME | PRIORITY |
| CPU | 1 | 0 |
| 1d | 15 | 0 |
| 2d | 1 | 0 |
| 3d | 1 | 0 |
| 4 | | 0 |
| 5 | | 0 |
| 6 | | 0 |
| TOTAL | 18 | |

| PROGRAM D | | |
|---|---|---|
| | TIME | PRIORITY |
| CPU | 1 | 500 |
| 1d | 11 | 500 |
| 2d | | 500 |
| 3d | | 500 |
| 4 | 10 | 500 |
| 5 | | 500 |
| 6 | | 500 |
| TOTAL | 22 | |

| PROGRAM E | | |
|---|---|---|
| | TIME | PRIORITY |
| CPU | 3 | 500 |
| 1d | | 500 |
| 2d | 10 | 500 |
| 3d | | 500 |
| 4 | | 500 |
| 5 | 10 | 500 |
| 6 | | 500 |
| TOTAL | 23 | |

| PROGRAM F | | |
|---|---|---|
| | TIME | PRIORITY |
| CPU | 2 | 500 |
| 1d | | 500 |
| 2d | | 500 |
| 3d | 2 | 500 |
| 4 | | 500 |
| 5 | | 500 |
| 6 | 16 | 500 |
| TOTAL | 20 | |

PRIORITY ASSIGNMENT BY EMBODIMENT III

Fig. 12

| | PROGRAM A+500 | | PROGRAM B | | PROGRAM C | |
|---|---|---|---|---|---|---|
| | TIME | PRIORITY | TIME | PRIORITY | TIME | PRIORITY |
| CPU | 13 | 501 | 10 | 3.6 | 1 | 18 |
| 1 d | | 595 | 10 | 3.6 | 15 | 1.2 |
| 2 d | | 595 | 9 | 4 | 1 | 18 |
| 3 d | | 595 | | 100 | 1 | 18 |
| 4 | | 595 | 6 | 6 | | 96 |
| 5 | | 595 | | 100 | | 96 |
| 6 | | 595 | 1 | 36 | | 96 |
| TOTAL | 13 | | 36 | | 18 | |

| | PROGRAM D+500 | | PROGRAM E+500 | | PROGRAM F+500 | |
|---|---|---|---|---|---|---|
| | TIME | PRIORITY | TIME | PRIORITY | TIME | PRIORITY |
| CPU | 1 | 522 | 3 | 507.67 | 2 | 510 |
| 1 d | 11 | 502 | | 599 | | 597 |
| 2 d | | 598 | 10 | 502.3 | | 597 |
| 3 d | | 598 | | 599 | 2 | 510 |
| 4 | 10 | 502.2 | | 599 | | 597 |
| 5 | | 598 | 10 | 502.3 | | 597 |
| 6 | | 598 | | 599 | 16 | 501.25 |
| TOTAL | 22 | | 23 | | 20 | |

PRIORITY ASSIGNMENT BY EMBODIMENT III

Fig. 13

REGULATING PROGRAM OF EMBODIMENT IV

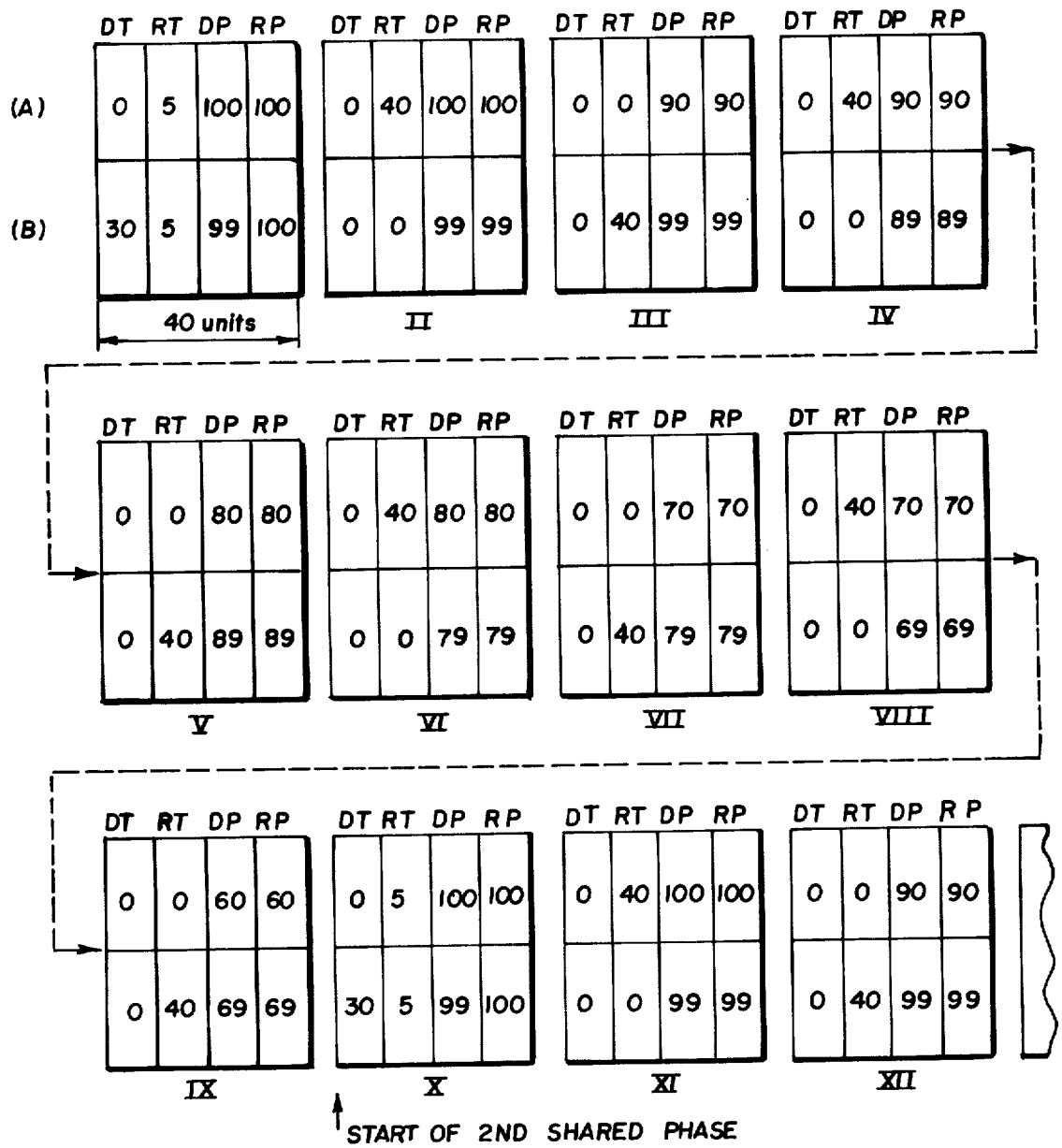
Fig. 15 — PRIORITY ASSIGNMENT BY EMBODIMENT IV (A) = PROGRAM A   DT = DEGRADATION TIME
                  RT = RESOURCE TIME
(B) = PROGRAM B   DP = DEGRADATION PRIORITY
                  RP = RESOURCE PRIORITY

|     | DT | RT | DP | RP |
|-----|----|----|----|----|
| (A) | 0  | 5  | 100| 100|
| (B) | 30 | 5  | 99 | 100|

← 40 units →
I

|     | DT | RT | DP | RP |
|-----|----|----|----|----|
| (A) | 0  | 5  | 100| 100|
| (B) | 30 | 5  | 99 | 99 |

II

|     | DT | RT | DP | RP |
|-----|----|----|----|----|
| (A) | 0  | 40 | 100| 100|
| (B) | 0  | 0  | 99 | 99 |

NOT EXECUTABLE
III

|     | DT | RT | DP | RP |
|-----|----|----|----|----|
| (A) | 30 | 5  | 90 | 90 |
| (B) | 0  | 5  | 99 | 99 |

IV

|     | DT | RT | DP | RP |
|-----|----|----|----|----|
|     | 0  | 0  | 90 | 90 |
|     | 0  | 40 | 99 | 99 |

NOT EXECUTABLE
V

|     | DT | RT | DP | RP |
|-----|----|----|----|----|
|     | 0  | 5  | 90 | 90 |
|     | 30 | 5  | 89 | 89 |

VI

|     | DT | RT | DP | RP |
|-----|----|----|----|----|
|     | 0  | 40 | 90 | 90 |
|     | 0  | 0  | 89 | 89 |

NOT EXECUTABLE
VII

|     | DT | RT | DP | RP |
|-----|----|----|----|----|
|     | 30 | 5  | 80 | 80 |
|     | 0  | 5  | 89 | 89 |

VIII

|     | DT | RT | DP | RP |
|-----|----|----|----|----|
|     | 0  | 0  | 80 | 80 |
|     | 0  | 40 | 89 | 89 |

NOT EXECUTABLE
IX

|     | DT | RT | DP | RP |
|-----|----|----|----|----|
|     | 0  | 5  | 100| 100|
|     | 30 | 5  | 99 | 100|

X
↑ START OF 2ND SHARED PHASE

|     | DT | RT | DP | RP |
|-----|----|----|----|----|
|     | 0  | 5  | 100| 100|
|     | 30 | 5  | 99 | 99 |

XI

|     | DT | RT | DP | RP |
|-----|----|----|----|----|
|     | 0  | 40 | 100| 100|
|     | 0  | 0  | 99 | 99 |

NOT EXECUTABLE
XII

PRIORITY ASSIGNMENT BY EMBODIMENT IV

Fig. 16

REGULATING PROGRAM OF EMBODIMENT V

EQUAL BIASED

THRUPUT BIASED

TURNAROUND BIASED

TIME TABLE

00:00  2 shared process intervals, 6 thruput process intervals
08:00  5 shared process intervals, 2 thruput process intervals
18:00  2 shared process intervals, 6 thruput process intervals

TIME TABLE EMBODIMENT

METHOD OF OPERATING A MULTIPROGRAMMED COMPUTING SYSTEM

BACKGROUND AND DISCUSSION OF PRIOR ART

This invention relates to new and useful improvements in the methods of operating general purpose digital computing systems on one or more programs at the same time (multiprogramming). More specifically, the present invention relates to dynamically adjusting both the productivity and the sharing characteristics of the computing system.

Over the last several years, multiprogramming has been widely accepted by the data processing industry. Prior to multiprogramming, computing systems processed programs on a one-at-a-time basis. If a program did not require all of the resources of the computing system, the unused resources were forced to remain idle for the duration of that particular program. An objective of multiprogramming was to significantly increase resource utilization by processing more than one program concurrently, hence, increasing thruput (productivity). This goal of multiprogramming has seldom been realized primarily because the programs that are attempting to process in parallel often require the same resources. At best, the result is a larger, more expensive computing system run in a shared serial manner. Frequently, and worse, the resources the programs are trying to share operate in a less efficient manner when shared. Thus, the effective utilization actually degrades to a level lower than that of one-at-a-time serial processing.

Resource scheduling for the multiprogrammed computing system is very different from the non-multiprogrammed system where the number or resources is always greater than or equal to the individual program's requirements. In the multiprogrammed system, the situation normally exists where there is an insufficient number of separate physical resources to satisfy the needs of all of the programs being multiprogrammed. This being the case, it becomes necessary to regulate the resource access of the various programs within the system.

There are three basic prior art techniques for regulating resource access. The first is fixed system priority; the second is manual priority; and the third is internal program controlled priority.

Fixed system priority is normally associated with some physical characteristic of the computing system. Different priority levels may be built into the CPU itself. Process control computers are frequently made this way. Certain multiprogramming operating systems are designed such that physical memory location determines priority within the system. Thus, the programs that reside in the highest storage addresses may have the highest resource priority within the system. In either case, once a program begins execution within the computing system, its resource priority is fixed.

Manual priority simply removes the hardware considerations from assigning program resource priority. Any program can be assigned a priority which is independent of the portion of the computing system in which it operates. As with fixed system priority, once the resource priority assignment is made, it is fixed for the duration of the program's execution.

With internal program controlled priority, any program which is specifically written to take advantage of this characteristic has the ability to change its own priority as it executes.

Recently, the problems of the above-described priority assignment techniques have led to consideration of changing access priorities from time to time to improve thruput. However, in these instances, only the CPU's activity was considered.

Fixed priority and manual priority systems cannot optimize thruput except in special instances. During a time interval when two parallel processing programs require the use of a given resource, the program with the higher priority may so dominate the use of that resource that the lower priority program is locked out. Further, the lower priority program may be locked out even though it only needs a relatively small amount of time on the resource under consideration. Finally, the lower priority program will not be able to use other resources for which it has a relatively large demand because of its need for some time on a dominated resource. Hence, the computing system works on a more or less one-at-a-time basis.

Internal program controlled priority has several drawbacks. The programs themselves must have been specifically written to take advantage of the priority assignment capability in the system. Programs that run CPU-bound on one machine may run very peripheral-bound on another machine. (When a program can saturate, that is, use 100% of a particular resource, it is said to be bound by that resource.) So, for internal program controlled priority to work effectively, it must take into consideration the particular computing system in which it is running. A human failing comes into play also. When the programmer himself has the ability to select his programs' resource priorities, more often than not he will select the very highest priority in the system.

When two or more programs time share a resource with equal resource priority or when two or more programs with different resource priority share a resource because of the inability of the program with highest resource priority to saturate the resource, the resulting alternate use of that peripheral resource may cause the total effective system utilization to be significantly lower than executing one program at a time. This system degradation occurs frequently today in computing systems that utilize disk storage facilities. When the disk is dedicated to one of the programs, it can perform many data transfers without seeking to a new location on the disk. However, when it is shared between two programs, the data transfers are frequently separated by delaying or degrading seeks. The function of mechanically moving the read/write heads to the new disk location is called seeking.

The shortcomings of prior art are tabulated briefly below:

1. There is no analysis of the peripheral resources.
2. There is no priority control of degradable resources.
3. There is no method of regulating a program's access to different resources in the system in an unlike manner.
4. There is no method of taking into consideration program resource contention and selecting a subset of the processing programs that will increase total system resource utilization.
5. There is no method of varying the regulating characteristics with time.

SUMMARY OF THE INVENTION

Briefly, according to this invention, a computing system processes one or more programs concurrently. The computing system comprises one or more central processing unit resources having associated logic and main memory functions and an interrupt capability, and at least one peripheral resource capable of functioning in parallel with the central processing units. The operating system according to this invention contains data gathering subprograms which accumulate system utilization data for one or more processing programs during a processing interval. Based on the accumulated system utilization data, at spaced intervals the regulating program analyzes and regulates resource access to one or more resources for one or more processing programs to provide increased or maximized thruput. Thereafter, the regulating program directs the operating system to continue executing the processing programs according to the regulated resource access. The data gathering and regulating steps are continually repeated at spaced intervals to provide a dynamically regulated resource access method. According to a preferred embodiment of this invention, the resource access is regulated on an inverse need basis and/or to limit degradation resulting from the inefficient competing between programs for degradable resources. According to yet another preferred embodiment of this invention, on the basis of program resource contention a particular combination of processing programs which provides the most productive use of the computing system is selected for execution.

It is the general object of this invention to provide an improved automated method of multiprogramming a computer system.

It is another object of this invention to improve the total resource utilization or thruput of a computing system.

It is another object of this invention to provide an improved method of sharing the computing system's resources between programs.

It is another object of this invention to provide a mode of operation which consists of alternating between the objective of maximized resource utilization and the objective of sharing the computing system.

It is another object of this invention to enable the computing system to change its mode of operation with time.

DRAWINGS

FIG. 3 illustrates the meaning of priority controlled resource activity and shared resource activity;

Figure 6A:
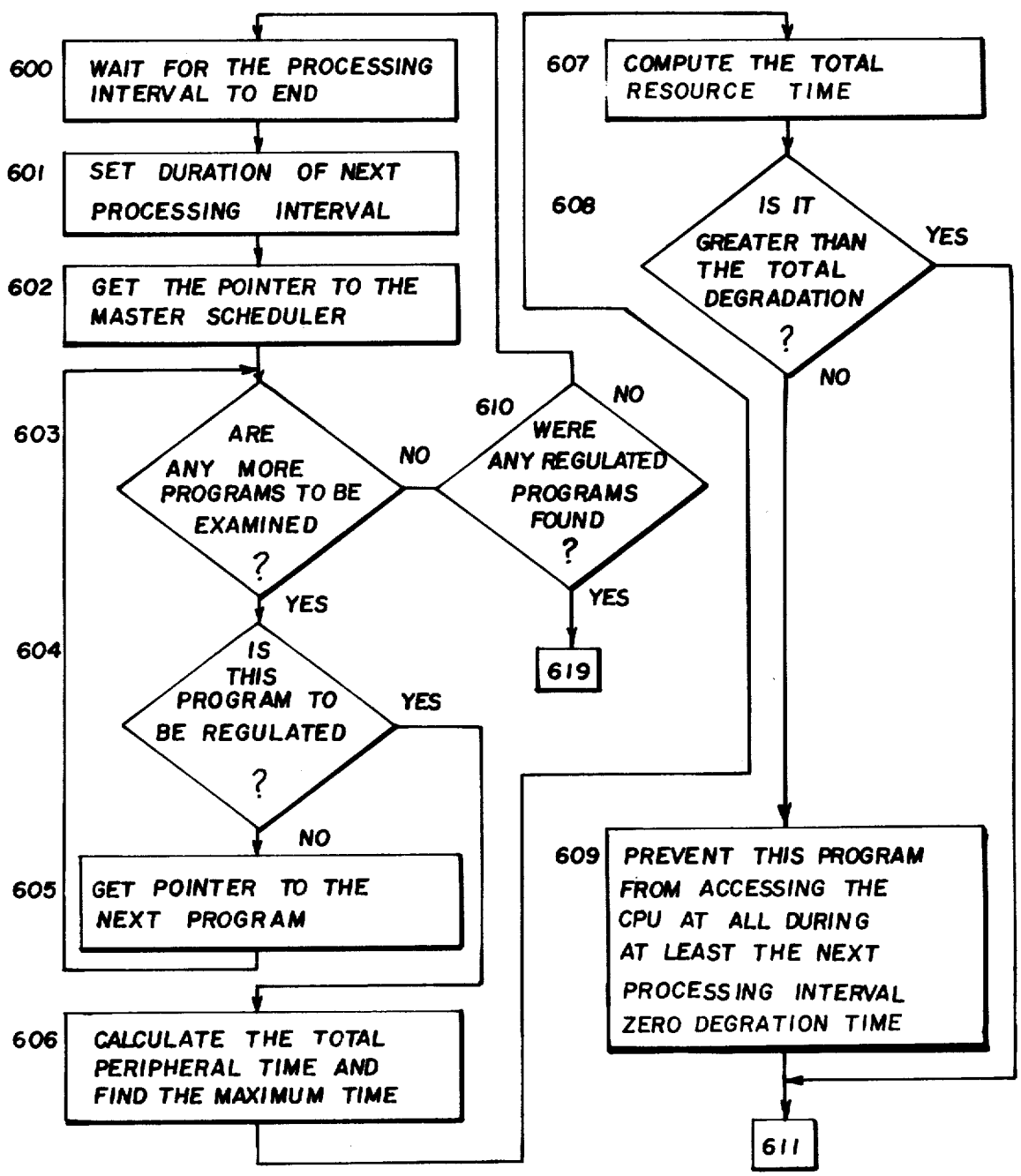
Figure 8:
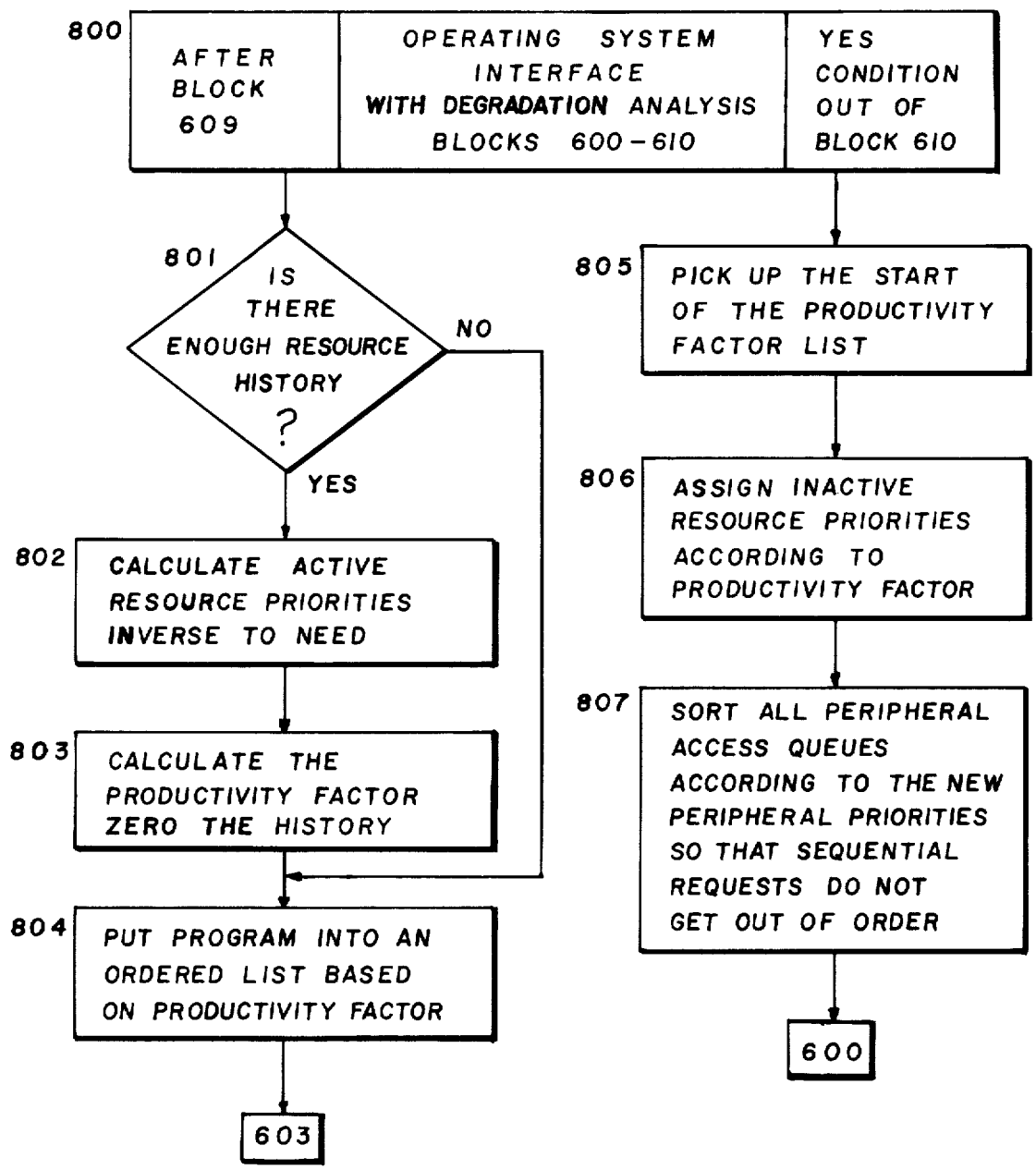
Figure 10:
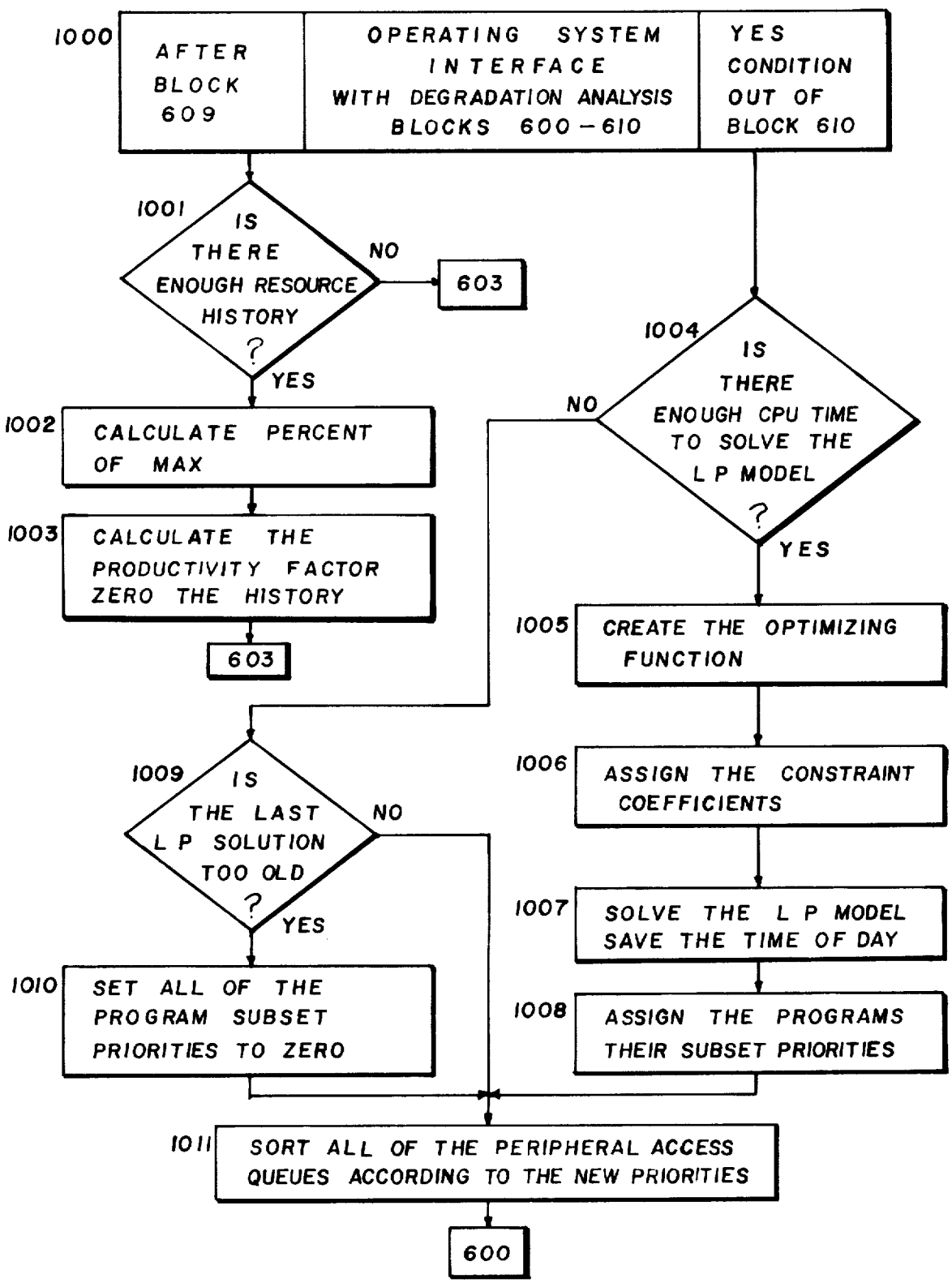
Figure 14:
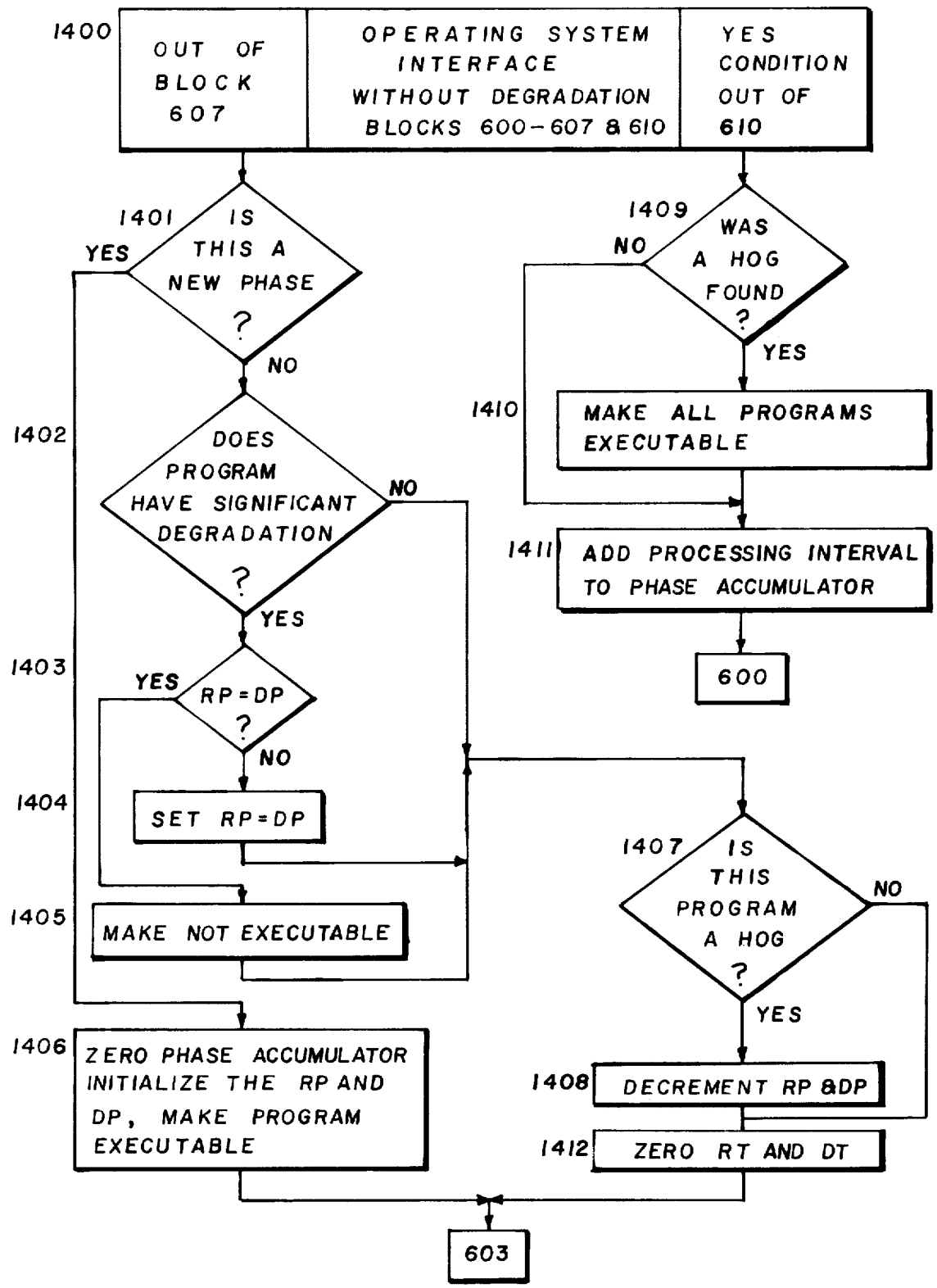
Figure 17:
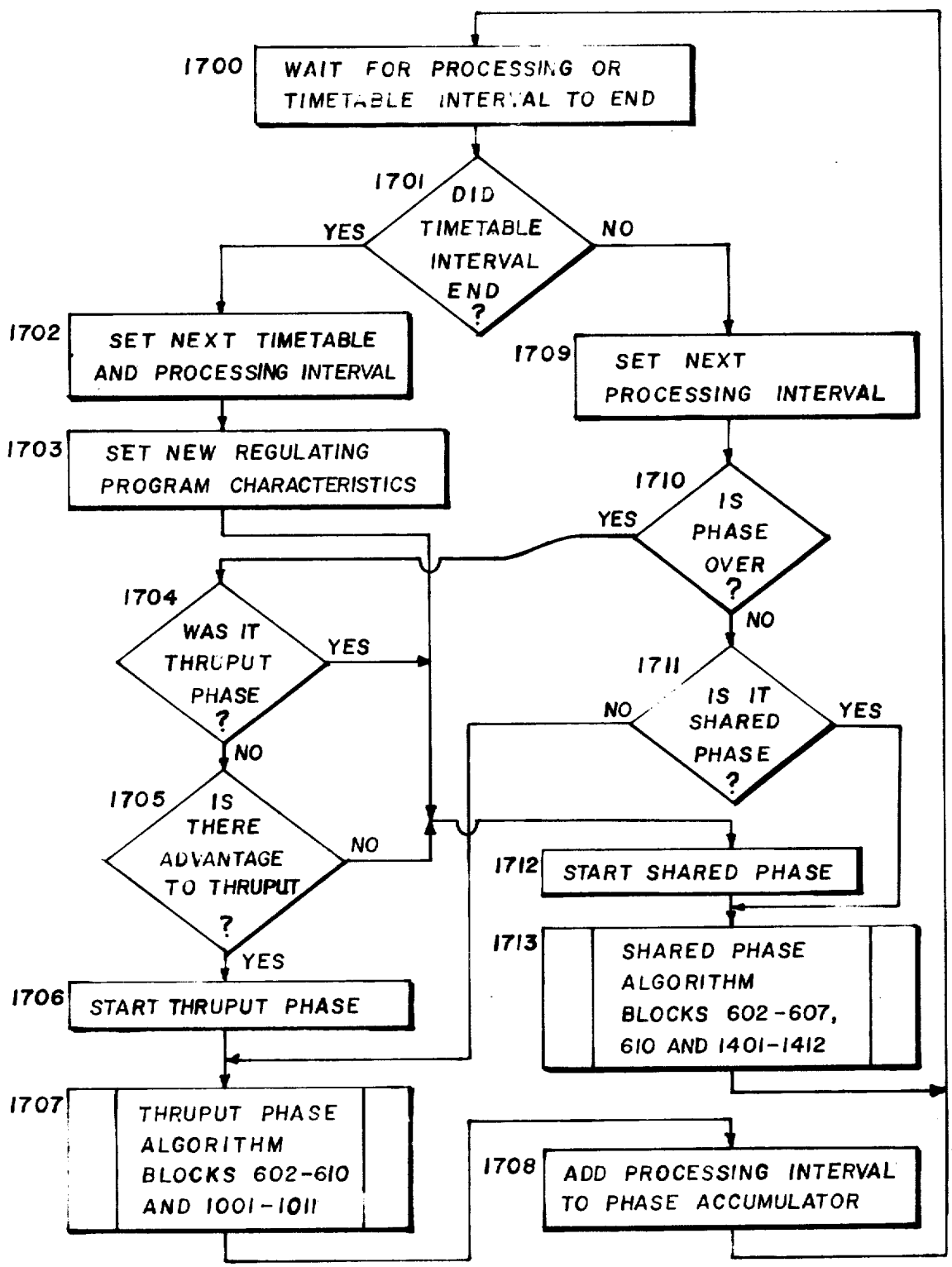

FIGS. 5 a,b,c are flow diagrams illustrating the data gathering subprogram;

FIGS. 6 a,b are flow diagrams illustrating the regulating program of Embodiment I;

FIG. 7 illustrates the way priorities are assigned according to Embodiment I;

FIG. 8 is a flow diagram illustrating the regulating program of Embodiment II;

FIG. 9 illustrates the way in which priorities are assigned in accordance with Embodiment II;

FIG. 10 is a flow diagram illustrating the regulating program of Embodiment III;

FIGS. 11, 12 and 13 illustrate the way priorities are assigned according to Embodiment III;

FIG. 14 is a flow diagram illustrating the regulating program of Embodiment IV;

FIGS. 15 and 16 illustrate the way priorities are assigned according to Embodiment IV;

FIG. 17 is a flow diagram illustrating the regulating program according to Embodiment V; and, FIGS. 18, 19, 20 and 21 illustrate modes and a timetable according to Embodiment V.

DETAILED DESCRIPTION - GENERAL

This invention relates to the multiprogramming operating systems of general purpose digital computers, i.e., those having the capability of processing more than one program in parallel. More precisely, this invention relates to certain resource supervising portions of the operating system. Other portions of the operating system which are not particularly related to this invention are, for example, the contents supervisor, the overlay supervisor and the timer supervisor.

Figure 1:
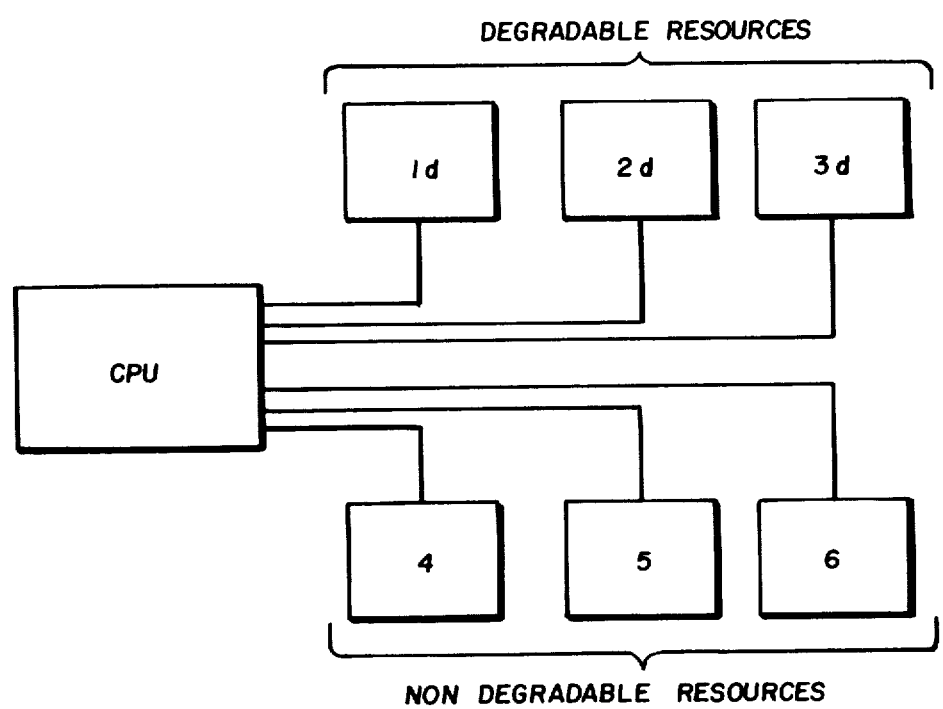
FIG. 1 illustrates the overall functional relation of the central processing unit to the degradable and nondegradable peripheral resources in a computing system according to this invention.

FIG. 1 illustrates the overall functional relationship of the central processing unit (CPU) to the peripheral resources in a computing system. The general purpose digital computing systems to which this invention is applicable may comprise one or more central processing units with their associated memory units and one or more peripheral units (generally input/output or I/O devices) that may or may not be shared between the central processing units. The distinction between the central processing units and the peripheral units is that the peripheral units are in some way subordinate to the central processing units. Card readers, printers, tape drives, disk drives, channels, controllers, special purpose computers and general purpose computers may all be peripheral units. All peripheral units are capable of processing in parallel with the CPU's.

Generally, the CPU executes a machine language embodiment of the method according to this invention. However, the embodiment may take place in a programmable peripheral processor which is more or less an auxiliary CPU. The CPU comprises an arithmetic-logic unit and main memory. The preferred embodiments of this invention employ a CPU which has an interrupt capability enabling the regulating program to interrupt the processing programs at intervals such that it may, for example, impose new access priorities upon the processing programs.

The interrupt capability is most conveniently provided by an interval timer which is common on third and fourth generation computers. Basically, the interval timer is an electrical device that periodically decrements a numerical value stored at a selected memory location (word) and triggers an interrupt when the value of the word reaches a predetermined value, for example, zero. On the IBM 360 computer, line cycle alternating current is used to decrement the timer word every one sixtieth of a second. On other machines an internal oscillator of higher frequency decrements the timer word. Obviously, the reset value of the timer word and the decrementing frequency controls the timer interrupt interval. The interval timer and the software routines to maintain it for IBM System/360/370 general purpose computers using the Operating System/360/370 are more fully discussed in IBM manual number GY286659.

Rather than using a timer interrupt, the existing system interrupts which occur, for example, at the end of every peripheral operation might be used to give the regulating program control. The processing interval could be based on a certain number of the system interrupts. The length of the processing interval with this type of an embodiment would depend upon the nature of the programs being processed.

Figure 2:
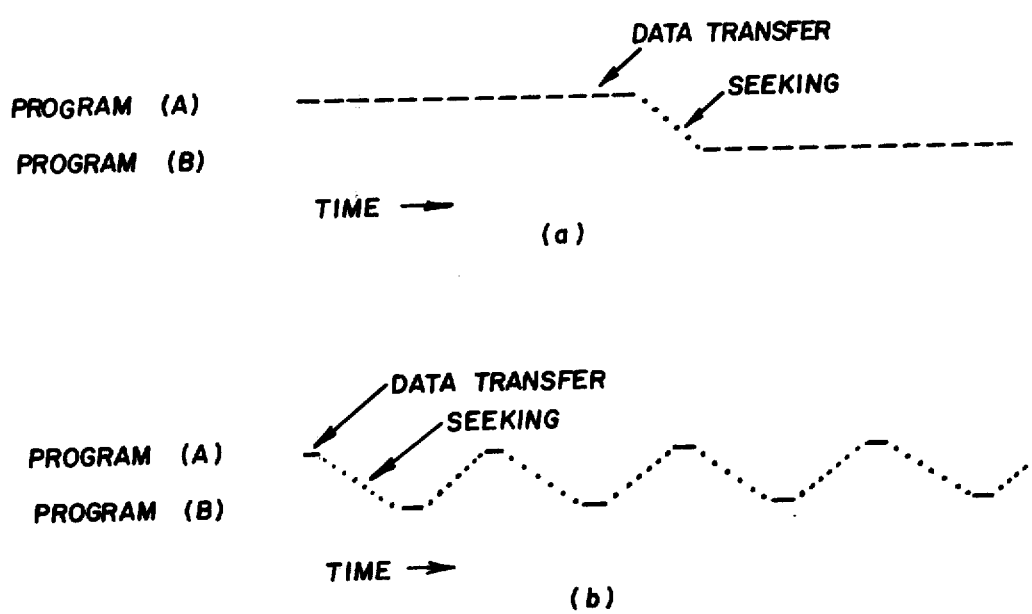
FIG. 2 illustrates the degradation of a resource as a result of competing programs.

There are two basic types of peripheral resources, non-degradable and degradable. A degradable peripheral resource is one that when shared by the operating system between two or more programs incurs a significant amount of overhead while switching its service from one program to another. Disk drives, data cells and cram files are the most common degradable resources. Input/output channels which incur no switching overhead are a common example of a nondegradable resource. Tape drives are generally nondegradable resources but for a very different reason. The degradation incurred by attempting to share a tape drive between two different programs is so obvious that the operating system prevents this type of sharing altogether. FIG. 2 illustrates how a disk drive can be degraded. In FIG. 2(a) Program A having the higher resource access priority makes continuous use of the peripheral and thus avoids degradation of the disk. FIG. 2(b) shows the degrading effect of frequent seeks when the two programs share the disk. The time required by this overhead is defined as degradation time.

As used herein, systems utilization data is a general term meaning resource activity and/or degradation data. Subprograms to collect this data are described in detail hereafter. As used herein, program resource contention involves the analysis of two or more programs' requirements for two or more resources. As used herein, regulating resource access, within the context of this invention, means to assign a resource access priority and/or to prevent resource access altogether.

The meaning of resource access priority as used in the context of this specification is illustrated in FIGS. 3(a) and 3(b). FIG. 3(a) gives a picture of resource utilization with time by Programs A, B and C whose respective priorities are 3, 2 and 1; 3 being the highest priority. Note that the lower priority programs are only given access to the resource when all higher priority programs no longer need it. However, whenever a higher priority program needs the resource again, processing for the lower priority program is interrupted. FIG. 3(b) defines the meaning of equal priority. Note that service for A, B and C is effectively time sliced as long as those programs require the resource.

Dynamic resource regulation according to this invention comprises a method for dynamically regulating the resource access of the processing programs while they execute. Dynamic regulation has three basic requirements: First, it must gather data relating to the resource utilization of the various programs it is attempting to control. Second, it must have an algorithm for analyzing the data and regulating resource access. Third, it must be given control periodically to execute its regulating algorithm. The latter requirement is easily met by most modern computers having an interrupt capability as previously described. The regulating program includes the operating system interface and the regulating algorithm.

By giving the regulating program a higher CPU priority than any of the regulated programs and by allowing it to use the timer interrupt capability as previously explained, it obtains control at space intervals to provide the necessary analysis and regulation. The time period between consecutive executions of the regulating program during which the operating system is executing processing programs is referred to herein as the processing interval. The time period following the interrupts during which the regulating program is executing is referred to herein as the regulating interval. In practice a suitable processing interval can be found by varying the length of the interval until best results are achieved. An interval of about one-half a second has been found to be a good starting point.

Since the regulating program requires some of the CPU resource, it is very important that the embodiments do not interfere with the normal processing by requiring excessive amounts of main memory space or CPU time. For computing systems that have slow CPU's or that have very high CPU utilization, a simple embodiment of this invention should be used. When more CPU time is available and warranted for effective optimization a more elaborate or sophisticated embodiment may be used. The embodiment illustrated in Appendix A may, for example, require twelve to sixteen thousand characters of main memory. On the IBM 360 Model 65 the regulating program takes less than one percent of the available CPU time. On an IBM 360 Model 50 the regulating program of Appendix A could take as much as three percent of the available CPU time. These costs are indeed nominal when compared to the increased thruput resulting from the use of this invention.

DETAILED DESCRIPTION - DATA GATHERING

Systems utilization data relating to at least one program is essential to this invention. Utilization data pertains to resource activity and/or degradation. The data itself may take the form of event counts or time. Since the performance of the regulating program is highly dependent upon the accuracy of the systems utilization data, time rather than event counts is used in the descriptions of the preferred embodiments that follow.

These are two fundamental techniques for accumulating data, sampling and direct measurement. A sampling technique has two major disadvantages when it is used to accumulate data for a dynamic regulating method. The first is that the processing interval may have to be made much longer than desired in order that the sampling data have statistical validity. The second drawback is that a sampling form of data gathering can incur high CPU overhead and in fact significantly alter the characteristics of the system that it is trying to measure.

For the above reasons a direct time measurement technique is preferred for embodiments of this invention. Appendix A contains a commented symbolic machine language listing of three data gathering subprograms which have been added to the IBM System/360/370 operating system. The three data gathering subprograms are called the dispatcher subprogram, the start I/O subprogram and the asynchronous I/O interrupt subprogram. They interface with standard operating system functions by the same name that are described in IBM manual GY28-6659.

Figure 4:
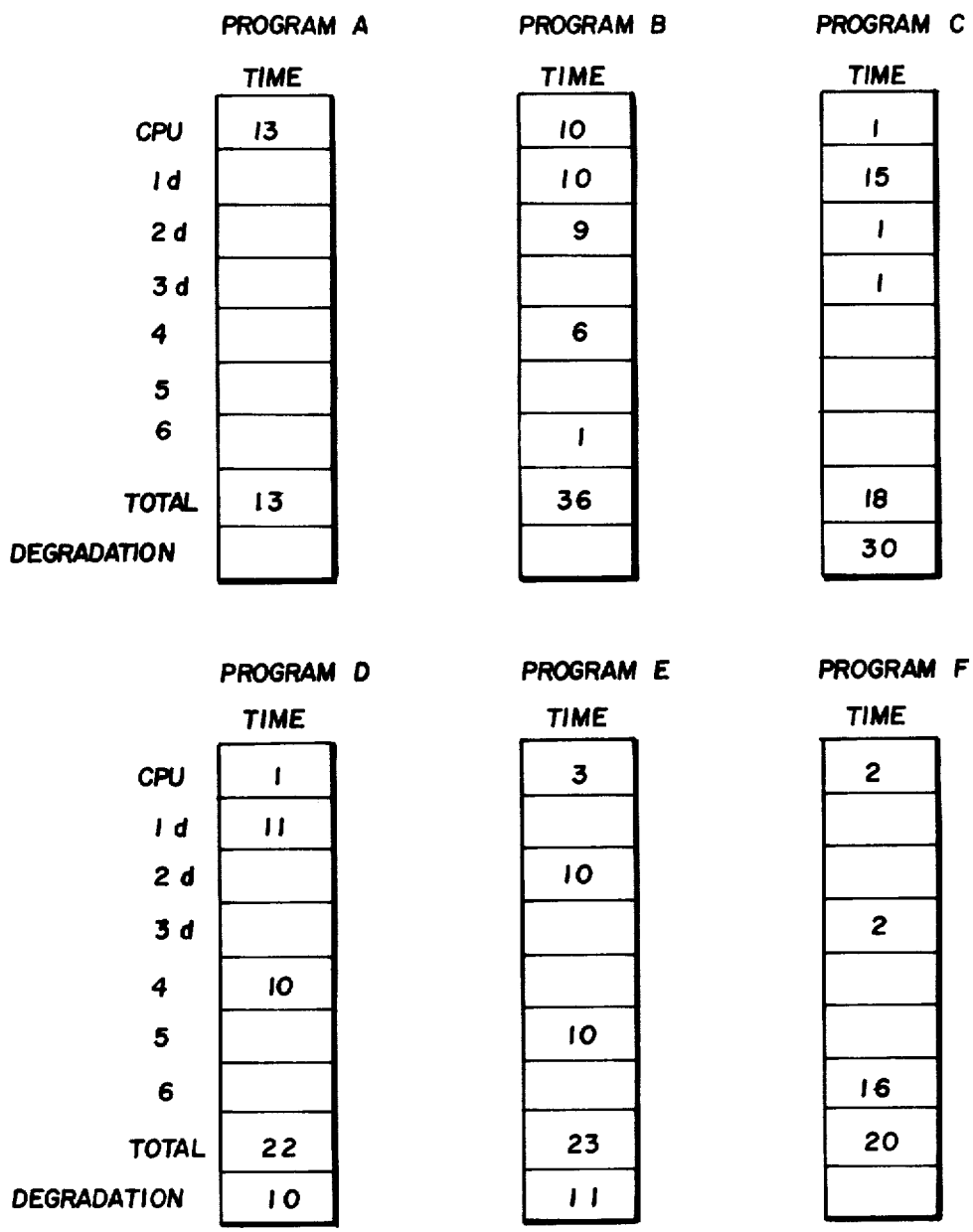
FIG. 4 is a collection of tables showing the type of data accumulated by the data gathering subprograms according to this invention; (Embodiments I through V are explained with reference to this data.)

It is a function of these data gathering subprograms to provide basic resource utilization data for the processing programs that are being executed in parallel. FIG. 4 illustrates in tabular form the timing information that is maintained by the data gathering subprograms for each regulated processing program. These tables show a brief history of program resource activity immediately preceding the execution of the regulating program. They may also show the total amount of degradation time attributed to the program.

The data gathering may take place over more than one processing interval for one or more programs when this is necessary to accumulate sufficient usage data for analysis. The history recorded (see FIG. 4) by the data gathering subprogram may reflect many processing intervals. In any event, the history must be set long enough or short enough to be useful in predicting what will take place in the next processing interval. If the combination of programs being processed by the computing system does not have enough natural sharing of resources, it may be necessary to switch to a time sharing mode (for example, described hereafter with reference to Embodiment IV) to gather data on all the processing programs.

The dispatcher subprogram measures CPU resource time for the processing programs, and the start I/O and asynchronous I/O interrupt subprograms measure peripheral resource time and degradation.

Appendix A is the source listing of a proprietary system of Duquesne Systems, Inc., called Quantitative Computer Management (QCM). As such, its function is broader than data gathering for this invention. Flow charts are described herein in detail to point out the portions of Appendix A that are applicable to the data gathering for this invention. Source listing sequence numbers from Appendix A are used frequently in the descriptions that follow. The sequence numbers are eight digit numbers enclosed in parentheses.

DISPATCHER SUBPROGRAM

Figure 5A:
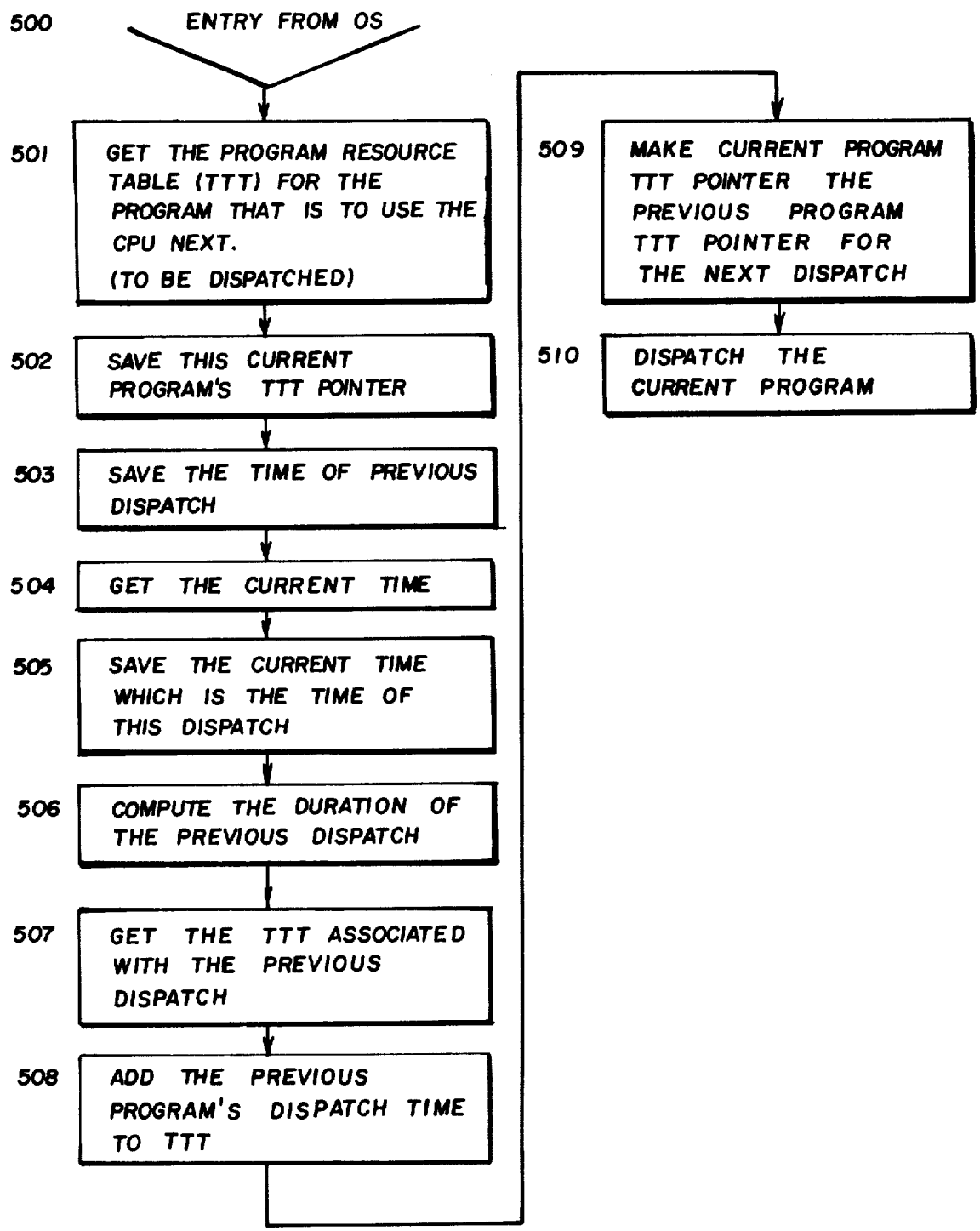

Referring to FIG. 5(a), control is received from the operating system at BLOCK 500 (26220000). In an MFT environment, registers are saved (26300000). Local addressability is obtained (26400000) and a test is made to determine if the CPU is going to wait (26640000, MFT) (26700000, MVT); if not, the program resource table (TTT) is found for the program to be dispatched, BLOCK 501 (26760000). This pointer is then stored, BLOCK 502 (26800000), and control is passed to BLOCK 503 where the time of the previous dispatch is saved (26860000). The current time is obtained, BLOCK 504 (26880000); a test is made to determine if the CPU has been waiting (26900000). If so, then wait analysis is performed (43820000).

At BLOCK 505, the current time (time of this dispatch) is saved (26980000). The second time through this code and thereafter a test is made to see if the interrupt time was billable (27100000). If not, control is passed to BLOCK 506; otherwise, the duration of the interrupt CPU activity is computed (27180000). The program resource table (TTT) for the program which caused the interrupt is found (27280000). A test is made to see if it is regulated (27320000). If so, the interrupt CPU time is added to the interrupt causing program's CPU accumulator in the (TTT) (27400000). Other timing functions not related to the regulator are performed (27440000).

At BLOCK 506 the duration of the previous dispatch is computed (27800000). Then the program resource table (TTT) associated with the previous dispatch is found, BLOCK 507 (27920000). A test is made to see if this program is regulated (27960000). If so, the CPU time is added to its CPU accumulator, BLOCK 508 (28020000). Other timing functions not related to the regulator are performed (28080000). A test is made to see if the CPU is going to wait (28640000, MFT) (28580000, MVT). If so, no program resource table (TTT) is located (28720000) and the TTT pointer is zeroed; otherwise, the TTT is found (28820000). The TTT pointer of this dispatch is saved, BLOCK 509 (28880000) and the registers are restored (2896000, MVT) (29020000, MFT). Finally, the program that was to be dispatched is dispatched, BLOCK 510 (29040000).

START I/O SUBPROGRAM

Figure 5B:
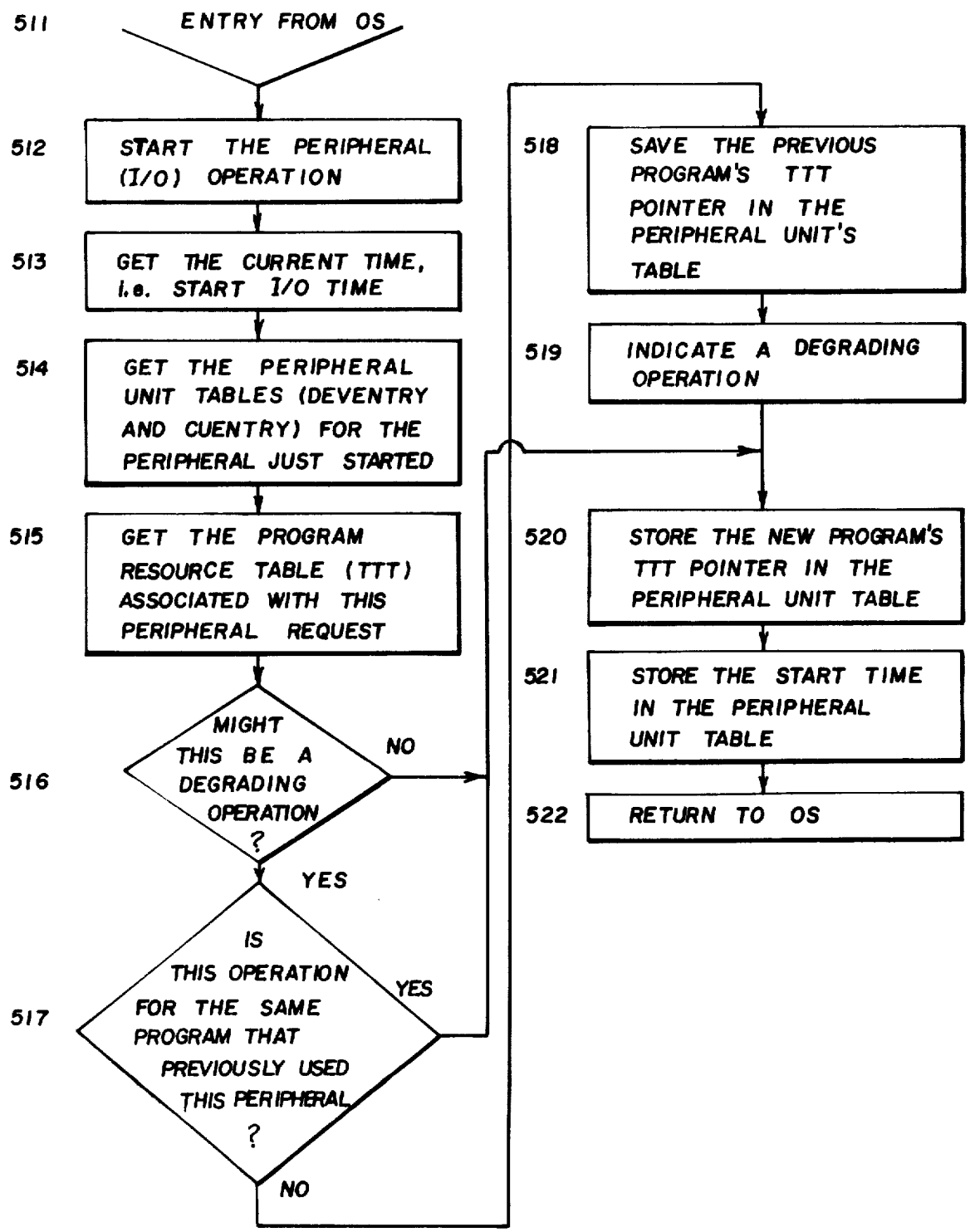

Referring to FIG. 5(b) at BLOCK 511, control is received from the operating program (29320000). The peripheral (I/O) operation is started at BLOCK 512 (29420000). A test is made to check for valid condition codes (29440000) (not shown on diagram). If not valid, control is passed to BLOCK 522. Registers are saved at (29480000). A test is made for condition code 1 (29580000). If it is not condition code 1, then the control unit's status is tested (29680000). If the control unit is untimed, then control is passed to BLOCK 522 (29700000). Otherwise, the rest of the registers are saved (29780000).

The current time is found, BLOCK 513 (29820000). This is the time of the start I/0. Next, the peripheral unit tables for the peripheral just started are found at BLOCK 514 (29860000). A test is made to see if this is a disk (29880000). If it is a disk, then a test is made to see if it is a seek (30060000). If it is a seek, then a test is made to see if it is the same cylinder (30120000). If it is the same cylinder, a test is made to see if it is a stand-alone seek (30160000). If it is a stand-alone seek, (30280000), then the registers are restored (30940000) and control is passed to the operating system at BLOCK 522.

If any of the above tests failed, then the program resource table (TTT) is found at BLOCK 515 (30340000). A test is made to see if an interrupt was lost (30360000). If so, the interrupt lost is indicated (30400000). The charge flag is turned on (30440000) and a test is made for non-seeks, BLOCK 516 (30480000). If it isn't a seek, the channel busy flag is turned on (31500000) and control is passed to BLOCK 520. A test is made to see if this operation is for the same program that previously used this peripheral (30600000), BLOCK 517. If not, then the previous program's TTT pointer is saved in the program's peripheral resource table, BLOCK 518 (31840000). The indicator is turned on to indicate a degrading operation, BLOCK 519 (31900000). Some housekeeping is done (31620000) and control is passed to BLOCK 520 (31700000). If it was the same program resource table (TTT), some housekeeping is done and control is passed directly to BLOCK 520.

At BLOCK 520, the new program's resource table (TTT) pointer is saved in the peripheral unit table (30780000). The start time of this peripheral unit is saved, BLOCK 521 (30840000). Registers are reloaded (30900000) and control is returned to the operating system, BLOCK 522 (31060000).

If the start I/O done at BLOCK 512 resulted in a condition code of 1, then a test is made to see if it is contol unit busy (31960000). If not, then return housekeeping is performed (31320000) and control is passed to BLOCK 522 (31420000). Otherwise, register seven is saved (32000000) and a test is made to see if the control unit is timed (32080000). If the control unit is untimed (32100000), then register seven is reloaded (31280000), the return housekeeping is performed (31320000) and control is passed to BLOCK 522 (31420000). If the control unit is timed, the rest of the registers are saved (32140000). A test is made to see if any channel attached to this control unit is busy of if the time is already being billed (32240000). If it is, register seven is reloaded (31280000, the return housekeeping is performed (31320000)) and control is passed to BLOCK 522 (31420000). If it isn't, then the program's resource table is found (32360000) as in BLOCK 515. The logic flow at this point is similar to the device timing described above.

A test is made at BLOCK 517 to see if this operation is for the same program that previously used the control unit (32400000). If so, flags are turned off (32420000), the TTT is stored (32540000) at BLOCK 520 and the return housekeeping is performed (32600000) and control passes to BLOCK 522. Otherwise, a test is made to see if the charge flag is on (32640000). If the charge flag is on (32660000), the return housekeeping is performed (32600000) and control passes to BLOCK 522. If the charge flag is off, the degradation flag is turned on (32680000) at BLOCK 519, the charge flag is turned on (32480000), the TTT is stored (32540000) at BLOCK 520, the return housekeeping is performed (32600000), and control passes to BLOCK 522.

ASYNCHRONOUS I/O INTERRUPT SUBPROGRAM

Figure 5C:
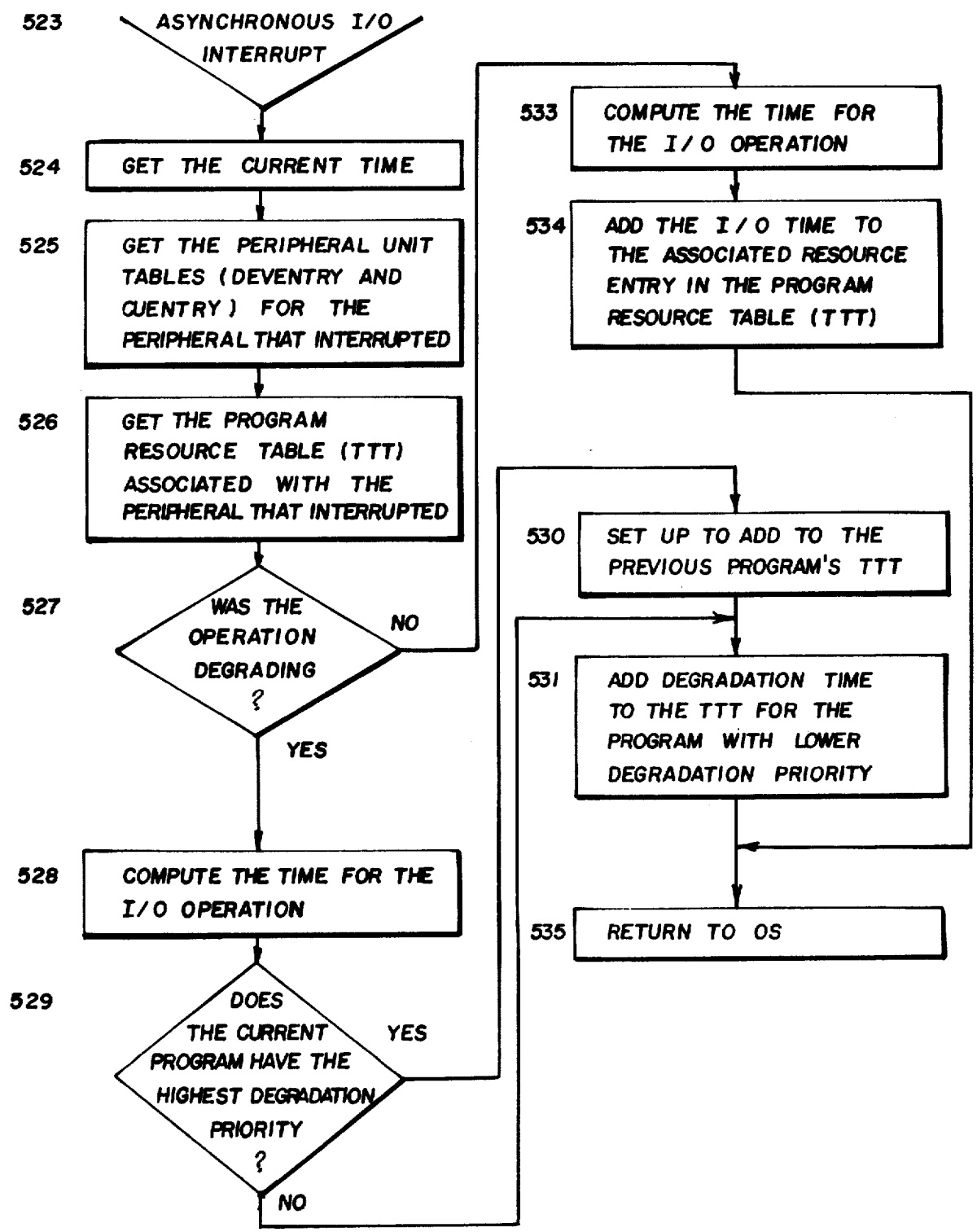

Referring to FIG. 5(c), control is received from the asynchronous interrupt function of the CPU at BLOCK 523 (32900000). After the registers are saved (32980000), local addressability is obtained (33020000). Then the interrupt unit address and channel address are examined (33140000). The current time is obtained, BLOCK 524 (33200000). A test is made to determine if the interrupt is stacked (33220000). If the interrupt is not stacked, then the interrupt time is saved (33280000). Stacked or not, the time of the interrupt is always saved at (33320000).

A test is made to see if the CPU was waiting (33340000). If not, the CPU wait analysis is skipped. The wait analysis routine (43820000) updates accumulators not required by the regulator program. Next, a test is made at (33480000) to determine if the peripheral unit is timed or untimed. If the peripheral unit is untimed, preparations are made for returning control to the operating system (33560000). For timed peripherals, the peripheral control unit entry and peripheral device entry are located at BLOCK 525, (33720000). A test is made to determine if this is a channel end interrupt (33820000). If so, the channel time is accumulated for that channel (35720000).

Next, a test is made for control unit end and/or device end (33880000, 33940000). If only one of the conditions exist, only one pass will be made through the following logic, BLOCKS 526 through 535. If both conditions are present, two passes will be made, one for each condition.

At BLOCK 526, the program resource table (TTT) associated with the peripheral that interrupted is found (34180000). A test is made at BLOCK 527 to see if this operation was degrading (34280000). If not degrading, control is passed to BLOCK 533. If it was degrading, the time is computed for the degrading I/O operation at BLOCK 528 (36960000) and program housekeeping is done (37100000). At BLOCK 529, a check is made to see if the current program has the highest degradation priority (37400000). If so, the previous program's TTT is pointed to for degradation accumulation at BLOCK 530 (37520000). If the current program's degradation priority is not higher, control is passed to BLOCK 531 (37680000). Then, at BLOCK 531 the degradation time is accumulated in the TTT program with the lower degradation priority (37680000). Other housekeeping is done and the charge flag is turned off (37920000).

As noted previously, non-degrading operations pass through BLOCK 533 (34560000). At BLOCK 533, the time is computed for the I/O operation. The time is added to the peripherals associated resource time accumulator in the program resource table (TTT) at BLOCK 534 (34900000).

If both control unit end and device end are present and only one has been processed, control will pass back to BLOCK 526 to process the second interrupt condition.

When all of the above interrupt conditions have been processed, control pass to BLOCK 535 returns to the operating system.

EMBODIMENT I

The regulating program according to this embodiment requires a minimal amount of CPU time. The systems utilization data accumulated by the data gathering subprograms previously described is analyzed by a regulating program which regulates CPU and peripheral access to increase or maximize thruput.

The regulating program increases thruput by favoring the more overlapped programs. An overlapped program is one which can use two or more resources in parallel. The more overlapped programs are favored by giving them higher resource access priority than the less overlapped programs. The regulated programs are assigned to two different classes, CPU bound and peripheral bound, based on an analysis of their recent performance. Their CPU priority is calculated to favor overlap and give higher CPU access priority to the peripheral bound programs. The peripheral access priorities are then assigned inversely to the calculated CPU priorities giving CPU bound programs higher peripheral access priority than peripheral bound programs.

Preferably, in addition to analyzing resource activity and assigning resource access priorities, the regulating program analyzes the degradation data collected by the data gathering subprograms and further alters access priorities to reduce or minimize degradation.

FIG. 6 is a flow diagram illustrating the regulating program of this embodiment. Sequence numbers from Appendix A appear within parenthesis throughout the descriptions of this and all other embodiments of the invention. They identify where possible specific OS/360/370 symbolic machine language translations of the functions in the flow diagrams.

FIG. 7 illustrates the assignment of resource access priorities to processing programs A through F by Embodiment I.

The regulating program consists of an operating system interface and a regulating algorithm, described in that order.

The regulating program waits at BLOCK 600 (01640000) for the processing interval to end. When the timer interrupt is fielded, indicating the end of the processing interval, the operating system passes control back to the regulating program. At BLOCK 601, the duration of the next processing interval is specified (10640000).

The next step is to locate the processing programs that are to be regulated. At BLOCK 602 (11860000), a pointer is obtained to the task control block associated with the master scheduler. This pointer points to the beginning of the list of all the processing programs that are currently active in the system. The first test made at BLOCK 603 (11940000) determines if there are any more programs in the list. If more programs exist, processing continues to BLOCK 604. If the end of the list has been detected, control passes to BLOCK 610.

At BLOCK 610 the regulating program determines if any regulated programs were found. If regulated programs have been found, control passes to BLOCK 619. If no regulated programs have been found, then control passes back to BLOCK 600 where the regulating program waits for the end of the next processing interval.

If the end of the list was not detected by the test at BLOCK 603, the next program in the list is examined. At BLOCK 604 (12060000), a test is made to determine if this program is to be regulated. If the answer is no, control passes to BLOCK 605 (11920000) where a pointer to the next program in this list is loaded. Control then passes back up to BLOCK 603. This loop is followed until all programs have been examined, at which point control passes to BLOCK 610.

If the test made at BLOCK 604 indicated that the program was to be regulated, control passes to the regulating algorithm, BLOCK 606 (15160000). The total peripheral time and the maximum peripheral time are calculated at this point.

The next three blocks describe the degradation analysis of this embodiment. Since the regulating algorithm of this embodiment assigns a unique peripheral access priority to all regulated programs, degradation is eliminated by preventing the degrading programs from accessing the CPU.

The first step of degradation analysis, BLOCK 607 (15635000), is to compute the total resource time ($T_{total}$). At BLOCK 608 (15636000), the regulating program analyzes the degradation time accumulated during the previous processing intervals and compares the degradation time ($T_d$) to the total usage ($T_{total}$) of all resources:

$$\text{Compare } T_{total} = T_{CPU} + \sum_{i=1}^{n} TP_i \text{ to } T_d \quad (1)$$

If the degradation time exceeds the total usage time for a program, it is prevented from accessing the CPU, BLOCK 609 (15643000), for at least the next processing interval. Referring to FIG. 7, program C would not execute during the next processing interval. In this way, it would not compete with programs B and D for the degradable resource marked 1d. The program's degradation is zeroed and control then passes to BLOCK 611.

According to this embodiment, the CPU priorities are next calculated dependent upon whether the CPU time ($T_{CPU}$) is greater than or equal to the maximum peripheral time ($TP_{max}$). This test is made at BLOCK 611 (15840000).

Referring to FIG. 6(b), if the program is peripheral bound, control passes to BLOCK 612. At BLOCK 612 (16260000) a test is made to see if the program has accumulated enough history to assure a valid calculation of its CPU priority. If not, its previous CPU priority is retained and control passes to BLOCK 618.

If the processing program is CPU bound, BLOCK 611 passes control on to BLOCK 615. Here, a test similar to that which occurred in BLOCK 612 is made to determine if enough CPU history has been accumulated (15900000). If not, control passes to BLOCK 618.

If the sufficient history exists, as determined by BLOCK 612 or 615, the processing program's productivity factor is calculated and its CPU priority is assigned.

The productivity factor (PF) is calculated at BLOCK 613 or BLOCK 616, according to the following formula:

$$PF = \frac{\alpha T_{CPU} + \sum_{i=1}^{n} TP_i}{T_{max}}, \quad (2)$$

where
$T_{CPU}$=the CPU time used;
$TP_i$=the time for each peripheral resource used;
$T_{max}$=the maximum time used on any resource; and,
$\alpha$=a CPU preferential weighing factor generally set to one. Note that the more overlapped programs are assigned higher factors. This productivity factor is then used as a degradation priority during the next processing interval and until new access priorities are computed. The program with the lower degradation priority accumulates the degradation time whenever it occurs. In FIG. 7, the productivity factors for programs A to F are shown as calculated using the above-described formula for the systems utilization data given in FIG. 4.

When a peripheral time is greater than the CPU time, the following formula is used to assign CPU access priority in BLOCK 614 (16500000):

$$CPU \text{ Priority} = n + \frac{TP_{max}}{T_{total}}, \quad (3)$$

where n is equal to the number of peripherals. The CPU priority for programs C through F shown in FIG. 7 were calculated by using formula (b 3) above. The program's resource history is then zeroed.

When the CPU time is greater than or equal to the maximum peripheral time, the following formula is used to assign CPU access priority in BLOCK 617 (16180000):

$$CPU \text{ Priority} = \frac{\sum_{i=1}^{n} TP_i}{T_{CPU}} \quad (4)$$

Note that the maximum value of this formula is n, the number of peripheral units in the computing system, and it could only occur when all the resources in the system are saturated by the processing program. Thus, all values calculated by formula (4) will be less than all values calculated by formula (3). The CPU priorities of programs A and B shown in FIG. 7 were calculated using the formula (4) above.

Note that the CPU priorities are substantially inverse need assigned. The history is zeroed and control then passes to BLOCK 618.

At BLOCK 618, the program is put into an ordered list based upon its CPU priority (17760000).

BLOCK 619 (19340000) is entered from BLOCK 610 after all regulated programs have been analyzed. A pointer to the first program in the list that was created in BLOCK 618 is obtained. At BLOCK 620 (19700000), peripheral resource access priorities are assigned inversely to the CPU priorities. FIG. 7 shows the assignment of peripheral resource priorities according to BLOCK 620. Note that the peripheral resource priorities are also generally inverse need assigned. At BLOCK 621 (20320000), the peripheral resource access queues are sorted according to the new peripheral resource priorities so that sequential requests are not executed out of order. When the sort is finished, control is returned to BLOCK 600 where the regulating program waits for the end of the next processing interval. During the processing interval the operating system uses the new resource access priorities.

EMBODIMENT II

In the second thruput embodiment according to this invention, the regulator program performs degradation analysis and assigns the regulated programs a separate inverse need access priority for each active resource. This embodiment requires slightly more CPU time and occupies slightly more main memory space than Embodiment I. This type of pure inverse need resource access priority substantially reduces the chance that a program will be unable to execute because of a nominal need for service from a saturated resource. This embodiment is particularly effective in optimizing computing systems that are predominantly peripheral bound. FIG. 8 and FIG. 9 are used to explain the details of this embodiment.

BLOCK 800 represents the operating system interface with degradation analysis of BLOCKS 600 through 610 Embodiment I. The degradation analysis of BLOCKS 607 through 609 would prevent program C from accessing the CPU during at least the next processing interval. BLOCK 609 would then pass control to BLOCK 801.

At BLOCK 801, a test is made to see if the program has accumulated enough history to assure a valid calculation of its resource access priorities. If not, control passes to BLOCK 804. If the history is sufficient, control passes to BLOCK 802.

At BLOCK 802, the regulator program assigns a separate resource access priority to all of the program's active resources according to the following formula:

$$\text{ACTIVE RESOURCE PRIORITY}_i = \frac{\text{TOTAL TIME}}{\text{RESOURCE TIME}_i} = \frac{T_{total}}{TP_i} \quad (5)$$

The active resource priorities determined by formula (5) for programs A through F are illustrated in FIG. 9. Control then passes to BLOCK 803.

At BLOCK 803, the program's productivity factor is computed, using formula (2) and its history is zeroed. The PF is used as a degradation priority in exactly the same way it was in Embodiment I, see FIG. 9.

At BLOCK 804, the program is put into an ordered list based upon its productivity factor. Control then passes back into the operating system interface at BLOCK 603.

If the test at BLOCK 610 within the operating system interface is positive, control then passes to BLOCK 805, where a pointer to the program with the highest productivity factor is obtained.

The next step for the regulator program is to assign inactive resource priorities at BLOCK 806. This is done by selecting an arbitrary high priority value, say 100, and assigning it to all inactive resources for the program having the highest productivity factor (PF). The program with the next lowest productivity factor is assigned an inactive resource priority decremented by one and so forth until all programs have been assigned inactive resource priorities, see FIG. 9. Thus, with this embodiment, active resources are inverse need queued, and the inactive resources are queued to favor the more overlapped programs.

Control then passes to BLOCK 807, where all of the peripheral access queues are sorted according to the newly assigned peripheral resource priorities so that as in Embodiment I sequential requests are not executed out of order. When the sort is finished, control is returned to BLOCK 600 where the regulating program waits for the end of the next processing interval. During the processing interval, the operating system uses the new resource access priorities.

EMBODIMENT III

Embodiments I and II increase the thruput of the computing system by analyzing individual programs, which is very effective when a small number of programs are involved. When a large number of programs compete for a limited number of resources, and when sufficient CPU processing time is available, optimization by simulation and/or mathematical programming techniques may yield significantly greater thruput. According to this embodiment of the regulator program, a dynamic linear programming (LP) model is used to maximize the total system's resource utilization (thruput) by selecting a subset of programs to be executed.

This embodiment uses a special form of the general linear programming model, which is an established technique for maximizing a linear function where the variables are limited by linear inequalities. The object will be to find an $x_1, x_2 \ldots, x_n$ which maximizes the linear function.

$$Z = PF_1 x_1 + PF_2 x_2 + \ldots + PF_n x_n, \quad (6)$$

where $PF_i$ is equal to the program productivity factor of the i th program and n is equal to the number of programs executing in parallel, subject to the restrictions $$\begin{aligned} a_{11}x_1 + a_{12}x_2 + \ldots a_{1n} x_n &\leq 1 \\ a_{21}x_1 + a_{22}x_2 + \ldots a_{2n} x_n &\leq 1 \\ &\vdots \\ a_{m1}x_1 + a_{m2}x_2 + \ldots a_{mn} x_n &\leq 1 \end{aligned} \quad (7)$$

where m is equal to the number of active resources and $$x_1, x_2, \ldots x_n$$

and $$a_{11}, \ldots a_{mn}$$

are bivalent, that is, equal to either 0 or 1.

The inequalities of (7) set forth the restriction that a resource cannot be used more than 100% of the time.

The purpose of the model is to find the subset of programs that can run compatibly and provide the maximum possible thruput. The restrictions imposed upon this model are such that the solution values of x will be either 0 or 1. The programs whose x values are equal to 1 represent the subset of programs that should maximize system thruput.

FIG. 10 through FIG. 13 are used to illustrate this embodiment.

BLOCK 1000 represents the operating system interface with degradation analysis of BLOCKS 600 through 610 of Embodiment I. The degradation analysis of BLOCKS 607 through BLOCK 609 would prevent program C from accessing the CPU during at least the next processing interval. BLOCK 609 would then pass control to BLOCK 1001.

At BLOCK 1001, a test is made to see if the program has accumulated enough history to insure a valid calculation of its Percent of MAX's and its productivity factor. If not, control passes back into the operating system interface at BLOCK 603.

If enough history has been accumulated, control passes to BLOCK 1002. At this point, the Percent of MAX is calculated for each of the program's active resources according to the following formula:

$$\text{Percent of } MAX = \frac{\text{Resource Time}}{\text{Maximum Time}} \times 100 \qquad (8)$$

The results of Percent of MAX calculations are set forth in the second column of the tables in FIG. 11.

At BLOCK 1003, the program's productivity factor is computed using formula (1). The productivity factor, in combination with the subset priorities, to be explained later, is used to determine the program's degradation priority. The degradation priority is then used in exactly the same way as it was in Embodiment I. The program's history is zeroed and control then passes back into the operating system interface at BLOCK 603.

If the test at BLOCK 610 within the operating system interface is positive, control then passes to BLOCK 1004. At this point, the amount of unused CPU time (wait time) during the previous processing interval is compared to the amount of CPU time required to solve the LP model. If the wait time is significantly larger than the time required to solve the LP model, control passes to BLOCK 1005.

Referring to FIG. 11, the regulating program at this time would construct the following specific LP optimizing function:

$$Z = 1x_1 + 3.6x_2 + 1.21x_3 + 2x_4 + 2.3x_5 + 1.24x_6.$$

At BLOCK 1006 the regulating program determines and assigns the restriction coefficients $a_{mn}$ according to the following rules:

1. Assign the $a_{mn}$ coefficients values of 1 if the Percent of MAX is greater than 60% on nondegradable resources, or if the percent of MAX is greater than 15% on degradable resources. The results are set forth in the second column of the tables in FIG. 11.
2. If, according to the previous coefficient assignments, a degradable resource has been assigned a coefficient value of 1 for any of the programs, then all programs that use that resource are assigned a corresponding $a_{ij}$ value of 1. For example, peripheral 2 for program $C(a_{33})$ is assigned a value of 1 although its percent utilization is only 7% because program B had previously been assigned as a coefficient value of 1 for peripheral $2(a_{32})$, see FIG. 11.
3. All remaining coefficients are assigned a value of 0. FIG. 11 illustrates the completed assignment of all a coefficients. The resulting model restrictions are as follows:

| | | | | | |
|---|---|---|---|---|---|
| CPU | $x_1 + x_2$ | | | | $\leq 1$ |
| (1)d | | $x_2 + x_3 + x_4$ | | | $\leq 1$ |
| (2)d | | $x_2 + x_3 +$ | | $x_5$ | $\leq 1$ |
| (3)d | | | | | |
| (4) | | $x_2 +$ | $x_4$ | | $\leq 1$ |
| (5) | | | | $x_5$ | $\leq 1$ |
| (6) | | | | | $x_6 \leq 1$ |

Note that there is no inequality expressed for resource $(3)d$ since none of the $a_{ij}$ coefficient values were equal to 1 for that resource.

At BLOCK 1007, the simplex method, or a revised form of the simplex method, is used to solve this linear programming model. The time of day of this LP solution is then saved for subsequent analysis. For the example shown in FIG. 11, the results are as follows: $x_1$ is equal to 1, $x_2$ is equal to 0, $x_3$ is equal to 0, $x_4$ is equal to 1, $x_5$ is equal to 1, and $x_6$ is equal to 1.

At BLOCK 1008, programs A, D, E and F, comprising the favored subset of programs, i.e., those that should yield maximum thruput, are all assigned resource access priorities of 500. Programs B and C, comprising the unfavored subset, are assigned resource access priorities of 0. These priorities are defined as the subset priorities, see FIG. 12.

If, as a result of the test in BLOCK 1004, insufficient CPU time was available to solve the LP model, control passes to BLOCK 1009. At this point, the time of the last LP solution is examined. If the solution is very old, control passes to BLOCK 1010 where all of the subset priorities are set equal to the unfavored subset's priority which, in this instance, is 0. Control then passes to BLOCK 1011.

In the last LP solution is still considered to be valid, control passes directly to BLOCK 1011.

At BLOCK 1011, all of the peripheral access queues are sorted according to the newly assigned peripheral resource access priorities, so that as in Embodiment I, sequential requests are not executed out of order. When the sort is finished, control is returned to BLOCK 600 where the regulating program waits until the end of the next processing interval. During the processing interval, the operating system uses the new resource access priorities.

According to this embodiment, the regulating program can further increase thruput by incorporating separate resource access priority logic, for example, that of Embodiments I or II. FIG. 13 illustrates a combination of Embodiment III with the resource access priority assignments of Embodiment II.

To accomplish the priority assignment of FIG. 13, the logic flow of the regulating program of Embodiment II in FIG. 8 is slightly modified. BLOCK 1002 is added to FIG. 8 underneath BLOCK 801. BLOCK 1002 would then pass control on to BLOCK 802. Only one other change is required. It is to cause BLOCK 806 to pass control to BLOCK 1004.

The advantages of analyzing program resource contention can be seen by comparing the priorities assigned as the result of Embodiment II (FIG. 9) to the priorities that are assigned as the result of Embodiment III (FIG. 13). With Embodiment II, Program B is favored among all of the programs. However, with Embodiment III Programs A, D, E, and F are all favored over Program B. The result of the regulating program's LP analysis of program resource contention is significantly higher thruput.

EMBODIMENT IV

The previous embodiments and regulating programs function to maximize systems resource utilization (thruput). Unfortunately, when thruput is maximized, the programs that are assigned low priorities may be delayed significantly. As a result, the projects or people that depend upon results from these low priority programs may incur costly delays.

A program's turnaround is the elapsed time from when the program is first recognized by the computing system to when the computing system completes all processing associated with it. Often, the turnaround characteristics of the computing system are considered to be more important than its thruput characteristics.

Forced sharing of all system resources with all programs will generally give the computing system a good turnaround characteristic. For nondegradable resources, sharing can be accomplished efficiently by assigning all of the programs the same access priority. As discussed previously with reference to FIG. 3(b), this will time-slice the resources among the various programs that need their service. However, assigning equal access priorities to degradable resources will not only kill thruput, but it will significantly degrade turnaround as well.

The regulator program of this shared embodiment of the invention attempts to eliminate degradation by first regulating resource access priorities. Then only after priority regulation fails is a degrading program prevented from accessing the CPU.

Two terms need to be defined before the flow diagram of this embodiment, FIG. 14, is described. The first term is phase. It is defined as an integer number of processing intervals. The second term is hog. It is defined as any program whose resource time over the previous processing interval is greater than that interval length divided by the number of active programs. For example, if the monitor interval is 40 units of time and there are two programs processing in parallel, then any program that receives more than 20 units of service from a resource in the previous interval will be considered a hog.

BLOCK 1400 represents the operating system interface for the regulator program. Note that it does not contain the degradation analysis of BLOCKS 608 and 609.

When control passes out of BLOCK 607 into BLOCK 1401, a test is made to determine if a new phase is to begin. This is done by comparing the phase accumulator with the phase length. If a new phase is to be started, control passes to BLOCK 1406. BLOCK 1406 performs phase initialization, which consists of four steps. The first step is to zero the phase accumulator. The second step is to set all of the program's resource priorities (RP) to a predetermined high value, for example, 100. The next step is to set the program's degradation priority (DP). The first program encountered by the regulator program is assigned a degradation priority equal to the initial resource priority. All subsequent programs are given degradation priorities that are one less than their predecessor. The last step is to guarantee that the program is executable. Control then passes to BLOCK 603 in the operating system interface.

If the new phase test at BLOCK 1401 is negative, control passes to BLOCK 1402. At this point the program's degradation time is compared to its total resource time (productivity). If the degradation time is less than the productive time, control passes to BLOCK 1407. When the degradation time is not less, BLOCK 1402 passes control to BLOCK 1403.

At BLOCK 1403 a test is made to determine if the program's resource priority is equal to its degradation priority. If the priorities are unequal, control passes to BLOCK 1404, where the program's resource access priority is set equal to its degradation priority (eliminating degradation by priority control is preferable to suspending the program's execution). Control then passes to BLOCK 1407.

When priority control has failed to eliminate degradation, BLOCK 1403 passes control to BLOCK 1405. At this point, the program is made not executable for at least the next processing interval. Control then passes to BLOCK 1407.

At BLOCK 1407 analysis is performed to determine if the program is a hog. If the program is not a hog, control passes to BLOCK 1412. If the program is a hog, control passes to BLOCK 1408, where both its resource priority and degradation priority are decremented by a number larger than the maximum number of programs that can be regulated simultaneously. Control then passes to BLOCK 1412.

At BLOCK 1412, the resource time and degradation time of the program are zeroed. Control passes to BLOCK 603 in the operating system interface.

When the test made at BLOCK 610 within the operating system interface is positive, control passes to BLOCK 1409. At this point, a test is made to determine if a resource hog has been found. If no hogs were found, control passes to BLOCK 1411. If a hog was found, control passes to BLOCK 1410. At BLOCK 1410 all programs that had been prevented from accessing the CPU during the previous processing intervals are allowed to again access the CPU during the next processing interval. Control then passes to BLOCK 1411.

At BLOCK 1411 the previous processing interval's time is added to the phase accumulator. Control is then returned to BLOCK 600, where the regulating program waits until the end of the next processing interval. During the next processing interval, the operating system uses the new resource access priorities.

FIG. 15 and FIG. 16 illustrate a sequence of 12 processing intervals according to this embodiment of the invention. The processing interval is 40 units of time long and the phase is 9 processing intervals in length, or 360 units of time. During these 12 processing intervals, Program A and Program B share the same degradable resource.

FIG. 15 illustrates the resource regulation of this regulating program when priority control is effective in eliminating degradation. FIG. 16 illustrates the sequence of events when the regulating program is unable to control degradation with resource priority assignment. Note how service flip-flops, first in favor of one program and then in favor of another, yielding a significantly more efficient sharing of the degradable resource.

EMBODIMENT V

With regulating algorithms for optimizing two different computing system performance characteristics, for example, thruput and turnaround, it is possible to vary the computing system's characteristics with time according to this embodiment of the invention. This embodiment makes it possible to adjust the system characteristics to meet a specific or varying load.

Figure 18:
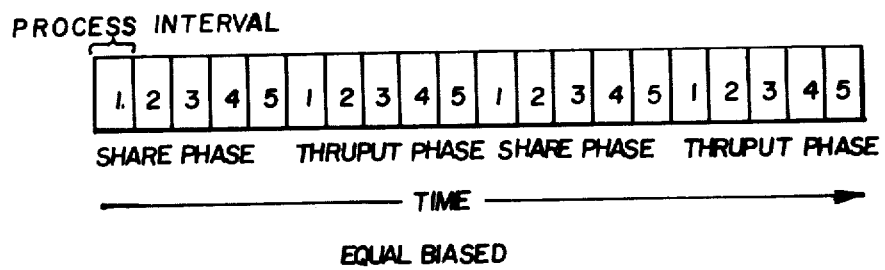
Figure 19:
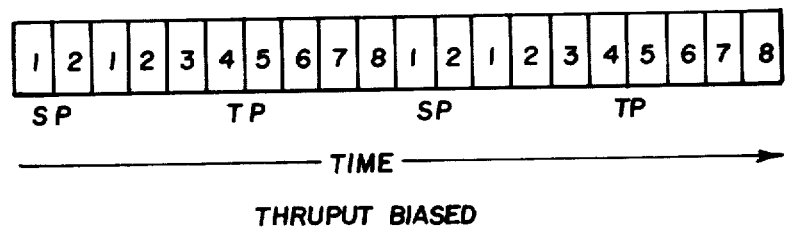
Figure 20:
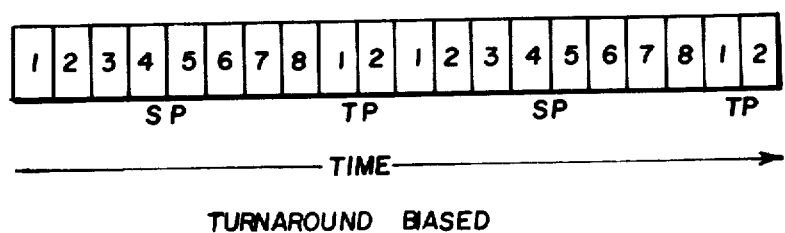
Figure 21:
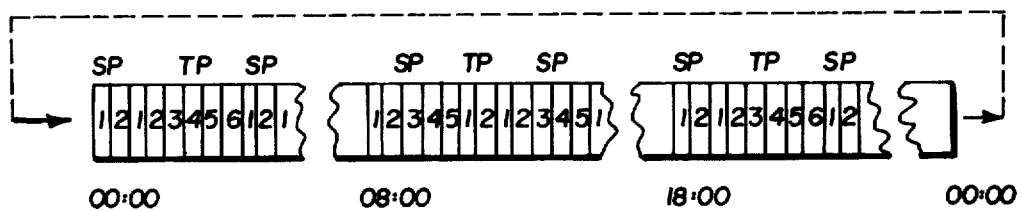

A mode of operation is defined as alternating between a share or shared phase and a thruput phase. In FIG. 18 the share phase is 5 processing intervals long and the thruput phase is 5 processing intervals long.

The mode of operation can be biased in favor of either turnaround or thruput. A thruput mode is one in which the number of processing intervals during the thruput phase is larger than the number of processing intervals during the shared phase, see FIG. 19. A turn-around mode is one in which the number of processing intervals during the share phase is larger than the number of processing intervals during the thruput phase, see FIG. 20. Note than an almost unlimited number of different operating modes exists with this embodiment of the invention.

The mode of operation should define more regulating program characteristics than just the shared thruput biasing. The mode control elements in Appendix A control the length of the processing interval, the history values for CPU time and peripheral time, the hog value, and a threshold characteristic that determines whether or not the thruput phase is entered at all. It is desirable to have the mode control element specify all of the critical regulating program characteristics.

It is often desirable to change computing system's performance at different times of day. It is a function of the timetable to specify the desired mode changes at different times of day, see FIG. 21. At just after midnight, the computing system enters a mode consisting of two share processing intervals and 6 thruput processing intervals. It stays in this mode of operation until 8:00 a.m. when it automatically changes to a new mode consisting of 5 shared processing intervals and 2 thruput processing intervals. From 8:00 a.m. until 6:00 p.m. this shared or turnaround mode of operation is used. At 1800 the mode switches back to a thruput mode consisting of 2 shared processing intervals and 6 thruput processing intervals. This mode of operation continues until midnight, at which point the timetable recycles.

The regulating program for Embodiment V is illustrated in FIG. 17. At BLOCK 1700, the regulating program waits for either a processing interval to end or for a timetable interval to end (01640000). When the end of an interval occurs, the operating system passes control back to the regulating program at BLOCK 1701, where a test is made to determine if the timetable interval has elapsed. If it has, control passes to BLOCK 1702.

At BLOCK 1702 (03480000), the next timetable interval is set and the next processing interval is set. Control then passes to BLOCK 1703, (02490000) where the new regulating program characteristics are set. Next, control passes down to BLOCK 1712.

When the test at BLOCK 1701 indicates the processing interval has elapsed, control passes to BLOCK 1709 (10640000). At this point, the next processing interval is set and control passes to BLOCK 1710.

At BLOCK 1710, a test is made to determine if the current phase is over (10880000). If the phase isn't over, control passes to BLOCK 1711. If the phase is over, control passes to BLOCK 1704.

At BLOCK 1711, a test is made to determine if the current phase is a shared phase. If it is, control passes to the shared phase algorithm at BLOCK 1713. If the test at BLOCK 1711 indicates a thruput phase is in process, control passes to the thruput phase algorithm at BLOCK 1707.

If the test at BLOCK 1710 indicated that the phase was over and a new phase is to begin, control passes to BLOCK 1704. At BLOCK 1704 (10920000), a test is made to determine if the ending phase was a thruput phase. If it was, control passes to BLOCK 1712 to start a new shared phase. If the previous phase was a shared phase, control passes to BLOCK 1705.

At BLOCK 1705 (11480000), a sequence of tests are made to determine if there appears to be any advantage in entering the thruput phase. When tests at BLOCK 1705 indicate that there appears to be no advantage to entering the thruput phase, control passes to BLOCK 1712. If, however, the advantages of the thruput phase appear evident, control passes to BLOCK 1706 where the thruput phase is started (11620000). BLOCK 1707 is entered next.

At BLOCK 1707, the thruput phase algorithm is entered. This thruput phase algorithm has been described previously with reference to Embodiment III. After completing the thruput phase algorithm, control passes to BLOCK 1708. Here, the processing interval time is added to the phase accumulator and control is passed back up to BLOCK 1700.

At BLOCK 1712, a new shared phase is started (11000000). Control then passes into the shared phase algorithm at BLOCK 1713. This shared phase algorithm has been described previously with reference to Embodiment IV. BLOCK 1713 then passes control back to BLOCK 1700 where the regulating program waits for the end of the next interval. During the processing interval, the operating system uses the new resource access priorities.

APPENDIX A

```
             GLOBALS AND SETS

STMT      SOURCE STATEMENT                          F15OCT70    3/19/72

116      GENTABLE DSECT                             GFC        00760000

118+     TITLE 'J C M   TABLE'                                 PCF DSECX
```

PCE DSECT

```
STMT    SOURCE STATEMENT                                          F150C170    3/19/72

120+PCEDSECT DSECT             GFC TA

122+PCECHAIN DS      A   PCE CHAIN WORD                   GFC TA
123+PCETTT   DS      A   TTT POINTER IF ANY               GFC TA
124+PCECONT  DS      F   TOTAL PROCESS CONTENTION TIME    GFC TA
125+PCEIOTM  DS      F   TOTAL PROCESS I/O TIME           GFC TA
126+PCECPUTM DS      F   TOTAL PROCESS CPU TIME           GFC TA
127+PCECONTB DS      F   LAST BOUNDRY CONTENTION TOTAL    GFC TA
128+PCEIOB   DS      F   LAST BOUNDRY I/O TOTAL           GFC TA
129+PCECPUB  DS      F   LAST BOUNDRY CPU TOTAL           GFC TA
130+PCEIOJ   DS      F   JOB  BOUNDRY I/O TOTAL           GFC TA
131+PCECPUJ  DS      F   JOB  BOUNDRY CPU TOTAL           GFC TA
132+PCEJALRM DS      F   JOB SIGMA ALARM CLOCK VALUE      GFC TA
133+PCESALRM DS      F   STEP SIGMA ALARM CLOCK VALUE     GFC TA
134+PCESTAT  DS      3X .                PCE STATUS BYTES
135+PCEPRTY  DS      X .                 QCM PRIORITY
136+PCERESVD DC      F'0' .              RESERVED
137+PCENAME  DC      CL16' ' GFC PC

139+PCEEND   DS      OF GFC TA

141+*
142+*              FIRST PCE STATUS BYTE FLAG DEFINITIONS
143+*
144+PCEPRTYA EQU    X'80' .              QCM PRIORITY ACTIVE FLAG

QCMTABLE DSECT

STMT    SOURCE STATEMENT                                          F150C170    3/19/72

146+QCMTABLE DSECT  .
147+*- - - - - - - - - - - - - - - - - - - - - - - - - - - - -
148+*          Q  C  M     T  A  B  L  E
149+*- - - - - - - - - - - - - - - - - - - - - - - - - - - - -
150+TABSTART DS    0F .                  START OF TABLE
151+ICVTUSER DC    F'0' .                INSTALLATIONS CVTUSER FIELD
152+QCMSCODE DC    CL4'QCMS' .           Q C M   P A S S W O R D
153+         DC    C'FEE QCMTABLE EFE ' . MODULE IDENTIFIER
154+         DC    C'QCM - COPYRIGHT - DUQUESNE SYSTEMS, INC. 1970 FEE'

155+QCMECB   DC    F'0' .                Q C M   E C B
156+QSAVE    DC    18F'0' .              OS SAVE AREA
157+QPCETOP  DC    A(*-*) .              TOP OF FREE PCE CHAIN
158+QFREQTOP DC    A(PCEIST) .           FREE PCE QUEUE POINTER
159+QPCEBOT  DC    A(PCEIST-PCEEND+PCEDSECT) .
160+QMSPCE   DC    A(PCEMAS) .           ADDRESS OF MASTER SCHEDULER
161+QADROVHD DC    A(QOVHDTAB) .         ADDRESS OF THE OVERHEAD TABLE
162+QNUMOVHD DC    A((QOVHDEND-QOVHDTAB)/16) . NUMBER OF OVERHEAD ENTRIES
163+USERADDR DC    A(USERAREA) .         ADDRESS OF THE USER AREA
164+*- - - - - - - - - - - - - - - - - - - - - - - - - - - - -
165+*       I N I T I A L I Z A T I O N   H O O K   S A V E   A R E A S
166+*- - - - - - - - - - - - - - - - - - - - - - - - - - - - -
167+QCMECBA  DC    A(*-*) .              ADDRESS OF QCM STOP ECB
168+QDISADDR DC    A(*-*) .              ADDRESS OF DISPATCHER HOOK
169+QDISSAVE DC    CL12' ' .             DISPATCHER SAVE AREA
170+QENQADDR DC    A(*-*) .              ADDRESS OF I/O QUEUE HOOK
171+QENQSAVE DC    CL12' ' .             ENQUEUE SAVE AREA
172+QFSYSTCB DC    A(3+1+0+0+1) NUMBER OF SYSTCBS
173+QINTSAVE DC    F'0' .                INITIALIZATION SAVE AREA
174+QIONPSW  DC    2F'0' SAVE AREA FOR I/O NEW PSW
175+QMSTCB   DC    A(*-*) .              POINTER TO MASTER SCHEDULER TCB
176+QSIOSAVE DC    CL12' ' .             S I O   SAVE AREA
177+QSIOADDR DC    A(*-*) .              ADDRESS OF SIO HOOK
178+*- - - - - - - - - - - - - - - - - - - - - - - - - - - - -
179+*         S  P  I      C O N S T A N T S
180+*- - - - - - - - - - - - - - - - - - - - - - - - - - - - -
181+QCMSTART DC    A(TABSTART) .         ADDRESS OF START OF TABLE
182+QCMDISP  DC    A(X'0'-TABSTART) .ADDRESSES OF QCM
```

```
183+QCMEND   DC    A(TABLEND) .          ADDRESS OF THE END OF THE TABLE
184+MAINSTRT DC    A(0)
185+MAINDISP DC    A(0)
186+MAINEND  DC    A(0)
187+QADCUTAB DC    A(0)
188+QDEVLAST DC    A(0)
189+QMESSAGE DC    A(0)
190+SPIECB   DC    F'0' .                S P I   E C B
191+SPIEOD   DC    A(0)
192+SPILOGIT DC    A(0)
193+SPIRESET DC    A(0)
194+SPISTOP  DC    A(0)
195+SMONINTV DC    A(9600*4*1/2) SAVE AREA FOR MON INTVL
196+SPIUSERC DC    CL2'05' .       COMMAND MODULE NAME
197+SPIUSERM DC    CL2' ' .        NO USER M/S CONSOLE MODULE NAME
198+REPONOFF DC    X'FF' .               REP IS TURNED OFF
199+REPPRINT DC    X'80' .               REPPRINT SWITCH
200+SETONOFF DC    X'00' .               SET COMMAND IS DISABLED
201+         DC    X'00' .               RESERVED
202+** - - - - - - - - - - - - - - - - - - - - - - - - - - - - - -
203+**       M O N I T O R   C O N S T A N T S
204+** - - - - - - - - - - - - - - - - - - - - - - - - - - - - - -
205+MFREQTOP DC    A(TTTLIST) .          FREE TTT QUEUE POINTER
206+QACTINIT DC    F'0' .                ACTIVE INITIATOR COUNTER
207+QBELOWAI DC    F'0' .                BELOW MONITOR AND WAIT TIME
208+QBOT1    DC    A(0+1) .       NUMBER OF BOTTLE NECKS + 1
209+QJOBCONT DC    A(CONTABLE) .         ADDRESS OF JOB CONTROLLER TABLE
210+QIOLENGT DC    A(4*(0+0+0)) .NUMBER OF I/O TIMERS
211+QLOGINTV DC    A(9600*4*600) SPI LOG INTERVAL
212+QMONPRTY DC    AL1(16*7+11) .MONITORED PRIORITY
213+         DC    AL3(0) .              RESERVED
214+QMONTIME DC    F'0' .                MONITORED TASK TIME FOR PHASE
215+QNUMLCWS DC    A(*-*) .              NUMBER OF LOGICAL CHAN WORDS
216+QSELSUBI DC    A(0-11) .     SEL-SUB-CHAN INDEX CONVER FACTOR
217+QTIMENTR DC    A(TIMETBLE) .         ADDRESS OF THE TIME TABLE
218+Q24HRSTU DC    A(9600*4*1800*24) .24 HOURS IN TIMER UNITS
219+** - - - - - - - - - - - - - - - - - - - - - - - - - - - - - -
220+**       C O N T R O L   U N I T   I N D E X   T A B L E
221+** - - - - - - - - - - - - - - - - - - - - - - - - - - - - - -
222+TCUINDEX DC    (7*16)X'00' .         CONTROL UNIT INDICES
223+TARESRVD DC    7F'0' .               RESERVED WORDS
224+QTSCSUBS DC    A(0)
225+QTTIME   DC    A(0)
226+QTMPXRFS DC    A(0)
227+** - - - - - - - - - - - - - - - - - - - - - - - - - - - - - -
228+**       T A B L E   F O R   S T I M E R   E L E M E N T S
229+** - - - - - - - - - - - - - - - - - - - - - - - - - - - - - -
230+IQSTART  EQU   * .                   START OF TIMER Q TABLE
231+ILOGAGAI DC    3F'0'
232+IMONITOR DC    3F'0'
233+QMONITOR EQU   IMONITOR+4 .          ADDRESS OF MONITOR BRANCH IN COMM
234+ITIMTBLE DC    3F'0'
235+IQEND    EQU   * .                   END OF TIMER TABLE
236+IMAX     DC    0F'0',X'7FFFFFFF' . MAX TIMER VALUE
237+INTVLCUR DC    F'0' .                CURRENT TIMER REQUEST
238+** - - - - - - - - - - - - - - - - - - - - - - - - - - - - - -
239+**       S A F E   A R E A   F O R   E N A B L E   C O D E
240+** - - - - - - - - - - - - - - - - - - - - - - - - - - - - - -
241+         USING QCMTABLE,11 .
242+NSAFE    DS    0H .                  START OF THE SAFE AREA
243+         SSM   *+1 .                 ENABLE
244+         ORG   *-3 .
245+         DC    X'FF' ENABLE SWITCHES
246+         ORG   , .
247+         BR    15 .                  BRANCH TO MAINLINE
248+         DROP  11 .
249+**
250+TPCESTRT DC    0F'0',(PCECONTB-PCECHAIN)X'00' . FAKE STARTUP PCE
251+**
252+** - - - - - - - - - - - - - - - - - - - - - - - - - - - - - -
253+**       S   M   F       R E C O R D       O N E
254+** - - - - - - - - - - - - - - - - - - - - - - - - - - - - - -
255+         CNOP  2,4 .                 *
256+SMFREC1  DC    AL2(SMFEND1-*) .      **
257+SMFTYPE1 DC    A(131) .         ***
258+SMFTIME1 DC    F'0' .           **** THESE MUST BE ONE
259+SMFDATE1 DC    F'0' .           ***  GROUP FOR THE SMF
260+SMFSER11 DC    H'0' .           **   RECORD HEADER
261+SMFMODL1 DC    H'0' .           *
```

```
262+SMFREC1A  DC    A(SMFREC1) .          ADDRESS OF SMF RECORD 1
263+SMFREC2A  DC    A(SMFREC2) .          ADDRESS OF SMF RECORD 2
264+SMFEND2A  DC    A(SMFEND2) .          ADDRESS OF END OF SMF RECORD TWO
265+SPICHAA   DC    A(SPICHA1) .          ADDRESS OF FIRST CHANNEL
266+SPICHAE   DC    A(SPIMPX1+4) .        ADDRESS OF END OF ALL CHANNELS
267+SPICONA   DC    A(SPICON1) .          ADDRESS OF FIRST CONTROL UNIT ENTRY
268+SPIDEVA   DC    A(SPIDEV1) .          ADDRESS OF FIRST DEVICE ENTRY
269+SPIENDA   DC    A(SPIEND2) .          ADDRESS OF END OF SPI DATA
270+SPIMPXA   DC    A(SPIMPX1) .          ADDRESS OF FIRST MULTIPLEXOR ENTRY
271+SPIOVLA   DC    A(SPIOVL1) .          ADDRESS OF FIRST OVERLAY ENTRY
272+SPISUBA   DC    A(SPISUB1) .          ADDRESS OF FIRST SELECTOR SUB
273+QCM24HRS  DC    X'31703EF6' .         24 HOURS IN QCM TIMER UNITS
274+Q6HRS     DC    X'0C5C0FBD' .         SIX HOURS IN QCM TIMER UNITS
275+HRSCNVRT  DC    X'020F57E5',X'0008CA00',X'000025B0',X'00000060' .
276+HNSECRND  DC    X'00000030' .         5/1000 OF A SECOND IN QCM UNITS
277+QMONTELP  DC    F'0' .                MONITORED TASK ELAPSED TIME
278+QUNMTELP  DC    F'0' .                UNMONITORED TASK ELAPSED TIME
279+MCESTART  DS    0F .                  START OF CURRENT MODE CONT ELE
280+MCECHAIN  DC    A(0) .                POINTER TO NEXT MCE
281+MCETIME   DC    A(0) .                TIME OF MODE CHANGE
282+MCEINTVL  DC    A(0) .                MONITOR INTERVAL
283+MCESBIAS  DC    AL2(0) .              SHARED BIAS
284+MCETBIAS  DC    AL2(0) .              THRUPUT BIAS
285+MCENWEIG  DC    AL2(0) .              NUMERATOR FOR CPU WEIGHTING
286+MCEDWEIG  DC    AL2(0) .              DENOMINATOR FOR CPU WEIGHTING
287+MCEHOG    DC    A(0) .                HOG ANALYSIS VALUE
288+MCECPU    DC    A(0) .                MIN CPU TIME BEFORE RE-CALCU.
289+MCEIO     DC    A(0) .                MIN I/O TIME BEFORE RE-CALCU.
290+MCEDEGRA  DC    A(0) .                MIN DEGRADATION BEFORE DECRE M
291+MCETHRSH  DC    A(0) .                THRUPUT THRESHOLD
292+MCRESRVD  DC    2F'0' .               RESERVED
293+MCEEND    DS    0F .
294+MCELEN    EQU   MCEEND-MCESTART .     LENGTH OF A MODE CONTROL ELEMENT
295+SPIRSVRD  DC    3F'0' .               RESERVED AREA
296+QMPXTEST  DC    4F'0' .               MPX OFFSET BYTES CONTAINING
297+*                                     WORD COUNTS

299+IPLPCE    DS    0F .
300+          DC    A(*+PCEEND-PCEDSECT) .
301+          DC    (PCEJALRM-PCECHAIN-4)X'00' .
302+          DC    2F'0' .               BILL IPL PCE
303+          DC    (PCENAME-PCESALRM-4)X'00' .
304+          DC    CL8'BILL',CL8'IPL' .
305+          DC    (PCEEND-PCENAME-16)X'00' .
306+IPLCONT   EQU   IPLPCE+PCECONTB-PCEDSECT .
307+IPLCPUTM  EQU   IPLPCE+PCEIOB-PCEDSECT .
308+IPLIOTM   EQU   IPLPCE+PCECPUB-PCEDSECT .
309+CHECKSUM  EQU   IPLPCE+PCEIOJ-PCEDSECT .
310+RESPCE    DS    0F .
311+          DC    A(*+PCEEND-PCEDSECT) .
312+          DC    (PCEJALRM-PCECHAIN-4)X'00' .
313+          DC    F'0',F'-1' .          RESET      PCE
314+          DC    (PCENAME-PCESALRM-4)X'00' .
315+          DC    CL8'BILL',CL8'RESET' .
316+          DC    (PCEEND-PCENAME-16)X'00' .
317+RESCPU    EQU   RESPCE+PCECPUTM-PCEDSECT .
318+PCETIMER  EQU   RESPCE+PCECONTB-PCEDSECT .
319+PCEDATER  EQU   RESPCE+PCEIOR-PCEDSECT .
320+PCETIMEI  EQU   RESPCE+PCECPUR-PCEDSECT .
321+PCEDATEI  EQU   RESPCE+PCEIOJ-PCEDSECT .
322+WAITPCE   DS    0F .
323+          DC    A(*+PCEEND-PCEDSECT) .
324+          DC    (PCEJALRM-PCECHAIN-4)X'00' .
325+          DC    2F'-1' .              WAIT       PCE
326+          DC    (PCENAME-PCESALRM-4)X'00' .
327+          DC    CL8'WAIT',CL8'TIME' .
328+          DC    (PCEEND-PCENAME-16)X'00' .
329+WAITIO    EQU   WAITPCE+PCEIOTM-PCEDSECT .
330+WAITCPU   EQU   WAITPCE+PCECPUTM-PCEDSECT .
331+OVHDPCE   DS    0F .
332+          DC    A(*+PCEEND-PCEDSECT) .
333+          DC    (PCEJALRM-PCECHAIN-4)X'00' .
334+          DC    F'-1',F'0' .          OVERHEAD PCE
335+          DC    (PCENAME-PCESALRM-4)X'00' .
336+          DC    CL8'OVERHEAD',CL8' TOTAL' .
337+          DC    (PCEEND-PCENAME-16)X'00' .
338+OVHDCPU   EQU   OVHDPCE+PCECPUTM-PCEDSECT .
339+FSOPCE    DS    0F .
340+          DC    A(*+PCEEND-PCEDSECT) .
```

```
341+          DC      (PCEJALRM-PCECHAIN-4)X'00' .
342+          DC      F'-1',F'0' .           OVERHEAD PCE
343+          DC      (PCENAME-PCESALRM-4)X'00' .
344+          DC      CL8'ESOTERIC',CL8' TIME' .
345+          DC      (PCEEND-PCENAME-16)X'00' .
346+ESOCPU   EQU      ESOPCE+PCECPUTM-PCEDSECT .
347+***          T H I S   I S   T H E   E N D   O F   T H E   F I X E D       *
348+***          P O R T I O N   O F   T H E   T A B L E                       *
349+PCESYS   DS       0F .
350+          DC      A(*+PCEEND-PCEDSECT) .
351+          DC      (PCEJALRM-PCECHAIN-4)X'00' .
352+          DC      F'-1',F'0' .           OVERHEAD PCE
353+          DC      (PCENAME-PCESALRM-4)X'00' .
354+          DC      CL8'TRANS',CL8'AREAS' .
355+          DC      (PCEEND-PCENAME-16)X'00' .
356+          DS       0F .
357+          DC      A(*+PCEEND-PCEDSECT) .
358+          DC      (PCEJALRM-PCECHAIN-4)X'00' .
359+          DC      F'-1',F'0' .           OVERHEAD PCE
360+          DC      (PCENAME-PCESALRM-4)X'00' .
361+          DC      CL8'SYSTEM',CL8'ERRORS' .
362+          DC      (PCEEND-PCENAME-16)X'00' .
363+          DS       0F .
364+          DC      A(*+PCEEND-PCEDSECT) .
365+          DC      (PCEJALRM-PCECHAIN-4)X'00' .
366+          DC      F'-1',F'0' .           OVERHEAD PCE
367+          DC      (PCENAME-PCESALRM-4)X'00' .
368+          DC      CL8'COMM',CL8'TASK' .
369+          DC      (PCEEND-PCENAME-16)X'00' .
370+PCEMAS   DS       0F .
371+          DC      A(*+PCEEND-PCEDSECT) .
372+          DC      (PCEJALRM-PCECHAIN-4)X'00' .
373+          DC      F'-1',F'0' .           OVERHEAD PCE
374+          DC      (PCENAME-PCESALRM-4)X'00' .
375+          DC      CL8'MASTER',CL8'SCHEDULR' .
376+          DC      (PCEEND-PCENAME-16)X'00' .
377+NMASTEPS EQU      PCEMAS+PCENAME-PCEDSECT .

379+PCF1ST   DS       0F .

381+TTT1ST   DS       0F .
382+SMFEND1  DS       0H .
383+** - - - - - - - - - - - - - - - - - - - - - - - - - - - - - - -
384+**          S M F   R E C O R D   T W O
385+** - - - - - - - - - - - - - - - - - - - - - - - - - - - - - - -
386+          CNOP    2,4 .                  *
387+SMFREC2  DC       AL2(SMFEND2-*) .       **
388+SMFTYPE2 DC       A(131+1) .             ***
389+SMFTIMF2 DC       F'0' .                 **** THESE MUST BE ONE **
390+SMFDATE2 DC       F'0' .                 ***  GROUP FOR THE SMF **
391+SMFSERL2 DC       H'0' .                 **   RECORD HEADER
392+SMFMODL2 DC       H'0' .                 *
393+SPICHA1  DS       0H .                   START OF CHANNELS
394+          DC      (0+1)F'0' .   CHANNEL TABLE
395+SPISUB1  DS       0H .
396+          DC      (0)F'0' .
397+SPIMPX1  EQU      *-4 .
398+SPIOVL1  DS       0F .

400+SPICON1  DS       0F .

402+SPIDEV1  DS       0F .

404+SPIEND2  DS       0F
405+SMFEND2  DS       0F
406+TIMETBLE DS       0F

408+CONTABLE DS       0F
409+QOVHDTAB DS       0F
410+QOVHDEND DS       0F
411+USERAREA DS       0D
412+         DC       (0)F'0'
413+         DC       (0)X'00'
414+TABLEND  DS       0D
```

NEW MASTER                                                                IEBUPDTE LOG

```
              MACRO                                                         00020000
              CUDSECT                                                       00040000
                                                                      GFC   00060000
     CUENTRY  DSECT   .                                               GFC   00080000
     CUPCE    DS      A .     PCE TO BE CHARGED FOR CU TIME           GFC   00100000
     CUTTT    DS      A .     TTT TO BE CHARGED                       GFC   00120000
     CUTIME   DS      F .     TIME OF THE LAST CE INTERUPT            GFC   00140000
     CUPCECE  DS      A .     PCE CAUSING LAST CHANNEL END            GFC   00160000
     CUTTTCE  DS      A .     TTT CAUSING LAST CHANNEL END         GFC TM   00180000
     CUDEVSTR DS      A .     ADDR OF 1ST DEV FOR THIS CU             GFC   00200000
     CUSTATUS DS      F .     CONTROL UNIT STATUS                           00210000
     CUEXTRA  DS      F .     EXTRA WORD                              GFC   00220000
     CUTIMET  DS      F .     CU BILLABLE TIME SINCE RES              GFC   00240000
     CUTIMEC  DS      F .     CU CONTENTION TIME SINCE RES            GFC   00260000
     CUWAIT   DS      F .     WAIT TIME SINCE RESET                         00280000
     CUBOTTLE DS      H .     BOTTLENECK INDEX                              00300000
              DS      H .     SPARE                                         00320000
     CURESRX  DS      F .     RESERVED                                      00340000
     CURESRVD DS      F .     RESERVED                                GFC   00360000
     CUADDRS  DS      2F .                                            GFC   00380000
     CUEND    DS      0C .                                            JGC   00400000
     CULEN    EQU     CUEND-CUENTRY .                                       00420000
              MEND

MACRO                                                         00020000
              DEVDSECT                                                      00040000
                                                                      GFC   00060000
     DEVENTRY DSECT   .                                               GFC   00080000
     DEVPCE   DS      A .     CHARGEABLE PCE                          GFC   00100000
     DEVTTT   DS      A .     CHARGEABLE TTT                          GFC   00120000
     DEVTIME  DS      F .     TIME OF SIO                             GFC   00140000
     DEVPCESK DS      A .     PCE THAT SEEKED LAST                    GFC   00160000
     DEVTTTSK DS      A .     TTT THAT SEEKED LAST                    GFC   00180000
     DEVXTENT DS      AL1 .   THE EXTENT OF THE LAST SEEK             GFC   00200000
     DEVDEB   DS      AL3 .   DEB FOR ABOVE EXTENT                          00220000
     DEVSTAT  DS      F .     DEVICE STATUS WORD                            00240000
     DEVCYLIN DS      F .     SEEK CYLINDER ADDRESS                         00260000
     DEVTIMET DS      F .     TOTAL BILLABLE TIME SINCE RES           GFC   00280000
     DEVTIMEC DS      F .     SEEK CONTENTION TIME SINCE RES          GFC   00300000
     DEVWAIT  DS      F .     WAIT TIME SINCE RESET                   GFC   00320000
     DEBOTTLE DS      H .     BOTTLENECK INDEX                              00340000
     DEVPSUCH DS      H .     PSUEDO CHANNEL INDEX IF ANY                   00360000
     DEVSKTIM DS      F .     DEVICE SEEK TIME ACCUMULATION                 00380000
     DERESRVD DS      F .     RESERVED                                GFC   00400000
     DEVADDRS DS      2F .                                            GFC   00420000
     DEVEND   DS      0C .                                            JGC   00440000
     DEVLEN   EQU     DEVEND-DEVENTRY .                                     00460000
              MEND

MACRO                                                         00020000
              TTTDSECT                                                      00040000
                                                                            00060000
     TTTDSECT DSECT                                                         00080000
     TTTCHAIN DS      A       POINTER TO NEXT TTT                           00100000
     TTTTTT   DS      A       SELF POINTER/TTT IDENTIFIER                   00120000
     TTTTCB   DS      A       TASK'S TCB POINTER                            00140000
     TTTFACT  DS      F       CURRENT RELATIVE CPU FACTORE                  00160000
     TTTMFACT DS      F       QCM MULTIPATH CPU FACTOR                      00180000
     TTTCPU   DS      F       CPU TIME ACCUMULATOR FOR PRTY                 00200000
     TTTSPCPU DS      F       SHARED PHASE CPU TIME ACCUM.                  00220000
     TTTDEGRA DS      F       DEGRADATION TIME ACCUMULATOR                  00240000
     TTTIOMAX DS      A       ADDR OF PREVIOUS I/O MAX                      00260000
     TTTIOPR  DS      X       TASKS QCM I/O PRTY                            00280000
     TTTCPUPR DS      X       TASKS QCM CPU PRTY                            00300000
              DS      X                                                     00320000
              DS      X                                                     00340000
     TTTSPIO  DS      F       SHARED PHASE ACCUMULATOR                      00360000
     TTTIO    DS      F       I/O ACCUM. TABLE FOR ALL PATHS                00380000
              MEND

MACRO                                                         00020000
     &NAME    MMODE   &HRS,&MIN,&SEC,&ANAL,                                X00040000
                      &INTVL=0,                                            X00060000
                      &S=0,                                                X00080000
                      &T=0,                                                X00100000
                      &NCPUWT=0,                                           X00120000
                      &DCPUWT=0,                                           X00140000
                      &HOG=0,                                              X00160000
                      &MINCPU=0,                                           X00180000
                      &MINIO=0,                                            X00200000
                      &MINDEGR=0,                                          X00220000
                      &THRESH=0                                             00240000
```

```
.*  ------------------------------------------     00260000
.*           M M O D E                             00280000
.*  ------------------------------------------     00300000
.*                                                 00320000
.*       G B L A                                   00340000
.*                                                 00360000
        GBLA   &ANALCHK .                          00380000
        GBLA   &BILLUPS                            00400000
        GBLA   &GANAL(50)                          00420000
        GBLA   &GHRS(50)                           00440000
        GBLA   &GMIN(50)                           00460000
        GBLA   &GSEC(50)                           00480000
        GBLA   &MODE1 .                            00500000
        GBLA   &TIMEUPB                            00520000
        GBLA   &TTENT1 .                           00540000
.*                                                 00560000
.*       G B L C                                   00580000
.*                                                 00600000
        GBLC   &GDCPUWT(50)                        00620000
        GBLC   &GINTVL(50)                         00640000
        GBLC   &GHOG(50)                           00660000
        GBLC   &GMINCPU(50)                        00680000
        GBLC   &GMINDEG(50)                        00700000
        GBLC   &GMINIO(50)                         00720000
        GBLC   &GNCPUWT(50)                        00740000
        GBLC   &GS(50)                             00760000
        GBLC   >(50)                             00780000
        GBLC   >HRESH(50)                        00800000
        GBLC   >YPE(50)                          00820000
        GBLC   &MDCPUWT .                          00840000
        GBLC   &MHOG .                             00860000
        GBLC   &MINTVL .                           00880000
        GBLC   &MMINCPU .                          00900000
        GBLC   &MMINDEG .                          00920000
        GBLC   &MMINIO .                           00940000
        GBLC   &MNCPUWT .                          00960000
        GBLC   &MS .                               00980000
        GBLC   &MT .                               01000000
        GBLC   &MTHRESH .                          01020000
.*                                                 01040000
.*       B U M P  T H E  T I M E  T A B L E  E L E M E N T  01060000
.*                                                 01080000
&TTENT1 SETA   &TTENT1+1                           01100000
.*                                                 01120000
.*       S E T  T H E  C O M M O N  I N F O R M A T I O N   01140000
.*                                                 01160000
&GHRS(&TTENT1) SETA  &HRS                          01180000
&GMIN(&TTENT1) SETA  &MIN                          01200000
&GSEC(&TTENT1) SETA  &SEC                          01220000
>YPE(&TTENT1) SETC 'MODE' .                      01240000
.*                                                 01260000
.*       C H E C K  F O R  A N  A N A L Y S I S  G R O U P  01280000
.*                                                 01300000
        AIF    ('&ANAL' NE 'ANALYSIS').STDMODE     01320000
&GANAL(&TTENT1) SETA 01                            01340000
&ANALCHK SETA  &ANALCHK+1                          01360000
        AIF    (&ANALCHK LT 3).NORESET             01380000
&ANALCHK SETA  0                                   01400000
.NORESET ANOP                                      01420000
        AGO    .LOOPTST                            01440000
.STDMODE ANOP                                      01460000
&GANAL(&TTENT1) SETA 0                             01480000
        AIF    (&ANALCHK EQ 0).ANALOK              01500000
        MNOTE  0,'MONITOR ANALYSIS GROUP NOT SET OF 3'  01520000
&ANALCHK SETA  0                                   01540000
.ANALOK ANOP                                       01560000
.LOOPTST ANOP .                                    01580000
        AIF    (&MODE1 GT 0).NOINIT                01600000
.*                                                 01620000
.*       I N I T I A L I Z A T I O N               01640000
.*                                                 01660000
.*       T H E  L A S T  V A L U E  O F  E A C H  V A R I A B L E  01680000
.*                                                 01700000
.*       I S  S A V E D  A S  T H E  N E W  D E F A U L T  01720000
.*                                                 01740000
&MINTVL  SETC  '1/2'                               01760000
&MS      SETC  '4'                                 01780000
&MT      SETC  '12'                                01800000
&MNCPUWT SETC  '1'                                 01820000
```

```
&MDCPUWT SETC   '1'                                                  01840000
&MHOG    SETC   '1'                                                  01860000
&MMINCPU SETC   '3/8'                                                01880000
&MMINIO  SETC   '3/8'                                                01900000
&MMINDEG SETC   '1/10'                                               01920000
&MTHRESH SETC   '160/256'                                            01940000
.NOINIT  ANOP                                                        01960000
&MODE1   SETA   &MODE1+1                                             01980000
.*                                                                   02000000
.*       I N T V L                                                   02020000
.*                                                                   02040000
         AIF    ('&INTVL' EQ '0').NOINTVL .                          02060000
&MINTVL  SETC   '&INTVL'                                             02080000
.NOINTVL ANOP                                                        02100000
&GINTVL(&TTENT1) SETC   '&MINTVL'                                    02120000
.*                                                                   02140000
.*       S    F A C T O R                                            02160000
.*                                                                   02180000
         AIF    ('&S' EQ '0').NOS .                                  02200000
&MS      SETC   '&S'                                                 02220000
.NOS     ANOP                                                        02240000
         AIF    (&MS GE 1).GENSHAR                                   02260000
         MNOTE  255,'INVALID MODE MACRO - S MUST BE GE TO 1'          02280000
         MEXIT                                                       02300000
.GENSHAR ANOP                                                        02320000
&GS(&TTENT1) SETC   '&MS'                                            02340000
.*                                                                   02360000
.*       T    F A C T O R                                            02380000
.*                                                                   02400000
         AIF    ('&T' EQ '0').NOT .                                  02420000
&MT      SETC   '&T'                                                 02440000
.NOT     ANOP                                                        02460000
>(&TTENT1) SETC   '&MT'                                            02480000
.*                                                                   02500000
.*       N C P U W T                                                 02520000
.*                                                                   02540000
         AIF    ('&NCPUWT' EQ '0').NONCPUW .                         02560000
&MNCPUWT SETC   '&NCPUWT'                                            02580000
.NONCPUW ANOP                                                        02600000
&GNCPUWT(&TTENT1) SETC   '&MNCPUWT'                                  02620000
.*                                                                   02640000
.*       D C P U W T                                                 02660000
.*                                                                   02680000
         AIF    ('&DCPUWT' EQ '0').NODCPUW .                         02700000
&MDCPUWT SETC   '&DCPUWT'                                            02720000
.NODCPUW ANOP                                                        02740000
&GDCPUWT(&TTENT1) SETC   '&MDCPUWT'                                  02760000
.*                                                                   02780000
.*       H O G                                                       02800000
.*                                                                   02820000
         AIF    ('&HOG' EQ '0').NOHOG .                              02840000
&MHOG    SETC   '&HOG'                                               02860000
.NOHOG   ANOP                                                        02880000
&GHOG(&TTENT1) SETC   '&MHOG'                                        02900000
.*                                                                   02920000
.*       M I N C P U                                                 02940000
.*                                                                   02960000
         AIF    ('&MINCPU' EQ '0').NOMINCP .                         02980000
&MMINCPU SETC   '&MINCPU'                                            03000000
.NOMINCP ANOP                                                        03020000
&GMINCPU(&TTENT1) SETC   '&MMINCPU'                                  03040000
.*                                                                   03060000
.*       M I N I O                                                   03080000
.*                                                                   03100000
         AIF    ('&MINIO' EQ '0').NOMINIO .                          03120000
&MMINIO  SETC   '&MINIO'                                             03140000
.NOMINIO ANOP                                                        03160000
&GMINIO(&TTENT1) SETC   '&MMINIO'                                    03180000
.*                                                                   03200000
.*       M I N D E G R                                               03220000
.*                                                                   03240000
         AIF    ('&MINDEGR' EQ '0').NOMINDE .                        03260000
&MMINDEG SETC   '&MINDEGR'                                           03280000
.NOMINDE ANOP                                                        03300000
&GMINDEG(&TTENT1) SETC   '&MMINDEG'                                  03320000
.*                                                                   03340000
.*       T H R E S H                                                 03360000
.*                                                                   03380000
```

```
           AIF   ('&THRESH' EQ '0').NOTHRES .                      03400000
&MTHRESH  SETC  '&THRESH'                                          03420000
.NOTHRES  ANOP                                                     03440000
>HRESH(&TTENT1) SETC  '&MTHRESH'                                 03460000
           MEND                                                    03480000
*              O C M L O G I C    TEMPORARY UPDATE CARD            00000001
*                                                                  00020000
OCM  TITLE 'N U L L               DEFINE SYMBOL'                   00040000
           SPACE 10                                                00060000
           MACRO                                                   00080000
&NAME     NULL  &A                                                 00100000
&NAME     DS    0H                                                 00120000
           MEND                                                    00140000
     TITLE 'Q P O S T             QCM POST MACRO'                  00160000
           SPACE 10                                                00180000
           MACRO                                                   00200000
&NAME     QPOST &A                                                 00220000
&NAME     MVI   &A+1,X'F0'                                         00240000
           MEND                                                    00260000
     TITLE 'Q W A I T             QCM WAIT MACRO'                  00280000
           SPACE 10                                                00300000
           MACRO                                                   00320000
&NAME     QWAIT                                                    00340000
          B     COMMUTAT                                           00360000
           MEND                                                    00380000
     TITLE 'Q S T I M E R - MACRO   QCM SET TIMER'                 00400000
           SPACE 10                                                00420000
           MACRO                                                   00440000
&NAME     QSTIMER &TQE,&TIME                                       00460000
&NAME     MVC   &TQE+8,&TIME                              002      00480000
          QPOST &TIMER                                             00500000
           MEND                                                    00520000
     TITLE 'L O G I C             GLOBALS AND SETS'                00540000
           SPACE 10                                                00560000
           GBLC  &START                                            00580000
           GBLC  &SYS .          SYSTEM TYPE AVT OR MFT             00600000
           GBLC  &MMON .         MULTI-MODE MONITOR PARM            00620000
           GBLC  &SPI .          SYS PERFORMANCE INFO PARM          00640000
           GBLC  &JBA .          JOB BILLING INFO PARM              00660000
           SPACE 10 .                                              00680000
&START    SETC  '000000'                                           00700000
           START X'&START'                                         00720000
           COPYRITE                                                00740000
           GENTABLE DSECT                               GFC        00760000
           CUDSECT                                                 00780000
           DEVDSECT                                                00800000
           CHADSECT                                                00820000
           MPXDSECT                                                00840000
           TTTDSECT                                                00860000
           EJECT                                                   00880000
     TITLE 'M A I N L I N E       REGISTER DEFINITIONS'            00900000
           SPACE 10                                                00920000
           EQREG                                                   00940000
     TITLE 'M A I N L I N E       COMMUTATOR'GFC CO                00960000
           SPACE 10                                   GFC CO       00980000
OCMLOGIC  CSECT                                       GFC CO       01000000
           ENTRY CTIMTBLE                                          01020000
           ENTRY CLOGAGAI                                          01040000
           ENTRY CLOG                                              01060000
           ENTRY CRESET                                            01080000
           ENTRY CMONITOR                                          01100000
           ENTRY CMESSAGE                                          01120000
           ENTRY CONSTOP                                           01140000
           ENTRY CEOD                                              01160000
           ENTRY COMMUTAT                                          01180000
           ENTRY OCMLOGIC                                          01200000
           ENTRY OCMLDISP                                          01220000
           ENTRY OCMLEND                                           01240000
           ENTRY TSIOPET                                           01260000
           ENTRY TIONPSHA                              GFC IN      01280000
           ENTRY TINTRTN                               GFC IN      01300000
           ENTRY TSIO                                  GFC IN      01320000
           ENTRY TDISPTCH                              GFC IN      01340000
           ENTRY TDISCPY .                                         01360000
           ENTRY TDISCHD .                                         01380000
           ENTRY TMPXPES .                                         01390200
           ENTRY TSCSUBS .                                         01390400
           ENTRY TTIME .                                           01390600
```

```
               AIF    ('&MMON' NE 'YES'),NOMODEX .                          01400000
               ENTRY  XCPPROI                                               01420000
               ENTRY  XMONPPTY                                              01440000
.NOMODEX       ANOP .                                                       01460000
               EJECT                                                        01480000
               USING  OCMLOGIC,R12                                  GFC CO  01500000
               USING  OCMTABLE,R11                                  GFC CO  01520000
               DC     C'FEE OCMLOGIC FFF'                                   01540000
               DC     4C'XXX '                                              01560000
               DC     C'OCM - COPYRIGHT - BOOMESNE SYSTEMS, INC. 1970 ***'  01580000
               DC     4C'XXX '                                              01600000
CWAIT          NULL                                                 GFC CO  01620000
               WAIT   ECB=OCMECB                                    GFC CO  01640000
               SPACE  3                                             GFC CO  01660000
               MVI    OCMECB,0               RESET THE OCM ECB      GFC CO  01680000
               SPACE  3                                             GFC CO  01700000
COMMUTAT       DS     0H                                            GFC CO  01720000
               SPACE  2                                             GFC CO  01740000
CTIMTBLE       NOP    ATIMTBLE               TIME TABLE ROUTINE         CO  01760000
CLOGAGAI       NOP    LOGAGAIN               LOG A PERIODIC SPI LOG     004 CO 01780000
CLOG           NOP    LSPILOG                (CONSOLE CAUSED) SPI LOG GFC CO 01800000
CLOGSYNC       NOP    LOGSYNC                SYNC RESET SPI LOG OSTIMER   CO 01820000
CEOD           NOP    EOD                                                  01840000
CRESET         NOP    RSPIRES                SPI RESET ROUTINE       GFC CO 01860000
COCMRSET       NOP    RESETOCM .             OCM TOTAL RESET PROCESSOR     01880000
               AIF    ('&MMON' NE 'YES'),NOMONCOM .                         01900000
CMONITOR       NOP    MONITOR                OCM MULTIMODE TASK MONITOR CO 01920000
.NOMMCOM       AIF    ('&MMON' EQ 'YES'),CMESS                             01940000
CMONITOR       B      *+4 .                  NULL MONITOR ENTRY            01960000
.CMESS         ANOP .                                                      01980000
CMESSAGE       NOP    WTOG                   OCS EXTENTIONS WTO ROUTINE GFC CO 02000000
CONSTOP        NOP    STOP                   ST ROCK ROUTINE         GFC CO 02020000
CSTIMER        B      ISTIMER                INTERVAL TIMER ROUTINE  004 CO 02040000
               B      CWAIT                  RE T IS WAIT            GFC CO 02060000
         TITLE 'M A I N L I N E                TIMETABLE ROUTINE'          02080000
               SPACE 5                                                     02100000
ATIMTBLE       DS     0H                                                   02120000
               MVI    CTIMTBLE+1,0           RESET THE COMMUTATOR          02140000
               SPACE  3                                                    02160000
*************************************************************             02180000
*                                                                *         02200000
*        THIS SECTION DETERMINES THE TYPE OF TABLE ENTRY          *        02220000
*        AND PROCESSES ACCORDINGLY                                *        02240000
*                                                                *         02260000
*************************************************************             02280000
               L      R2,QTIMENTR            LOAD POINTER TO NEW ENTRY     02300000
               CLI    0(R2),3 .              IS IT A OCM RESET ELEMENT     02320000
               BE     OCMRESET .                                           02340000
               CLI    0(R2),2                IS IT A VALID TYPE CODE       02360000
               BE     ACOMMAND               YES, THEN GO TO COMMAND IF X'02' 02380000
               BH     ABADENTR               IF TOO BIG THEN AN ERROR      02400000
               AIF    ('&MMON' NE 'YES'),NOMODEC .                         02420000
*                                                                          02440000
*              MODE CONTROL ELEMENT SUBROUTINE                             02460000
               WTO    'OCM034I NEW MONITOR MODE STARTED' .                 02480000
               MVC    MCESTART(MCELEM),0(R2) MOVE IN THE NEW MCE           02490000
               SR     R0,R0                  INDICATE                      02500000
               ST     R0,MPHALEN             NEW                           02520000
               MVI    MSTATUS,MTHRUPUT       MODE                          02540000
               SPACE  2                                                    02560000
               OPOST  CLOG                   POST SPI LOG                  02580000
               SPACE  2                                                    02600000
               OPOST  CMONITOR               POST MULTI/MODE MONITOR       02620000
               SPACE  2                                                    02640000
               B      ATIME                  GO TO PROCESS NEXT TIME       02660000
.NOMODEC       AIF    ('&MMON' EQ 'YES'),MODECOD .                         02680000
               B      ABADENTR .             ERR BECAUSE MMON IS GEN'ED OFF 02700000
.MODECOD       ANOP .                                                      02720000
               SPACE  2                                                    02740000
ACOMMAND       DS     0H                                                   02760000
               SR     R0,R0                  ISSUE                         02780000
               LA     R1,8(,R2)              THE                           02800000
               SVC    34                     COMMAND                       02820000
               B      ATIME .                                              02840000
               SPACE  5 .                                                  02860000
***                                                                        02880000
*              O C M    R E S E T                                          02900000
***                                                                        02920000
               SPACE  3 .                                                  02940000
OCMRESET       DS     0H                                                   02960000
               OPOST  CLOGAGAI .             POST THE LOG AND SYNC ROUTINES 02980000
               OPOST  CRESET .               POST THE STANDARD RESET       03000000
```

```
             GPOST  COCMRSET .               POST THE TOTAL OCM RESET          03020000
ATIME        DS     OH                                                         03040000
             TIME   TU                                                         03060000
             L      R4,0(,R2)              GET NEXT TIME TABLE ENTRY           03080000
             ST     R4,UTIMENTP            STORE NEW ENTRY POINTER             03100000
             L      R3,4(,R4)              GET TIME OF NEXT EVENT              03120000
             CLR    R3,R0                  IS NEXT TIME IN SAVE DAY            03140000
             BE     ATIMTPLF               YES, RIGHT NOW DO IT                03160000
             BH     ANORMAL                YES, COMPUTE AND SET TIMER          03180000
*                                                                              03200000
*                   NEW DAY, OCM DELAYED OR TIME CHANGED BY OPERATOR           03220000
*                                                                              03240000
             CL     R3,4(,R2)              DID DAY CYCLE                       03260000
             BH     ATIMTBLE               NO, LOOP THRU TIME TABLE            03280000
*                                          UNTIL TIME IS RIGHT                 03300000
             L      R4,024HRSTU            LOAD MIDNITE                        03320000
             SLR    R4,R0                  COMPUTE TIME LEFT IN CUR DAY        03340000
             ALR    R3,R4                  ADD TIME INTO NEW DAY               03360000
             B      AUSTIMER               BR TO SET TIMER                     03380000
ANORMAL      DS     OH                                                         03400000
             SLR    R3,R0                  COMPUTE NEXT INTERVAL               03420000
AUSTIMER     DS     OH                                                         03440000
             ST     R3,AINTVL              STORE NEW INTERVAL                  03460000
             OSTIMER TTIMTBLE,AINTVL       SET OCM TIMER                       03480000
             SPACE  2                                                          03500000
             QWAIT                                                             03520000
ASAUENTR     DS     OH                                                         03540000
             WTO    'OCMO32I INCORRECT TIME-TABLE TYPE - TIME TABLE STOPPED'   03560000
             QWAIT                                                             03580000
AINTVL       DC     F'0'                                                       03600000
             TITLE  'M A I N L I N E                   PERIODIC SPI LOG' GFC LO 03620000
             SPACE  5                                                  GFC LO 03640000
LOGAGAIN     DS     OH                                                 GFC LO 03660000
             MVI    CLOGAGA1+1,0           RESET THE LOG               GFC LO 03680000
             QPOST  CLOGSYNC               POST THE LOG SYNC ROUT          LO 03700000
             CLI    MCESTART,X'01'         IS AN ANALYSIS GROUP RUNNING    LO 03720000
             BE     LOGSKIP                YES, SKIP PERIODIC LOG          LO 03740000
             B      LSPILOG                DO THE SPI LOG                     03760000
LOGSKIP      DS     OH                                                     LO 03780000
             QWAIT                         WAIT FOR NEXT PERIODIC SPI LOG  LO 03800000
             TITLE  'M A I N L I N E                         SPI LOG' JGC LS 03820000
LSPILOG      DS     OH                                               JGC LS 03840000
             USING  PCEDSECT,R1                                      003 LS 03860000
             USING  TSCSUBS,R5                                              03870000
             SSM    *+1                    DISABLE                   024 LS 03880000
             SR     R0,R0                  CLEAR R0                  024 LS 03900000
             LA     R1,TPCESTPT            LOAD POINTER TO STARTUP PCE 024 LS 03920000
             L      R2,PCECPUTM            GET THE STARTUP CPU TIME  024 LS 03940000
             ST     R0,PCECPUTM            ZERO THE STARTUP CPU TIME 024 LS 03960000
             LA     R1,ESTPCE              POINT TO THE ESOTERIC PCE 024 LS 03980000
             A      R2,PCECPUTM            ADD IN THE EXISTING CPU TIME 024 LS 04000000
             ST     R2,PCECPUTM            STORE T! THE ESOTERIC PCE 024 LS 04020000
             L      R5,QTSCSUBS .          GET ADDR OF SUBROUTINES FOR BASE 04030200
             BAL    RR,TTIME .             GET TIME IN R2                   04030400
             LH     R10,R11 .              LOAD TABLE BASE FOR SUBS         04030600
             LA     R2,16 .                SET THE MCT LOOP COUNTER         04030800
LMPXLOOP     DS     OH .                                                    04031000
             BAL    RR,TMPXRES .           UPDATE MPX ENTRIES               04031200
             BCT    R2,LMPXLOOP .          LOOP TILL DONE                   04031400
             SSM    *+1                    ENABLE                    024 LS 04040000
             ORG    *-3                                              024 LS 04060000
             DC     X'FF'                                            024 LS 04080000
             ORG    *                                                024 LS 04100000
             LA     R1,PCEMAS              POINT TO MASTER SCHEDULER PCE 003 LS 04120000
             LR     R2,R1                  SAVE THE HIGHEST PCE ADDRESS  003 LS 04140000
             L      R1,PCECHAIN            GET THE FIRST PCE POINTER     003 LS 04160000
LPCELOOP     DS     OH                                                   003 LS 04180000
             LTR    R1,R1                  CHECK IF THIS IS LAST PCE     003 LS 04200000
             BZ     LPCEDONE               IF SO GO STORE SMF RECORD LENG 003 LS 04220000
             CR     R2,R1                  CHECK IF THIS PCE HAS HIGHER A 003 LS 04240000
             BH     LPCENEXT               IF NOT GET NEXT PCE           003 LS 04260000
             LR     R2,R1                  IF SO SAVE THIS ADDRESS       003 LS 04280000
LPCENEXT     DS     OH                                                   003 LS 04300000
             L      R1,PCECHAIN            GET NEXT PCE                  003 LS 04320000
             B      LPCELOOP               BRANCH TO LOOP AGAIN          003 LS 04340000
LPCEDONE     DS     OH                                                   003 LS 04360000
             LA     R2,(PCEEND-PCEDSECT)(,R2) POINT TO END OF LAST PCE 003 LS 04380000
             DROP   R1                                                   003 LS 04400000
             SL     R2,SMFRECLA            GET SMF RECORD LENGTH         003 LS 04420000
             STH    R2,SMFRECL             STORE SMF RECORD LENGTH       003 LS 04440000
```

```
             TIME    BIN                    GET TIME IN HUNDREDTHS              JGC LS 04440000
             STM     R0,R1,SMFTIME1         STORE IN SMFREC1                    JGC LS 04480000
             L       R3,SMFRFC2A            LOAD POINTER TO SECOND REC          015 LS 04500000
SMFTIME2     EQU     SMFTIME2-SMFREC2       DISPLACEMENT TO THE TIME 2          015 LS 04520000
             LA      R3,SMFTIME2(,R3)       JUST TO MAKE THE ASSEMBLER WORK15 LS 04540000
             STM     R0,R1,0(,R3)           STORE IN SMFREC2                    015 LS 04560000
             SMFWTM  SMFREC1                WRITE THE SMF RECORD                JGC LS 04580000
             L       R1,SMFRFC2A            LOAD POINTER TO SMF REC 2           JGC LS 04600000
             SMFWTM  (R1)                   WRITE THE SMF RECORD                JGC LS 04620000
             SR      R0,R0                  ZERO                                    04640000
             ST      R0,OMONTELP             MONITORED TASK ELAPSED SEC             04660000
             ST      R0,OUNMTELP             UNMON TASK ELAPSED SEC                 04680000
             MVI     CLOG+1,0               RESET COMMUTATOR ENTRY              JGC LS 04700000
             CWAIT                                                                  LS 04720000
             TITLE   'M A I N L I N E       SPI LOG SYNC ROUTINE'                   04740000
             SPACE 5                                                                04760000
LOGSYNC      DS      OH                                                             04780000
             MVI     CLOGSYNC+1,0           RESET COMMUTATOR ENTRY                  04800000
             TIME    TU                     GET TIME IN TIMER UNITS                 04820000
             SRDL    R0,32                  SET UP TIME FOR DEVIDE                  04860000
             L       R3,OLOGINTV            COMPUTE                                 04880000
             DR      R0,R3                    THE NEW SYNCED                        04900000
             SLR     R3,R0                    LOG INTERVAL                          04920000
             ST      R3,LOGINTVL            STORE NEXT INTERVAL                     04940000
             LR      R2,R0                  SAVE THE DELTA                          04950000
             OSTIMER ILOGAGAI,LOGINTVL      SET NEW OSTIMER                         04960000
             SPACE 3                                                                04980000
*                                                                                   05000000
*                                                                                   05020000
*            THE NEXT SECTION ASSUMES THAT THE TIME TABLE                           05040000
*            OSTIMER GOES OFF ON TIME                                               05060000
*                                                                                   05080000
             SPACE 3                                                                05090000
             L       R0,INTVLCUR            IS THE                                  05100000
             LTR     R0,R0                    TIMER RUNNING                         05120000
             BNZ     LOGWAIT                YES, WAIT                               05140000
LTIMTBLE     DS      OH                                                             05160000
             L       R0,ITIMTBLE            GET CURRENT DELTA                       05180000
             LTR     R0,R0                  IS TABLE ROUTINE RUNNING                05200000
             BZ      LOGWAIT                NO, WAIT                                05220000
             CL      R2,ITIMTBLE            CAN TIME TABLE BE CORRECTED             05241000
             BNL     LOGWAIT                NO, BR                                  05242000
             L       R1,ITIMTBLE            YES, CORRECT                            05243000
             SLR     R1,R2                    THE REMAINING TIME                    05244000
             ST      R1,ITIMTBLE            STORE IT IN TIME 0 ELEMENT              05300000
LOGWAIT      DS      OH                                                             05320000
             CWAIT                                                                  05340000
             SPACE 3                                                             LO 05360000
LOGINTVL     DC      F'0'                                                        LO 05380000
             TITLE   'M A I N L I N E                 SPI RESET ROUTINE'JGC RS 05400000
PSPIRES      DS      OH                                                      JGC RS 05420000
*                                                                            JGC RS 05440000
RPCE         EQU     R10                                                     JGC RS 05460000
             SSM     *+1                    DISABLE                          JGC RS 05480000
             USING   PCEDSECT,RPCE                                           JGC RS 05500000
             L       R2,IPLIOTM             LOAD LAST IO DELTA               JGC RS 05520000
             L       R3,IPLCPUTM            LOAD LAST CPU DELTA              JGC RS 05540000
             L       R4,IPLCONT             LOAD LAST CONT DELTA             JGC RS 05560000
             TIME    TU                     GET TIME IN TIME UNITS           JGC RS 05580000
             SRL     R0,2                   CONVERT TO 104.1667 USEC UNITSJGC RS 05600000
             ST      R1,PCEDATER            STORE RESET DATE                 JGC RS 05620000
             ST      R0,PCETIMER            STORE RESET TIME OF DAY          JGC RS 05640000
             XC      WAITIO,WAITIO          ZERO WAIT I/O TIME               008 RS 05660000
             XC      WAITCPU,WAITCPU        ZERO WAIT CPU TIME               008 RS 05680000
             LA      RPCE,OVHDPCE           POINT TO OVERHEAD PCE            JGC RS 05700000
PFSPCEL      DS      OH                                                      JGC RS 05720000
             L       RPCE,PCECHAIN          POINT TO NEXT PCE                JGC RS 05740000
             LTR     RPCE,RPCE              TEST FOR ZERO ADDRESS            JGC RS 05760000
             BZ      RESPCEND               GO TO END WHEN DONE              JGC RS 05780000
             L       R1,PCEJALRM            GET PROD/OVHD POINTER            008 RS 05800000
             LTR     R1,R1                  TEST POINTER                     JGC RS 05820000
             BM      RESPCEOV               BRANCH IF OVERHEAD               JGC RS 05840000
             AL      R2,PCEIOTM             ADD                              JGC RS 05860000
             AL      R3,PCECPUTM              PRODUCTIVE                     JGC RS 05880000
             AL      R4,PCECONT                 TIMES                        JGC RS 05900000
*                                                                            JGC RS 05920000
             L       R1,PCEIOB                                               JGC RS 05940000
```

```
         SL    R1,PCEIOTM          ZERO                                  JGC RS 05960000
         ST    R1,PCEIOB                                                 JGC RS 05980000
*                                                                        JGC RS 06000000
         L     R1,PCECPUB                                                JGC RS 06020000
         SL    R1,PCECPUTM         PRODUCTIVE                            JGC RS 05040000
         ST    R1,PCECPUB                                                JGC RS 06060000
*                                                                        JGC RS 06080000
         L     R1,PCECONTB                                               JGC RS 06100000
         SL    R1,PCECONT                          TIMES                 JGC RS 06120000
         ST    R1,PCECONTB                                               JGC RS 06140000
*                                                                        JGC RS 06160000
         L     R1,PCEIOJ                                                 JGC RS 06180000
         SL    R1,PCEIOTM                                                JGC RS 06200000
         ST    R1,PCEIOJ                                                 JGC RS 06220000
*                                                                        JGC RS 06240000
         L     R1,PCECPUJ                                                JGC RS 06260000
         SL    R1,PCECPUTM                                               008 RS 06280000
         ST    R1,PCECPUJ                                                JGC RS 06300000
*                                                                        JGC RS 06320000
RESPCEDV DS    0H                                                        JGC RS 06340000
         XC    PCEIOTM(4),PCEIOTM  ZERO                                  JGC RS 06360000
         XC    PCECPUTM(4),PCECPUTM     OVERHEAD                         JGC RS 06380000
         XC    PCECONT(4),PCECONT       TIMES                            JGC RS 06400000
         B     RESPCEL             GO TO GET NEXT PCE                    JGC RS 06420000
RESPCEND DS    0H                                                        JGC RS 06440000
         ST    R2,IPLIOTM          STORE                                 JGC RS 06460000
         ST    R3,IPLCPUTM         IPL                                   JGC RS 06480000
         ST    R4,IPLCONT          CONSTANTS                             JGC RS 06500000
RESCHA   DS    0H                  * * * CHANNEL RESETTING               JGC RS 06520000
         USING CHADSECT,RPCE                                             JGC RS 06540000
         L     RPCE,SPICHAA        POINT TO FIRST CHANNEL                JGC RS 06560000
RESCHAL  DS    0H                                                        JGC RS 06580000
         XC    CHANTIME(4),CHANTIME ZERO CHANNEL TIME                    JGC RS 06600000
         LA    RPCE,CHANLEN(,RPCE)  POINT TO NEXT CHANNEL                JGC RS 06620000
         C     RPCE,SPICHAE        TEST IF DONE                                 06640000
         BL    RESCHAL             IF NOT LOOP AGAIN                     JGC RS 06660000
RESMPX   DS    0H .                                                             06680000
         USING MPXDSECT,RPCE .                                                  06700000
         L     R5,QTSCSUBS .       GET ADDR OF SUBROUTINES FOR BASE             06700200
         BAL   R8,TTIME .          GET THE TIME IN R0                           06710400
         LA    R2,16 .             SET UP BCT LOOP COUNTER                      06720000
         LA    R3,QMPXTEST .       LOAD THE ADDRESS OF THE MPX TABLE            06740000
         SR    R4,R4 .             CLEAR THE INDEX REGISTER                     06760000
MPXLOOP  DS    0H .                                                             06780000
         SR    RPCE,RPCE .         CLEAR THE DSECT BASE REG                     06800000
         IC    RPCE,0(R4,R3) .     GET THE MPX ENTRY OFFSET                     06820000
         LA    R4,1(,R4) .         BUMP INDEX REG FOR NEXT LOOP                 06840000
         LTR   RPCE,RPCE .         TEST IF INDEX IS ZERO                        06860000
         BZ    MPXDONE             IF ZERO - SKIP THIS CHANNEL                  06880000
         SLL   RPCE,2 .            MULTIPLY BY FOUR                             06900000
         A     RPCE,SPIMPX4 .      ADD DISPLACEMENT TO BASE ADDRESS             06920000
         LH    R1,MPXMAX .         GET THE COUNT OF TIMERS LESS ONE             06940000
         SLL   R1,2 .              MULTIPLY BY FOUR TO GET BYTES                06960000
         LA    R1,3(,R1) .         ADD THE OTHER TIMER LESS ONE BYTE            06980000
         ST    R0,MPXCLOCK .       STORE THE PRESENT CLOCK TIME                 06990000
         EX    R1,MPXCLEAR .       EXECUTE THE ZERO OF THE TIMERS               07000000
MPXDONE  DS    0H .                                                             07020000
         BCT   R2,MPXLOOP .        LOOP AGAIN TILL DONE                         07040000
RESOVL   DS    0H .                                                             07060000
*                                                                               07080000
*        INSERT TWO OVERLAP STATE TABLE RESET CODE HERE                         07100000
*                                                                               07120000
RESCON   DS    0H                  * * * CONTROL UNIT PROCESSING         JGC RS 07140000
         USING CUENTRY,PPCE                                              JGC RS 07160000
         L     RPCE,SPICONA        LOAD FIRST CONTROL UNIT               JGC RS 07180000
         LA    R2,RESLOOP          LOAD PSEUDO BAL REG                   JGC RS 07200000
RESCONDE DS    0H                                                        JGC RS 07220000
         XC    CUTIMET(4),CUTIMET  ZERO                                  JGC RS 07240000
         XC    CUTIMEC(4),CUTIMEC       CON OR DEV                       JGC RS 07260000
         XC    CUWAIT(4),CUWAIT         TIMES                            JGC RS 07280000
         LA    RPCE,CULEN(,RPCE)   GET NEXT UNIT                         JGC RS 07300000
         BR    R2                  RETURN TO CALLER                      JGC RS 07320000
RESLOOP  DS    0H                                                        JGC RS 07340000
         C     RPCE,SPIDEVA        COMPARE IF DONE                       JGC RS 07360000
         BL    RESCONDE            IF NOT LOOP AGAIN                     JGC RS 07380000
RESDEV   DS    0H                  * * * DEVICE PROCESSING               JGC RS 07400000
         L     RPCE,SPIDEVA        POINT TO DEVDSECT                     JGC RS 07420000
RESDEVL  DS    0H                                                        JGC RS 07440000
         BAL   R2,RESCONDE         PROCESS DEVICES                       JGC RS 07460000
         C     RPCE,SPIENDA        CHECK IF DONE                         017 RS 07480000
         BL    RESDEVL             NO, GET NEXT DEVICE                   JGC RS 07500000
*                                  * * * RESETS NOW COMPLETED            JGC RS 07520000
```

```
            MVI     CRESET+1,0                                      JGC RS 07540000
            SSM     *+1                      E N A B L E            JGC RS 07560000
            ORG     *-3                                             JGC RS 07580000
            DC      X'FF'                                           JGC RS 07600000
            ORG     *                                               JGC RS 07620000
            QWAIT                                                       RS 07640000
            USING   MPXDSECT,PPCB..                                        07660000
MPXCLEAR    DS      0H .                                                   07680000
            XC      MPXTIMES(1),MPXTIMES . CLEAR THE TIMERS                07700000
            DROP    RPCE                                            JGC RS 07720000
            DROP    R5                                                     07730000
   TITLE 'M A I N L I N E                    QCM RESET ROUTINE'            07740000
            SPACE 5 .                                                      07760000
RESETQCM    DS      0H .                                                   07780000
            MVC     PCEDATE1,PCEDATER . RESET THE QCM DATE                 07800000
            MVC     PCETIME1,PCETIMER . RESET THE QCM TIME                 07820000
            XC      IPLCONT(4),IPLCONT .RESET THE DEGRADATION ACCUM        07840000
            XC      IPLCPUTM(4),IPLCPUTM RESET THE CPU TIME ACCUM          07860000
            XC      IPLIOTM(4),IPLIOTM .RESET THE I/O TIME ACCUM           07880000
            MVI     CQCMRSET+1,0 .     RESET THE COMMUTATOR                07900000
            QWAIT                                                          07920000
   TITLE 'M A I N L I N E                    QCM STOP ROUTINE'GFC ST 07940000
            SPACE 10                                             GFC ST 07960000
            SPACE 5                                                 ST 07980000
STOP        DS      0H                                           GFC ST 08000000
CVTUSER     EQU     204                                                 08020000
CVTHEAD     EQU     X'A0'                                        009 ST 08040000
            SSM     *+1                      DISABLE                    08060000
*                                                                       08080000
            MVC     120(8,0),QIONPSW    RESTORE THE ORIGINAL     010 ST 08100000
*                                       I/O NEW PSW              010 ST 08120000
*                                                                       08140000
            L       R1,QSIOADDR         RESTORE THE                     08160000
            MVC     0(12,R1),QSIOSAVE   SIO ROUTINE                     08180000
*                                                                       08200000
            L       R1,QDISADDR         RESTORE THE                     08220000
            MVC     0(12,R1),QDISSAVE    DISPATCHER                     08240000
*                                                                       08260000
            AIF     ('&MMON' NE 'YES').NOQRES .                         08280000
            L       R1,QFNQADDR         RESTORE NORMAL                  08300000
            MVC     0(12,R1),QENQSAVE    OS PRIORITY ENQUEUING          08320000
*                                                                    ST 08340000
.NOQRES     ANOP .                                                      08360000
            QCVTULF R4,R5,QCM$,STCBUSER . GET QCM CVTUSER LINK           08400000
            MVC     0(4,R4),0(R5) .     REMOVE QCM FROM THE CHAIN       08420000
STCBUSER    DS      0H .                                                08440000
            L       R1,16 .             LOAD CVT POINTER                08460000
            L       R2,CVTHEAD(,R1)     LOAD PTR TO FIRST TCB    009 ST 08500000
            SR      R3,R3               ZERO WORK REG            009 ST 08520000
STCBZERO    DS      0H                                           009 ST 08540000
            ST      R3,TCBUSER(,R2)     ZERO PCE/TTT POINTER     009 ST 08560000
            L       R2,TCBTCB(,R2)      GET NEXT TCB             009 ST 08580000
            LTR     R2,R2               END                      009 ST 08600000
            BNZ     STCBZERO            NO, ZERO THIS TCBUSER    009 ST 08620000
            SSM     *+1 .               ENABLE                          08621000
            ORG     *-3 .               ENABLE                          08622000
            DC      X'FF' .             ENABLE                          08623000
            ORG     * .                 ENABLE                          08624000
            L       R13,QSAVE+4         STANDARD                 GFC ST 08640000
            LM      R14,R12,12(R13)      OS                      GFC ST 08660000
            SR      R15,R15 .           ZERO COMPLETION CODE            08680000
            BR      R14                 RETURN                   GFC ST 08700000
   TITLE 'M A I N L I N E                           END OF DAY' GFC EN 08720000
            SPACE 5                                              GFC EN 08740000
EOD         DS      0H                                           GFC EN 08760000
            POST    SPIECB              POST EOD COMMAND PROCESSOR GFC EN 08780000
            MVI     CEOD+1,0            RESET THE COMMUTATOR     GFC EN 08800000
            QWAIT                                                    EN 08820000
   TITLE 'M A I N L I N E                MULTI/MODE TASK MONITOR' GFC MT 08840000
            SPACE 5                                              GFC MT 08860000
*****************************************************************000 MT 08880000
*                                                                *000 MT 08900000
* THE TASK MONITOR REARRANGES THE DISPATCHING ORDER OF           *000 MT 08920000
* EXECUTING TASKS TO IMPROVE BOTH THRUPUT AND TURNAROUND.        *000 MT 08940000
* REARRANGEMENT OCCURS AT THE END OF EVERY SMONINTV INTERVAL.    *000 MT 08960000
*                                                                *000 MT 08980000
*****************************************************************000 MT 09000000
            SPACE 5                                              000 MT 09020000
*                                                                000 MT 09040000
```

```
*              MONITOR EQU'S                                    000 MT 09060000
*                                                               000 MT 09080000
          SPACE 2                                               000 MT 09100000
MTTCHAIN  EQU     TTTCHAIN-TTTDSECT                                    09120000
MTTTTT    EQU     TTTTTT-TTTDSECT                                      09140000
MTTFACT   EQU     TTTFACT-TTTDSECT                                     09160000
MTTMFACT  EQU     TTTMFACT-TTTDSECT                                    09180000
MTTCPU    EQU     TTTCPU-TTTDSECT                                      09200000
MTTSPCPU  EQU     TTTSPCPU-TTTDSECT                                    09220000
MTTDEGRA  EQU     TTTDEGRA-TTTDSECT                                    09240000
MTTIOPR   EQU     TTTIOPR-TTTDSECT                                     09260000
MTTCPUPR  EQU     TTTCPUPR-TTTDSECT                                    09280000
MTTIOMAX  EQU     TTTIOMAX-TTTDSECT                                    09300000
MTTSPIO   EQU     TTTSPIO-TTTDSECT                                     09320000
ATTIO     EQU     TTTIO-TTTDSECT                                       09340000
          SPACE 2                                                      09360000
*                 FIRST MONITOR STATUS BYTE -- PHASE INDICATOR          09380000
MTHRUPUT  EQU     X'80'             THRUPUT PHASE INDICATOR            09400000
MSHARED   EQU     X'40'             SHARED PHASE INDICATOR             09420000
MCHANGE   EQU     X'20'             PHASE CHANGE INDICATOR             09440000
*                 SECOND MONITOR STATUS BYTE                           09460000
MIOHOGFD  EQU     X'80'             I/O HOG FOUND INDICATOR            09480000
MULTIIO   EQU     X'40'             MULTI PATH I/O TASK INDICATOR      09500000
MPUREPCU  EQU     X'20'             PURE CPU BOUND TASK INDICATOR      09520000
MCPULIM   EQU     X'10'             CPU BOUND WITH I/O INDICATOR       09540000
          SPACE 2                                                      09560000
MNOTTT    EQU     X'80'             INSUFFICIENT TTTS FLAG             09580000
          SPACE 3                                                      09600000
          USING   TTTDSECT,R4                                          09620000
          USING   PCEDSECT,R1 .                                        09621000
          EJECT                                                        09640000
          AIF     ('&MMON' NE 'YES').NOMMON .                          09660000
***************************************************************       09680000
*                                                           *          09700000
*         THIS FIRST PART OF THE MONITOR DETERMINES IF IT   *          09720000
*         SHOULD STOP.  TWO CONDITIONS ARE TESTED EITHER    *          09740000
*         ONE OF WHICH WILL CAUSE THE MONITOR TO STOP. THE  *          09760000
*         FIRST IS MODE SHUT OFF, AND THE SECOND IS NO      *          09780000
*         ACTIVE INITITATORS.                               *          09800000
*                                                           *          09820000
***************************************************************       09840000
          SPACE 5                                                      09860000
MONITOR   DS      0H                                                   09880000
          MVI     CMONITOR+1,0      RESET THE MONITOR'S COMU ENTRY     09900000
          L       R0,MCFINTVL       LOAD MONITOR INTERVAL              09920000
          LTR     R0,R0             IS IT AN OFF MODE                  09940000
          BNP     MONOFF            YES BR TO TURN OFF                 09960000
          L       R0,JACTINIT       LOAD ACTIVE INIT COUNT             09980000
          LTR     R0,R0             ARE ANY INITS ACTIVE               10000000
          BP      MONSTIME          YES BR TO SET TIMER AGAIN          10020000
MONOFF    DS      0H                                                   10040000
          BAL     R14,MFREETTS      FREE ALL ACTIVE TTT'S              10060000
          SPACE 1 .                                                    10080000
          SSM     *+1 .             D I S A B L E                      10100000
          SPACE 1 .                                                    10120000
          L       R2,OMSTCB         PREPARE TO ZERO ALL TTT PTRS       10140000
MONKILL   DS      0H .                                                 10160000
          L       R2,TCPTCBL(R2) .  GET THE NEXT LOWER TCB             10180000
          LTR     R2,R2 .           END OF THE CHAIN                   10200000
          BZ      MKILDONE .        YES, BR                            10220000
          BAL     R14,MUNMON .      ZERO TTT PTR IF ANY                10240000
          B       MONKILL .         PROCESS ALL TASKS                  10260000
MKILDONE  DS      0H .                                                 10280000
          SPACE 1 .                                                    10300000
          SSM     *+1 .             ENABLE                             10320000
          ORG     *-3 .             ENABLE                             10340000
          DC      X'05' .           ENABLE                             10360000
          ORG     , .               ENABLE                             10380000
          SPACE 1 .                                                    10400000
          MVI     MSTATUS+1,0       ZERO TASK INDICATOR STATUS BYTE    10420000
          OWAIT                     WAIT UNTILL REVIVED                10440000
          EJECT                                                        10460000
***************************************************************       10480000
*                                                           *          10500000
*         THIS SECTION SETS THE TIMER FOR THE NEXT MONITOR INTVL,*     10520000
*         DISABLES AND DETERMINES IF A PHASE CHANGE IS REQUIRED. *     10540000
*                                                           *          10560000
***************************************************************       10580000
```

```
              SPACE 5                                                        10600000
MINGTIME      DS    OH                                                       10620000
              OSTIMER IMONITOR,MCEINTVL  SET NEXT MONITOR INTERVAL           10640000
                                                                             10660000
              SPACE 2                                                        
              SSM   *+1                  DISABLE                             10680000
              SPACE 2                                                        10700000
              L     R0,QMONTIME          LOAD THE TIME GIVEN TO              10720000
*                                        MONITORED TASKS DURING PHASE        10740000
              AL    R0,QBELOWAI          ADD THE TIME USED BY TASKS          10760000
*                                        BELOW THE MONITOR                   10780000
*                                         AND THE TOTAL WAIT TIME            10800000
*                                         FOR THE PHASE                      10820000
*****                                    THIS SUM IS THE TOTAL TIME          10840000
*                                        AVAILABLE TO MONITORED TASKS        10860000
              CL    R0,MPHALEN           IS PHASE OVER                       10880000
              BL    MTCBSRCH             NO, SEARCH TCB CHAIN                10900000
              TM    MSTATUS,MTHRUPUT     WAS LAST PHASE THRUPUT              10920000
              BZ    MGUARANT             NO, BR TO GUARANTEE SERVICE         10940000
              NI    MSTATUS,255-MTHRUPUT TURN OFF THRUPUT BIT                10960000
MSTARTSH      DS    OH                                                       10980000
              CI    MSTATUS,MSHARED+MCHANGE START NEW SHARED PHASE           11000000
              B     MZEROPHA             BR TO ZERO PHASE CLOCKS             11020000
MGUARANT      DS    OH                                                       11040000
              L     R4,MLASTTT           LOAD PTR TO LAST TTT WHEN THE       11060000
*                                        SHARED PHASE STARTED                11080000
              LTR   R4,R4                IS TASK STILL ACTIVE                11100000
              BZ    MTESTHPH             NO, BR                              11120000
              SL    R0,QMONTIME          SUBTRACT MONITORED SERVICE          11140000
              AL    R0,TTTCPU            ADD TIME GIVEN                      11160000
              AL    R0,TTTSPCPU           TO THIS TASK                       11180000
MGUARADD      DS    OH                                                       11200000
              L     R4,TTTCHAIN          GET NEXT LOWER TTT                  11220000
              LTR   R4,R4                END OF CHAIN                        11240000
              BZ    MGUARTST             YES BR TO EFFECT SHARE TEST         11260000
              AL    R0,TTTCPU            ADD CPU SERVICE OF LOWER TTT        11280000
              B     MGUARADD             DO FOR ALL LOWER TTTS               11300000
MGUARTST      DS    OH                                                       11320000
              CL    R0,MCECPU            WAS LAST TASK GIVEN SUFFICIENT      11340000
*                                        CHANCE FOR CPU SERVICE              11360000
              BL    MTCBSRCH             NO, STAY IN SHARED PHASE UNTIL      11380000
*                                        GUARANTEE IS MET                    11400000
MTESTHPH      DS    OH                                                       11420000
              CL    R4,MTHRULEN          NO THRUPUT PHASE                    11440000
              BE    MSTARTSH             YES, START NEW SHARED PHASE         11460000
              TM    MSTATUS+1,MULTIIO    IS THERE A MULTI PATH I/O TASK      11480000
              BO    MSTARTHR             YES, START THRUPUT PHASE            11500000
              TM    MSTATUS+1,MCPULIM    IS THERE A CPU LIMITED TASK         11520000
              BO    MSTARTHR             YES, START THRUPUT PHASE            11540000
              B     MSTARTSH             NO, SKIP THE THRUPUT PHASE          11560000
MSTARTHR      DS    OH                                                       11580000
              NI    MSTATUS,255-MSHARED  TURN OFF THE SHARED BIT             11600000
              OI    MSTATUS,MTHRUPUT+MCHANGE START THRUPUT PHASE             11620000
              MVC   MPHALEN,MTHRULEN     MOVE IN LENGTH OF THRUPUT PHA       11640000
MZEROPHA      DS    OH                                                       11660000
              SR    R0,R0                ZERO WORK REG                       11680000
              ST    R0,QMONTIME          ZERO ALL                            11700000
              ST    R0,QBELOWAI           SHARED PHASE SERVICE CLOCKS        11720000
              LH    R0,MDEGLIMT          RESTORE THE                         11721000
              BCTR  R0,0                  DEGRADATION DECREMENT              11722000
              STH   R0,MDEGIOPR           I/O PRTY LIMIT                     11723000
              TITLE 'MAINLINE   MULTI/MODE TASK MONITOR---TASK SEARCH'       11740000
              SPACE 5                                                        11760000
MTCBSRCH      DS    OH                                                       11780000
              NI    MSTATUS+1,255-MIOHOGED-MULTIIO-MPURECPU-MCPULIM          11800000
*                                        ZERO THE TASK INDICATORS            11820000
              XC    MONCOUNT,MONCOUNT .  ZERO MONITORED TASK COUNT           11840000
              XC    MUNCOUNT,MUNCOUNT .  ZERO UNMONITORED TASK COUNT         11841000
              XC    MIOQCNT,MIOQCNT .    ZERO THE I/O QUE COUNTER            11842000
00000                                    15600000
              L     R2,QMSTCB            LOAD PTR TO MAST. SCHED. TCB        11860000
MBSEARCH      DS    OH                                                       11880000
              ST    R2,MTOPTCB           STORE CURRENT TOP TCB POINTER       11900000
              L     R2,TCBTCB1,R2)       GET NEXT LOWER TCB                  11920000
              LTR   R2,R2                END OF CHAIN                        11940000
              BNZ   MONTEST1             NO, BR TO MONITORED TEST            11960000
              SR    R4,R4                ZERO BOTTOM TTT PTR                 11980000
              B     MRECHAIN             BR FOR PHASE PROCESSING IF          12000000
*                                        REQUIRED                            12020000
MONTEST1      DS    OH                                                       12040000
              CLC   TCBDSP(1,R2),JMONPRTY IS TCB OF MONITOR PRTY             12060000
```

```
                BE       MFOUND                    YES, BR TO PROCESS MON TCB                  12080000
                BAL      R14,MUNMON                PROCESS UNMONITORED TASK                    12100000
                B        MBSEARCH                  CONTINUE SEARCHING FOR MONTCBS              12120000
*                                                                                              12140000
                SPACE    5                                                                     12160000
MOSEARCH DS     0H                                                                             12180000
                L        R2,TCBTCB(,R2)            GET NEXT LOWER TCB                          12200000
                ST       R2,MPOTTCB                STORE BOTTOM LINK TCB POINTER               12220000
                LTR      R2,R2                     END OF CHAIN                                12240000
                BZ       MRECHAIN                  YES, BR TO RECHAIN THE TCBS                 12260000
                CLC      TCBDSP(1,R2),JMONPRTY     IS TCB OF MONITOR PRTY                      12280000
                BE       MFOUND                    YES, BR TO PROCESS MON TCB                  12300000
MEMPTY   DS     0H                                                                             12320000
                BAL      R14,MUNMON                PROCESS UNMONITORED TASK                    12340000
                L        R2,TCBTCB(,R2)            GET NEXT LOWER TCB                          12360000
                LTR      R2,R2                     END OF CHAIN                                12380000
                BNZ      MEMPTY                    NO, BR TO ZERO SUB ROUTINE                  12400000
                B        MRECHAIN                  YES, BR TO RECHAIN THE TCBS                 12420000
         TITLE  'MAINLINE        MULTI/MODE TASK MONITOR--TASK FOUND'                          12440000
                SPACE    5                                                                     12460000
MFOUND   DS     0H                                                                             12480000
*                                                  GET THE TASKS PCE                           12500000
                LR       R4,R2 .                   LOAD TCB PTR INTO WORK REG                  12501000
                L        R3,TCBOTC(,R4) .          LOAD PTR TO ORIGINATING TCB                 12502000
                AIF      ('&SYS' EQ 'MFT').MPCEMFT                                             12503000
                L        R1,TCBOTC(,R3) .          LOAD PTR TO ORIGINATING TCB                 12504000
                LTR      R1,R1 .                   END OF THE CHAIN                            12505000
                BZ       *+12 .                    YES, BR TO LOAD THE PCE PTR                 12506000
                LR       R4,R3 .                   NO, CONTINUE                                12507000
                LR       R3,R1 .                      UP THE                                   12508000
                B        *-14 .                           CHAIN                                12509000
                AGO      .MPCEMVT .                                                            12510000
.MPCEMFT ANOP   .                                                                              12511000
                LTR      R3,R3 .                   END OF THE CHAIN                            12512000
                BZ       *+10 .                    YES, BR TO LOAD THE PCE PTR                 12513000
                LR       R4,R3 .                   NO, CONTINUE                                12514000
                B        *-12 .                       UP THE CHAIN                             12515000
.MPCEMVT ANOP   .                                                                              12516000
                L        R1,TCBUSER(,R4) .         LOAD THE PCE PTR                            12517000
*                                                  GET THE TTT                                 12518000
                TM       PCESTAT,PCEPRTYA .        IS THE OCM PRTY ACTIVE                      12518100
                BZ       MONADD .                  NO, BR TO BUMP MONITORED COUNT              12518200
                LH       R3,MUNCOUNT .             YES, BUMP                                   12518300
                LA       R3,1(,R3) .                   UNMONITORED                             12518400
                STH      R3,MUNCOUNT .                 COUNT                                   12518500
                B        MTTTLOOK .                GO TO LOOK FOR THE TTT                      12518600
MONADD   DS     0H .                                                                           12518700
                LH       R3,MONCOUNT .             BUMP                                        12518800
                LA       R3,1(,R3) .                   MONITORED                               12518900
                STH      R3,MONCOUNT .                 COUNT                                   12519000
MTTTLOOK DS     0H .                                                                           12519100
                L        R4,TCBUSER(,R2)           GET PCE/TTT POINTER                         12520000
                LTR      R4,R4                     ZERO                                        12540000
                BZ       MGETACT                   FREE ALL ACT TTTS THEN GET TTT              12560000
                L        R4,TTTTTT                 LOAD TTT POINTER FOR SURE                   12580000
MGETACT  DS     0H                                                                             12660000
                L        R3,MACTGTOP               GET THE TOP OF THE ACTIVE Q                 12680000
                LTR      R3,R3                     EMTY                                        12700000
                BZ       MGETTT                    YES, BR TO GET A NEW TTT                    12720000
                MVC      MACTGTOP,0(R3)            SET NEW ACTIVE Q TOP                        12740000
                CR       R3,R4                     Q TTT MATCH                                 12760000
                BE       MANALIZE                  YES, BR TO ANALIZE TASK                     12780000
                MVC      0(4,R3),MFREQTOP          NO FREE                                     12800000
                ST       R3,MFREQTOP                  THIS TTT                                 12820000
                CL       R3,MLASTTT                WAS TASK ON BOTTOM AT START OF              12840000
*                                                  THE LAST SHARED PHASE                       12860000
                BNE      MGETACT                   NO, BR TO CHECK NEXT ACT TTT                12880000
                XC       MLASTTT,MLASTTT           YES, ZERO LAST PTR                          12900000
                B        MGETACT                   CHECK NEXT ACTIVE TTT                       12920000
MGETTT   DS     0H                                                                             12940000
                L        R4,MFREQTOP               SET FIRST TTT                               12960000
                LTR      R4,R4                     Q EMPTY                                     12980000
                BZ       MNOTTTS                   YES, BR TO SET ERROR SWITCH                 13000000
                MVC      MFREQTOP,0(R4)            SET NEW FREE Q TOP                          13020000
                LA       R0,255                    LOAD INITIAL FACTOR VALUE                   13040000
                ST       R0,TTTFACT                STORE IT IN FACT                            13060000
                ST       R0,TTT+FACT               AND MFACT                                   13080000
***                                                THE LENGTH FIELD OF THE NEXT                13100000
***                                                INSTRUCTION IS FILLED IN AT                 13120000
***                                                JCA INIT TIME                               13140000
```

```
                ENTRY  MTTTLEN                                              13160000
MTTTLEN         EQU    *+1                                                  13180000
                XC     TTTCPU,TTTCPU .     ZERO THE REST OF THE TTT         13200000
***                                                                         13220000
***                                                                         13240000
***                                                                         13260000
                ST     R2,TTTTCB           STORE TCB POINTER IN TTT         13280000
                L      R3,TCBUSER(,R2) .   TEST FOR                         13300000
                LTR    R3,R3 .             PCE                              13320000
                BZ     MNOPCE .            NO, BR                           13340000
                ST     R4,PCETTT-PCEDSECT(,R3) STORE THE TTT PTR IN PCE     13360000
                B      MCONINIT .          CONTINUE INITIALIZATION          13380000
MNOPCE          DS     0H .                                                 13400000
                ST     R4,TCBUSER(,R2) .   STORE TTT PTR IN TCB             13420000
MCONINIT        DS     0H .                                                 13440000
                MVI    TTTIOPR,254         INITIALIZE I/O PRTY              13460000
                LA     R0,TTTID .          INITIALIZE                       13480000
                ST     R0,TTTIOMX .        I/O MAX PTR                      13500000
                B      MOADD               ADD NEW TTT TO THE Q             13520000
                SPACE  3                                                    13540000
MADDTTTS        DS     0H                                                   13560000
                IC     R3,MERRCNT          ADD ONE                          13580000
                LA     R3,1(,R3)           TO THE                           13600000
                STC    R3,MERRCNT          ERROR COUNT                      13620000
                B      MEAPTY              BR TO CLEAN OUT                  13640000
        TITLE 'M A I N L I N E   MULTIMODE TASK MONITOR--FREE TTT SUB'      13660000
                SPACE  5                                                    13680000
****************************************************************           13700000
*                                                           *               13720000
*       THIS SUBROUTINE FREES ALL TTTS ON THE ACTIVE Q      *               13740000
*                                                           *               13760000
****************************************************************           13780000
                SPACE  5                                                    13800000
MFREETTTS       DS     0H                                                   13820000
                L      R3,MACTQTOP         GET ACTIVE Q TIP                 13840000
                LTR    R3,R3               Q EMPTY                          13860000
                BCR    8,R14               YES RETURN                       13880000
MNEXT           DS     0H                                                   13900000
                CL     R3,MLASTTT          WAS TASK ON BOTTOM AT START OF   13920000
*                                          THE LAST SHARED PHASE            13940000
                BNE    MNOLAST2            NO, BR                           13960000
                XC     MLASTTT,MLASTTT     YES, ZERO LAST PTR               13980000
MNOLAST2        DS     0H                                                   14000000
                MVI    MTTIOPR(,R3),0      ZERO TASKS QCM I/O PRTY          14020000
                L      R5,0(,R3)           GET NEXT TTT                     14040000
                LTR    R5,R5               END OF CHAIN                     14060000
                BZ     MFIXQS              YES, BT TO FIX Q'S               14080000
                LR     R3,R5               SWAP REGS                        14100000
                B      MNEXT               GO DOWN ONE MORE                 14120000
MFIXQS          DS     0H                                                   14140000
                MVC    0(4,R3),MFREQTOP    LINK FREE Q IN                   14160000
                MVC    MFREQTOP,MACTQTOP   UPDATE FREE Q TOP                14180000
                ST     R5,MACTQTOP         ZERO ACTIVE Q TIP                14200000
                BR     R14                 RETURN                           14220000
        TITLE 'M A I N L I N E   MULTIMODE TASK MONITOR--UNMONITORED SUB'   14240000
                SPACE  5                                                    14260000
****************************************************************           14280000
*                                                           *               14300000
*       THIS SUBROUTINE ZEROS THE TTT POINTER FOR TASKS THAT *              14320000
*       HAVE BEEN CHAINED ABOVE OR BELOW THE MONITOR.        *              14340000
*       IT ALSO MAINTAINS A PSEUDO CLOCK FOR UNMONITORED     *              14360000
*       INITIATOR TASK SECONDS. THIS PSEUDO CLOCK IS USED    *              14380000
*       BY HISTOGRAPHS AND THE ANALYSIS GROUP PROGRAMS.      *              14400000
*                                                           *               14420000
****************************************************************           14440000
                SPACE  5                                                    14460000
MUNMON          DS     0H                                                   14480000
                L      R3,TCBUSER(,R2)     GET PCE/TTT POINTER              14500000
                LTR    R3,R3               DOES TASK HAVE ONE               14520000
                BZ     MINITST             NO, BR TO TEST FOR UNMON INIT    14540000
                SR     R0,R0               ZERO A WORK REG                  14560000
                C      R3,4(,R2)           IS POINTER A TTT                 14580000
                BNE    MPCE                NO, BR TO PROCESS PCE            14600000
                ST     R0,TCBUSER(,R2)     YES, ZERO POINTER                14620000
                B      MINITST             BR TO TEST FOR UNMON INIT        14640000
MPCE            DS     0H                                                   14660000
                ST     R0,4(,R3)           ZERO PCE TTT POINTER             14680000
                SPACE  3                                                    14700000
TCBPKF          EQU    2H                                                   14720000
```

```
TCBLMP    EQU     34
          SPACE   2
MINITST   DS      OH
          CLI     TCBLMP(+2),X'FF'       SYSTEM TASK
          BCR     8,R14                  YES, RETURN
          CLI     TCBPKF(+2),0           SYSTEM TASK
          BCR     8,R14                  YES, RETURN
          SR      R3,R3                  ZERO COMPARE REG
          C       R3,TCBTIC(,R2)         DORMANT MFT PARTITION
          BCR     8,R14                  YES, RETURN
          LH      R3,MUNCCUNT            BUMP
          LA      R3,1(,R3)               UNMONITORED
          STH     R3,MUNCCUNT             COUNT
          BR      R14                    RETURN
TITLE 'M A I N L I N D        MULTI/MODE TASK MONITOR--TASK ANALYSIS'
          SPACE   5
***************************************************************
*                                                              *
*         THIS SECTION PUTS I/O MAX INTO R3 AND THE TOTAL I/O  *
*         INTO R5                                              *
*                                                              *
***************************************************************
          SPACE   5
MANALIZE  DS      OH
          ST      R2,TTTTCB              STORE TCB POINTER IN TTT
          L       R8,OBOTT               LOAD NUM OF EXTRA BOTTLE
*                                          NECKS PLUS 1
          LA      R6,4                   PUT INDEX VALUE IN TO R6
          LA      R9,TTTIO               LOAD ADDR OF FIRST I/O TIME
          LR      R7,R9                  LOAD BXLE
          A       R7,QIOLENGT              COMPARAND REG
          SR      R3,R3                  ZERO I/O MAX
          SR      R5,R5                  ZERO I/O TOTAL
MIOADD    DS      OH
          A       R5,0(,R9)              ADD TIME ON THIS CHANNEL
MIOCOMP   DS      OH
          CL      R3,0(,R9)              IS IT A NEW I/O MAX
          BH      MIONEXT                NO, BP
          L       R3,0(,R9)              YES, LOAD NEW VALUE
          ST      R9,MNEWICH             SAVE ADDR OF NEW I/O MAX
MIONEXT   DS      OH
          BXLE    R9,R6,MIOADD           ADD I/O TIME DONE THRU ALL
*                                          CHANNELS
          BCT     R8,MIOCOMP             CHECK ALL POSSIBLE
*                                          BOTTLE-NECKS FOR I/O MAX
          EJECT
          SPACE
***************************************************************
*                                                              *
*         THIS SECTION ANALYZES DISK ARM DEGRADATION.          *
*         IF A TASKS DEGRADATION TIME IS GREATER THAN          *
*         ITS PRODUCTIVE TIME AND IF I/O QUEUE CONTROL         *
*         FAILS TO ELIMINATE THE DEGRADATION, THE TASK         *
*         WILL BE MADE TEMPORARILY NON-DISPATCHABLE            *
*                                                              *
***************************************************************
          SPACE   3
          CLC     TTTDEGRA,ACEDEGRA      HAS TASK REACHED DEGRA LIMIT
          BL      MQUETEST                NO, BR TO QUEUE TEST
          CLI     MSTATUS,MSHARED        IS SHARED PHASE RUNNING
          BNE     MTHRUSTST               NO, BR TO TEST THRUPUT PHASE
          TM      TTTSTAT1,TTTDEGFD      FIRST OFFENSE FOR THIS PHASE
          BO      MPRODTST                NO, CHECK PRODUCTIVITY
          OI      TTTSTAT1,TTTDEGFD      YES, MARK TTT ACCORDINGLY
          BAL     R3,MZTIMSUP            ZERO TTT'S FACTOR TIMERS
          SR      R0,R0                  CLEAR WORK REG
          IC      R0,TTTIOPR             GET TTT I/O PRTY
          SH      R0,ADEGIOPR             LOWER IT TO
          STC     R0,TTTIOPR              ELIMINATE DEGRADATION
          LH      R0,ADEGIOPR            SET NEW I/O PRTY DECREMENT
          BCTR    R0,0                    TO UNIQUE VALUE SO THAT NO
          STH     R0,ADEGIOPR             TO DEGRA TASK HAVE = PRTY
          B       MQADD                  BR TO QUE ADD
MTHRUTST  DS      OH
          CLI     MSTATUS,MTHRUPUT       IS THRUPUT PHASE RUNNING
          BNE     MQUETEST                NO, BR TO QUEUE TEST
MPRODTST  DS      OH
          LR      R0,R5                  COMPUTE THE
          AL      R0,TTTCPU               TOTAL PRODUCTIVE TIME
          CL      R0,TTTDEGRA            IS PROD GT DEGRADATION
```

```
            BH      MOUETEST .              YES, BP TO TEST QUEUES           15637000
            TM      30(P2),TO354C .         SYSTEM MUST COMPLETE STATUS      15637100
            BO      MOUETEST .              YES, BP TO TEST QUEUES           15637200
*                                                                            15638000
*                   MAKING THE PREVIOUS INSTR A B WILL ELIMINATE TASK         15639000
*                   TURN OFF                                                  15640000
*                                                                            15641000
MTASKOFF    EQU     X'10' .                 OCA ION-DISPATCHABILITY BIT      15642000
            OI      32(P2),MTASKOFF .       SHUT DEGRADING TASK OFF          15643000
            BAL     R3,MZTIMSUB .           ZERO TTT'S FACTOR TIMERS         15644000
            L       R3,MOFECNT .            BUMP THE                         15645000
            LA      R3,1(,R3) .             TASK TURNOFF                     15646000
            ST      R3,MOFECNT .            COUNTER                          15647000
            B       MQADD .                 PUT TASK BACK IN THE QUEUE       15648000
            EJECT                                                            15649000
MOUETEST    DS      0H                                                       15820000
            CL      R3,TTTCPU               IS I/O MAX GT CPU (I/O BOUND)    15840000
            BH      MIOBOUND                YES, ANALIZE I/O BOUND TASK      15860000
            L       R0,TTTCPU               LOAD CPU TIME                    15880000
            CL      R0,MCECPU               DOES TASK HAVE SUFF CPU TIME     15900000
            BL      MQADD                   NO , PUT BACK IN Q WITH SAME     15920000
*                                           PRIORITY                         15940000
            LTR     R3,R3                   IS TASK DOING ANY I/O            15960000
            BNZ     MCPUBOUN                YES, CALCULATE CPU BOUND FACT    15980000
            ST      R3,TTTFACT              SET FACTOR TO ZERO               16000000
            LA      R0,1                    SET MFACT                        16020000
            ST      R0,TTTMFACT             TO ONE                           16040000
            B       MPHATEST                BP TO PHASE TEST                 16060000
MCPUBOUN    DS      0H                                                       16080000
            SR      R6,R6                   ZERO R6 TO DEVIDE                16100000
            LR      R7,R5                   LOAD TOTAL I/O                   16120000
            ALR     R7,R0                   ADD CPU TIME                     16140000
            SLDL    R6,8                    COMPUTE FACTOR                   16160000
            DR      R6,R0                   TO NEAREST 1/256TH               16180000
            B       MSTFACT                 BR TO STORE FACTORES             16200000
            SPACE   3                                                        16220000
MIOBOUND    DS      0H                                                       16240000
            CL      R3,MCEIO                DOES TASK HAVE SUFF I/O TIME     16260000
            BL      MQADD                   NO, ADD TO QUEUE WITH CURRENT    16280000
*                                           FACTOR                           16300000
            SR      R6,R6                   ZERO FOR DIVIDE                  16320000
            L       R7,TTTCPU               LOAD CPU TIME                    16340000
            MH      R7,MCENWEIG             COMPUTE                          16360000
            LH      R0,MCFDWEIG             WEIGHTED                         16380000
            DR      R6,R0                   CPU TIME                         16400000
            ALR     R5,R7                   ADD TOTAL I/O TIME               16420000
            SR      R6,R6                   ZERO FOR DIVIDE                  16440000
            LR      R7,R3                   SET NUMERATOR = MAX I/O          16460000
            SLDL    R6,8                    COMPUTE FACTOR                   16480000
            DR      R6,R5                   TO NEAREST 1/256TH               16500000
            O       R7,MIOBFUNG             TURN ON THE HIGH ORDER BIT IN    16520000
*                                           FACTOR TO PUT IN HIGH CPU        16540000
*                                           PRIORITY GROUP                   16560000
MSTFACT     DS      0H                                                       16580000
            ST      R7,TTTFACT              STORE NEW                        16600000
            ST      R7,TTTMFACT             CPU PRTY FACTORS                 16620000
MPHATEST    DS      0H                                                       16640000
            SPACE   2                                                        16660000
            CLI     MSTATUS,MSHARED         SHARED PHASE RUNNING             16680000
            BNE     MZTIMES                 NO, BR TO ZERO FACTOR TIMES      16700000
            EJECT                                                            16720000
*************************************************************************   16740000
*                                                                        *   16760000
*           THIS SECTION UPDATES PHASE TOTALS AND PERFORMS HOG           *   16780000
*           ANALYSIS.                                                    *   16800000
*                                                                        *   16820000
*************************************************************************   16840000
            SPACE   3                                                        16860000
            L       R0,TTTSHCPU             UPDATE                           16880000
            AL      R0,TTTCPU               SHARED PHASE                     16900000
            ST      R0,TTTSHCPU             CPU TIME                         16920000
            L       R5,TTTIOMAX             LOAD ADDR OF OLD I/O MAX         16940000
            L       R5,01(R5)               LOAD NEW TIME FOR THAT PATH      16960000
            AL      R5,TTTSPIO              ADD PREVIOUS I/O MAX TIME        16980000
            CR      R3,R5                   IS NEW I/O MAX GREATER           17000000
            BL      MOLDMAX .               NO, BR TO UPDATE SP I/O          17020000
            MVC     TTTIOMAX,MNEWIOM        MOVE IN POINTER TO NEW I/O MAX   17040000
            ST      R3,TTTSPIO              STORE NEW TOTAL                  17060000
            B       MHOGANAL                BR TO HOG ANALYSIS               17080000
MOLDMAX     DS      0H                                                       17100000
            ST      R5,TTTSPIO              STORE NEW TOTAL                  17120000
```

```
MHOGANAL  DS    OH                                                              17140000
          CLC   TTTSPIO,MCOHOG       IS TASK AN I/O HOG                         17160000
          BL    MCPUHOGC             NO, BR TO CHECK FOR CPU HOG                17180000
          SR    R0,R0                YES, DECREMENT                             17200000
          IC    R0,TTTIOPR           I/O                                        17220000
          SH    R0,MDEGLIMT          PRIORITY BY DEGLIMIT                       17240000
          STC   R0,TTTIOPR           AND SET THE I/O HOG                        17260000
          OI    MSTATUS+1,MIOHOGF    FOUND BIT                                  17280000
MCPUHOGC  DS    OH                                                              17300000
          CLC   TTTSPCPU,MCPHOG      IS TASK A CPU HOG                          17320000
          BL    MZTIMES              NO, BR TO ZERO TIMES                       17340000
          SR    R0,R0                YES, SET                                   17360000
          ST    R0,TTTFACT           FACTOR TO ZERO                             17380000
MZTIMES   DS    OH                                                              17400000
          LA    R3,MQADD             PSEUDO BAL TO MZTIMSUB                     17410000
MZTIMSUB  DS    OH                                                              17411000
          SR    R0,R0                ZERO WORK REG                              17420000
          ST    R0,TTTCPU            ZERO FACTOR CPU TIME                       17440000
          ST    R0,TTTDEGRA          ZERO DEGRADATION TIME                      17450000
***                                  THE LENGTH FIELD OF THE NEXT               17460000
***                                  INSTRUCTION IS FILLED IN AT                17480000
***                                  OCM INIT TIME                              17500000
          ENTRY MIOZERO                                                         17520000
MIOZERO   EQU   *+1                                                             17540000
          XC    TTTIO,TTTIO          ZERO I/O TIMES                             17560000
          BR    R3                   RETURN                                     17570000
     TITLE 'M A I N L I N E    MULTI/MODE TASK MONITOR--QUEUE ADD'              17580000
          SPACE 5                                                               17600000
***************************************************************                17620000
*                                                              *                17640000
*      THIS SECTION CREATES THE NO//ACTIVE QUEUE. IT PUTS      *                17660000
*      THE TTT'S IN OCM MULT-PATH PRIORITY ORDER               *                17680000
*                                                              *                17700000
***************************************************************                17720000
          SPACE 5                                                               17740000
MQADD     DS    OH                                                              17760000
          T4    MSTATUS,MCHANGE      IS THE MONITOR CHANGING PHASE              17780000
          BZ    MQSRCH               NO, BR TO SET INDICATOR AND Q              17800000
          MVC   TTTFACT,TTTMFACT     YES, MOVE IN REAL OCM PRTY                 17820000
MQSRCH    DS    OH                                                              17840000
          L     R0,TTTMFACT          LOAD TTT MULTI/PATH FACTOR                 17860000
          LTR   R0,R0                TEST IT                                    17880000
          BM    MIOTASK              MINUS, BR TO I/O BOUND TEST                17900000
          CL    R0,M255              IS IT PURE CPU BOUND                       17920000
          BH    MLIMITED             NO, CPU LIMITED                            17940000
          OI    MSTATUS+1,MPURECPU   SET THE PURE CPU INDICATOR                 17960000
          B     MQCONTIN             BR TO CONTINUE Q ADD                       17980000
MLIMITED  DS    OH                                                              18000000
          OI    MSTATUS+1,MCPULIM    SET THE CPU LIMITED INDICATOR              18020000
          B     MQCONTIN             BR TO CONTINUE Q ADD                       18040000
MIOTASK   DS    OH                                                              18060000
          CL    R0,MCETHRSH          IS THIS A GOOD ENOUGH TASK                 18080000
          BH    MQCONTIN             NO, CONTINUE Q ADD                         18100000
          OI    MSTATUS+1,MULTIIO    YES, SET MULTI PATH TASK INDIC             18120000
MQCONTIN  DS    OH                                                              18140000
          L     R0,TTTFACT           LOAD TTT'S CURRENT FACTOR                  18160000
          CL    R0,MONE              A ONE TASK                                 18170000
          BNH   MAQTASK              YES, BR                                    18171000
          L     R3,MIOQCNT           NO, BUMP                                   18172000
          LA    R0,1(,R3)            THE I/O                                    18173000
          ST    R3,MIOQCNT           QUEUE COUNT                                18174000
MAQTASK   DS    OH                                                              18175000
                                                                    19200000
          L     R3,MNEWQTOP          LOAD NEW Q TOP                             18190000
          LTR   R3,R3                EMPTY                                      18200000
          BZ    MQINIT               YES, BR TO INITIALIZE NEW Q                18220000
MQCOMPAR  DS    OH                                                              18240000
          CL    R0,MTTFACT(,R3)      NEW FACTOR/PRIORITY HIGH                   18260000
          BH    MQTESTOP             YES, SEE IF IT BELONGS ON TOP              18280000
          LR    R5,R3                LOAD HIGH TTT                              18300000
          L     R3,0(,R3)            LOAD NEXT LOWER TTT                        18320000
          LTR   R3,R3                END OF CHAIN                               18340000
          BNZ   MQCOMPAR             NO, BR TO COMPARE PRIORITIES               18360000
          B     MQBOTTOM             YES BR TO PUT ON BOTTOM OF Q               18380000
MQTESTOP  DS    OH                                                              18400000
          CL    R3,MNEWQTOP          DOES NEW TTT GO ON TOP                     18420000
          BE    MQINIT               YES, PUT IT HERE                           18440000
MQBOTTOM  DS    OH                                                              18460000
          ST    R4,0(,R5)            LINK NEW TO HIGHER TTT                     18480000
```

```
MQLDWLNK DS     OH
        ST      R3,0(,R4)               LINK LOWER TTT'S TO NEW
        B       MDSEARCH                BR TO CONTINUE SEARCH OF TCB
*                                       CHAIN FOR MONITORED TASKS
MUINIT  DS      OH
        ST      R4,MNEWQTOP             STORE NEW Q TOP
        B       MQLDWLNK                BR TO STOE LOW LINK
        TITLE 'M A I N L I N E  MULTI/MODE TASK MONITOR--RECHAIN TCBS'
        SPACE 5
*********************************************************************
*                                                                   *
*       THIS SECTION RECHAINS THE MONITORED TCB'S IN                *
*       QCM PRIORITY SEQUENCE.  IT ALSO SETS THE INDEPENDENT        *
*       I/O PRIORITY OF MONITORED TASKS.                            *
*                                                                   *
*********************************************************************
        SPACE 2
MRECHAIN DS     OH
        BAL     R14,MFREETTTS           FREE ANY REMAINING TTTS
        L       R0,MNEWQTOP             MOVE NEW Q TOP
        ST      R0,MACTQTOP              TO ACTIVE Q TOP
        SR      R0,R0                   ZERO
        ST      R0,MNEWQTOP             NEW Q TOP
        L       R0,MCEINTVL             LOAD THE MONITOR INTERVAL
        SRL     R0,2                    CONVERT TO QCM BILLABLE UNITS
        LR      R1,R0                   SAVE INTERVAL
        MH      R0,MONCOUNT             UPDATE
        AL      R0,QMONTELP              MONITORED ELAPSED
        ST      R0,QMONTELP              TIME PSEUDO CLOCK
        LR      R0,R1                   RELOAD THE INTERVAL
        MH      R0,MUNCOUNT             UPDATE
        AL      R0,QUNMTELP              UNMONITORED
        ST      R0,QUNMTELP              TASKS PSEUDO CLOCK
        CLI     MSTATUS,MSHARED+MCHANGE STARTING NEW CYCLE
        BNE     MGETTTOP                NO, BR TO TEST ACT Q TOP
        C       R1,MCECPU               IS INTERVAL LESS THAN MCECPU
        BNL     *+8                     NO, BR
        L       R1,MCECPU               YES, LOAD MCECPU
        C       R1,MCEIO                IS MCEIO THE LARGEST
        BNL     *+8                     NO, BR
        L       R1,MCEIO                YES, LOAD MCEIO
        LR      R0,R1                   SAVE VALUE
        MH      R0,MCESBIAS             CALCULATE AND
        ST      R0,MCEHOG                STORE NEW HOG VALUE
        MH      R0,MONCOUNT             CALCULATE AND SET THE
        ST      R0,MPHALEN               NEW SHARED PHASE LENGTH
        MH      R1,MCETHBIAS            CALCULATE
        MH      R1,MUNCOUNT              AND SET THE
        ST      R1,MTHRULEN              NEW THRUPUT PHASE LENGTH
        ST      R4,MLASTTT              STORE POINTER TO LAST TTT.
*                                       THIS TASK MUST HAVE THE
*                                       OPPERTUNITY TO USE THE CPU
*                                       DURING THE SHARED PHASE.
        SPACE 2
MGETTTOP DS     OH
        L       R4,MACTQTOP             GET THE FIRST TTT
        LTR     R4,R4                   ANY TCBS TO RECHAIN
        BZ      MENABLE                 NO, ENABLE AND PRINT ERROR MSG
        LA      R1,1                    SET QCM PRIORITY TO 1
        L       R3,MTOPTCB              LOAD TOP BOUNDRY TCB
MTCBLINK DS     OH
        MVC     TCBTCB(4,R3),TTTTCB     LINK THIS TCB INTO THE CHAIN
        TM      MSTATUS,MCHANGE         NEW PHASE
        BZ      MTSIOHOG                YES, BR TO CHECK HOG BIT
        NI      TTTSTAT1,255-TTTDEGFL   RESET THE DEGRADATION FLAG
        B       MTCBON                   BR TO TURN ON TASK
MTSIOHOG DS     OH
        TM      MSTATUS+1,MIOHOGF       I/O HOG FOUND
        BO      MTCBON                  YES, BR TO TURN ON TASK
        CLI     MIOQCNT+3,2             LESS THAN TWO I/O TASKS
        BL      MTCBON                  YES, BR TO TURN ON TASK
        B       MLEAVOFF                SKIP TASK TURN ON
MTCBON  DS      OH
        L       R9,TTTTCB               LOAD TCB ADDR
        NI      32(R9),255-MTASKOFF     TURN TASK BACK ON
MLEAVOFF DS     OH
        L       R9,TTTFACT              TEST FOR
        LTR     R9,R9                    ZERO TTTFACT
        BNZ     MNOFACTO                NO, BR
        LA      R9,1                    YES, SET
        ST      R9,TTTFACT               TO ONE
```

```
MNDFACTO  DS    0H                                                         19580000
          STC   R1,TTTCPUPR         STORE QCM CPU PRIORITY                 19600000
          CLI   MSTATUS,#SHARED+#CHNGE IS IT START OF SHARED PHA           19620000
          BE    MIO254              YES, BR TO SET I/O PRTY TO 254         19640000
          TM    MSTATUS,#THRUPUT    IS IT THRUPUT PHASE                    19660000
          BZ    MNEXTTT             NO, BR SHARED PHASE RUNNING            19680000
          STC   R1,TTTIOPR          STORE NEW I/O PRIORITY                 19700000
          B     MNEXTTT             GET NEXT TTT                           19720000
MIO254    DS    0H                                                         19740000
          MVI   TTTIOPR,254         INITIALIZE I/O PRTY FOR                19760000
          SR    R9,R9               ZERO DEGRADATION TIME AT               19780000
          ST    R9,TTTDEGPA           BEGINNING OF SHARED PHASE            19800000
          ST    R9,TTTSPCPU .         ZERO SHARED                          19820000
          ST    R9,TTTSPIO  .           PHASE ACCUMULATORS                 19840000
MNEXTTT   DS    0H                                                         19860000
          LA    R1,1(,R1)           ADD ONE TO QCM PRIORITY                19880000
          L     R3,TTTTCB           LOAD NEW TOP TCB                       19900000
          L     R4,0(,R4)           GET NEXT LOWER TTT                     19920000
          LTR   R4,R4               END OF CHAIN                           19940000
          BNZ   MTCBLINK            NO, BR TO LINK NEW TCB                 19960000
          SPACE 2                                                          19980000
          MVC   TCHTCB(4,R3),#BOTTCB LINK IN ALL LOW PRTY TCB'S            20000000
 TITLE 'M A I N L I N E      MULTIMODE TASK MONITOR--LOG CHAN Q SORT'      20020000
          SPACE 5                                                          20040000
*****************************************************************         20060000
*                                                                *         20080000
*       THIS SECTION ASSIGNS ALL QUEUED I/O (FOR MONITORED       *         20100000
*       TASK) ITS NEW QCM I/O PRIORITY.  ALL LOGICAL CHANNEL     *         20120000
*       QUEUES ARE THEN SORTED INTO PROPER SEQUENCE.             *         20140000
*                                                                *         20160000
*****************************************************************         20180000
          SPACE 5                                                          20200000
CVTILCH   EQU   X'8C'               ADDR OF LOG CHAN WORD TABLE            20220000
RQEID     EQU   4 .                 MFT RQE TASK ID                        20240000
RQEPR     EQU   8                   RQE PRIORITY FIELD                     20260000
RQETCB    EQU   12                  RQE TCB FIELD                          20280000
          SPACE 3                                                          20300000
          L     R0,QNUMLCHS         LOAD COUNT OF THE NUMBER OF            20320000
*                                     LOGICAL CHANNELS                     20340000
          L     R1,CVTPTR           LOAD POINTER TO CVT                    20360000
          L     R1,CVTILCH(,R1)     LOAD ADDR OF L CHAN WORD TABLE         20380000
MSORTQ    DS    0H                                                         20400000
          TM    1(R1),1             QUEUE VOID                             20420000
          BO    MNEXTLCW            YES, BR TO GET NEXT LOGICAL            20440000
*                                     CHANNEL WORD                         20460000
          SR    R7,R7               ZERO WORK REG                          20480000
          LR    R2,R1               POINT WORK REG TO L C W                20500000
          MVI   MNOPA+1,0           SET UP TO STORE HIGH RQE               20520000
MNEXTA    DS    0H                                                         20540000
          LR    R3,R2               LOAD PREVIOUS RQE POINTER              20560000
          LH    R2,0(,R2)           GET NEXT RQE                           20580000
          LTR   R2,R2               END OF CHAIN                           20600000
          BM    MDONE               YES, BR TO TEST FOR SORT               20620000
          CLC   RQEPR(1,R2),QMONPRTY MONIRQED PRIORITY                     20640000
          BH    MNEXTA              HIGH, GET NEXT RQE                     20660000
          BL    MDONE               LOW, TEST FOR SORT                     20680000
          SPACE 2                                                          20700000
*                                   EQUAL                                  20720000
MNOPA     DS    0H                                                         20740000
          NOP   MNOTIST                                                    20760000
          LR    R8,R3               SAVE TOP RQE POINTER                   20780000
          MVI   MNOPA+1,X'F0'       SET BRANCH                             20800000
MNOTIST   DS    0H                                                         20820000
          LA    R7,1(,R7)           ADD ONE TO RQE COUNT                   20840000
          B     MNEXTA              GET NEXT RQE                           20860000
MDONE     DS    0H                                                         20880000
          C     R7,MONE             MORE THAN ONE RQE                      20900000
          BNH   MNEXTLCW            NO, GET NEXT L C W                     20920000
          SPACE 3                                                          20940000
***                                 LOGICAL CHANNEL QUEUE SORT             20960000
          BCTR  R7,0                LOOP N-1 TIMES                         20980000
MRESTART  DS    0H                                                         21000000
          MVI   MCHNGSW,0           RESET THE CHANGE SWITCH                21020000
          LR    R3,R8               GET TOP RQE IN R3                      21040000
          SR    R2,R2               ZERO RQE COUNT FOR LOOP                21060000
MLOOPB    DS    0H                                                         21080000
          LA    R2,1(,R2)           ADD ONE TO COUNT                       21100000
          LH    R4,0(,R3)           A(I)                                   21120000
          LH    R5,0(,R4)           A(I+1)                                 21140000
          LH    R6,0(,R5)           A(I+2)                                 21160000
          AIF   ('&SYS' EQ 'MFT'),MFTRQE1 .                                21180000
          L     R15,RQETCB(,R5)     GET TCB PTR                            21200000
```

```
.MFTRQE1  AIF   ('&SYS' EQ 'MVT').MVTRQE1 .                              21220000
          L     R15,16 .              LOAD ADDR OF THE                   21240000
          L     R15,CVTHEAD(,R15) .   FIRST TCB                          21260000
MRQETCB1  DS    OH .                                                     21280000
          L     R15,TCBTCB(,R15) .    DOWN ONE TCB                       21300000
          CLC   TCBIDF(1,R15),RQEID(R5) IS RQE FOR THIS TCB              21320000
          BNE   MRQETCB1 .            NO, CONTINUE SEARCH                21340000
.MVTRQE1  ANOP  .                                                        21360000
          L     R15,TCBUSER(,R15)     GET PCE/TTT PTR                    21380000
          LTR   R15,R15               VALID                              21400000
          BZ    MLOOPC                NO, BR TO CHECK NEXT RQE           21420000
          L     R15,MTTTTT(,R15)      GET TTT                            21440000
          LTR   R15,R15               VALID                              21460000
          BZ    MLOOPC                NO, BR TO CHECK NEXT RQE           21480000
          AIF   ('&SYS' EQ 'MFT').MFTRQE2 .                              21500000
          L     R14,RQETCB(,R4)       GET TCB PTR                        21520000
.MFTRQE2  AIF   ('&SYS' EQ 'MVT').MVTRQE2 .                              21540000
          L     R14,16 .              LOAD ADDR OF THE                   21560000
          L     R14,CVTHEAD(,R14) .   FIRST TCB                          21580000
MRQETCB2  DS    OH .                                                     21600000
          L     R14,TCBTCB(,R14) .    DOWN ONE TCB                       21620000
          CLC   TCBIDF(1,R14),RQEID(R4) IS RQE FOR THIS TCB              21640000
          BNE   MRQETCB2 .            NO, CONTINUE SEARCH                21660000
.MVTRQE2  ANOP  .                                                        21680000
          L     R14,TCBUSER(,R14)     GET PCE/TTT PTR                    21700000
          LTR   R14,R14               VALID                              21720000
          BZ    MOCMZERO              NO, TEST OTHER FOR OCM PRTY=0      21740000
          L     R14,MTTTTT(,R14)      GET TTT POINTER                    21760000
          LTR   R14,R14               VALID                              21780000
          BZ    MOCMZERO              NO, TEST OTHER FOR OCM PRTY=0      21800000
          CLC   MTTIOPR(1,R14),MTTIOPR(R15) IS ORDER CORRECT             21820000
          BNL   MLOOPC                                                   21840000
MIOSWTCH  DS    OH                                                       21860000
          OI    MCHNGSW,1             SET THE CHANGE SWITCH              21880000
          STH   R5,0(,R3)             POINT TO NEW HIGHEST               21900000
          STH   R4,0(,R5)             SWITCH                             21920000
          STH   R6,0(,R4)             POINT TO NEXT LOWEST               21940000
MLOOPC    DS    OH                                                       21960000
          LH    R3,0(,R3)             GO DOWN CHAIN ONE RQE              21980000
          CR    R2,R7                 LOOP DONE                          22000000
          BL    MLOOPR                NO BR BACK                         22020000
          TM    MCHNGSW,1             ANY SWAPS LAST TIME                22040000
          BO    MRESTART              YES, GO THR Q AGAIN                22060000
          LTR   R6,R6                 IS R6 NEGATIVE CALL FF'S)          22080000
          BNM   MNEXTLCW              NO, PROCESS NEXT L C W             22100000
          STH   R5,2(,R1)             YES, STORE NEW LAST RQE IN LCW     22120000
          B     MNEXTLCW              PROCESS NEXT L C W                 22140000
MOCMZERO  DS    OH                                                       22160000
          CLI   MTTIOPR(R15),0        IS R(I+1)'S OCM I/O PRTY=0         22180000
          BE    MLOOPC                YES, NO CHANGE                     22200000
          B     MIOSWTCH              NO, SWITCH                         22220000
          SPACE 3                                                        22240000
MNEXTLCW  DS    OH                                                       22260000
          LA    R1,8(,R11)            BUMP TO NEXT LOG CHAN Q            22280000
          BCT   R0,MSORTQ             SORT ALL LOGICAL CHANNELS          22300000
          TITLE 'M A I N L I N E      MULTI/MODE TASK MONITOR--RETURN'   22320000
          SPACE 5                                                        22340000
MENABLE   DS    OH                                                       22360000
          NI    MSTATUS,255-MCHANGE   TURN OFF THE CHANGE BIT            22380000
          SSM   *+1                   ENABLE                             22400000
          ORG   *-3                   ENABLE                             22420000
          DC    X'FF'                 ENABLE                             22440000
          ORG   .                     ENABLE                             22460000
          SPACE 2                                                        22480000
          TM    MERRCNT,X'7F'         RUN OUT OF TTT'S                   22500000
          BNZ   MRETURN               NO, WAIT                           22520000
*         MESSAGE PRINTS THE FIRST TIME AND EVERY 128TH THEREAFTER       22540000
          WTO   'QCM0231 SOME TASKS NOT MONITORED - NUMTTTS TOO SMALL'   22560000
          MVI   MERRCNT,1             DON'T TYPE MSG EVERY MON INTVL     22580000
          SPACE 5                                                        22600000
MRETURN   DS    OH                                                       22620000
          QWAIT                       RETURN                             22640000
          TITLE 'M A I N L I N E      MULTI/MODE TASK MONITOR--CONSTANTS' 22660000
          SPACE 5                                                        22680000
MSTATUS   DC    0F'0',X'80000000'     MONITOR STATUS WORD                22700000
MPHATIME  DC    F'0'                  PHASE TIME ACCUMULATOR             22720000
MPHALEN   DC    F'0'                  PHASE LENGTH                       22740000
MLASTTT   DC    A(0)                  PTR TO LAST TTT FOR SHARED PHA     22760000
MTHRULEN  DC    F'0'                  COMPUTED LENGTH OF THRUPUT PHA     22780000
```

```
MERRCNT  DC      X'FF'                 INIT ERROR COUNT SO THAT              22800000
*                                      MESSAGE PRINTS THE FIRST              22820000
*                                      TIME                                  22840000
MCHNGSW  DC      X'00'                 QUEUE CHANGE SWITCH                   22860000
MTOPTCB  DC      A(0)                                                        22880000
MROTTCB  DC      A(0)                                                        22900000
MACTQTOP DC      A(0)                                                        22920000
MNEWQTOP DC      A(0)                                                        22940000
MIOBOUNQ DC      0F'0',X'40000000'                                           22960000
MNEWIOM  DC      A(0)                                                        22980000
MONE     DC      F'1'                                                        23000000
M255     DC      F'255'                                                      23020000
*                                                                            23020100
*                                      TASK ELAPSED TIME CLOCKS              23020200
*                                                                            23020300
MONCOUNT DC      H'0'                  COUNT OF MONITORED TASKS              23020400
MUNCOUNT DC      H'0'                  COUNT OF UNMONITORED TASKS            23020500
*                                                                            23020600
*                TAK OFF CONSTANTS AND WORK WORDS                            23020700
*                                                                            23020800
MDEGIOPR DC      H'16'                 CURRENT DEGRA I/O PRTY DECREM         23020900
MDEGLIMT DC      H'16'                 LIMIT AND I/O HOG DECREMENT           23021000
MOFFCNT  DC      F'0'                  COUNT OF TASK TURN OFFS               23021100
MIOQCNT  DC      F'0'                  NUM OF TASKS IN THE I/O QUEUES        23021200
*                                                                            23040000
.NOMMON  ANOP                                                                23060000
         DROP    R1                                                          23061000
  TITLE  'M A I N L I N E              IOS EXTENTIONS WTO ROUTINE' GFC WT    23080000
WTOQ     DS      OH                                                          23100000
         MVI     CMESSAGE+1,0                                     GFC WT     23120000
         QWAIT                                                        WT     23140000
WMESSAGE DC      X'00'                                            GFC WT     23160000
  TITLE  'M A I N L I N E              ASYNCHRONOUS TIMER EXIT ROUTINE'GFC AT 23180000
         SPACE   10                                               GFC AT     23200000
INTERUPT NULL                                                     GFC AT     23220000
         USING   *,R15                 SYSTEM ENTRY REG           GFC AT     23240000
         STM     R7,R12,IASYNSAV       SAVE WORK REGS             GFC AT     23260000
         LM      R11,R12,IQCMBASE      GET STANDARD BASE REGS BECAUSEGFC AT  23280000
         DROP    R15                   R15 IS NOT A SAGE REG      GFC AT     23300000
         L       R1,INTVLCUR           LOAD ELAPSED INTERVAL      GFC AT     23320000
         BAL     R15,ISUBPOST          BR TO SUBTRACT INTVL AND POST GFC AT  23340000
         SR      R1,R1                 ZERO R1                    GFC AT     23360000
         ST      R1,INTVLCUR           INDICATE TIMER NOT RUNNING GFC AT     23380000
         QPOST   CSTIMER               QPOST THE TIMER ROUTINE        AT     23400000
         POST    QCMECH                POST QCM                   GFC AT     23420000
         LM      R7,R12,IASYNSAV       RESTOR REGS                GFC AT     23440000
         BR      R14                   RETURN                     GFC AT     23460000
         SPACE   3                                                GFC AT     23490000
IASYNSAV DC      6F'0'                 WORK REG SAVE AREA         GFC AT     23500000
         EXTRN   QTABLE                                           GFC AT     23520000
IQCMBASE DC      A(QTABLE,QCMLOGIC)                               GFC AT     23540000
  TITLE  'M A I N L I N E                      INTERVAL TIMER ROUTINE'GFC IT 23560000
         SPACE   5                                                GFC IT     23580000
ISTIMER  DS      OH                                               GFC IT     23600000
         MVI     CSTIMER+1,0           RESET TIMER ROUTINE                   23620000
         SSM     *+1                   DISABLE                    GFC IT     23640000
         ORG     *-3                     INTERVAL                 GFC IT     23660000
         DC      X'FE'                   TIMER                    GFC IT     23680000
         ORG     *                                                GFC IT     23700000
         L       R1,INTVLCUR           TIMER                      GFC IT     23720000
         LTR     R1,R1                 RUNNING                    GFC IT     23740000
         BNZ     ITTIMER               YES, BR TO CANCEL AND UPDATE GFC IT   23760000
         SSM     *+1                   ENABLE                     GFC IT     23780000
         ORG     *-3                     INTERVAL                 GFC IT     23800000
         DC      X'FF'                   TIMER                    GFC IT     23820000
         ORG     *                                                GFC IT     23840000
ISMALL   NULL                                                     GFC IT     23860000
         LA      R10,0+(IQEND-IQSTART)/(IMONITOR-ILDGAGAT) LOAD CNT002 IT    23880000
         LA      R9,IQSTART            LOAD STARTING ADDRESS      GFC IT     23900000
         L       R1,IMAX               SET TEST VALUE TO TIMER MAX GFC IT    23920000
         SR      R8,R8                 ZERO WORK REG              002 IT     23940000
ICOMPARE DS      OH                                               GFC IT     23960000
         L       R7,8(,R9)             LOAD THE NEW TIME REQUEST FIELD002 IT 23980000
         LTR     R7,R7                 IS THERE A NEW REQUEST     002 IT     24000000
         BNP     ICHCKOLD              NO, BR TO CHECK FOR ACT REQUES002 IT  24020000
         ST      R8,8(,R9)             ZERO NEW REQUEST FIELD     002 IT     24040000
         ST      R7,0(,R9)             STORE REQ IN ACTIVE FIELD  002 IT     24060000
         B       ICHECK                BR TO CHECK FOR SMALLEST REQ 002 IT   24080000
ICHCKOLD DS      OH                                               002 IT     24100000
```

```
                L       R7,0(,R9)              LOAD ACTIVE REQUEST FIELD      002 IT 24120000
                LTR     R7,R7                  IS OLD REQUEST STILL ACTIVE    002 IT 24140000
                BNP     IBUMP                  NO, BUMP AND TEST END          002 IT 24160000
ICHECK          DS      0H                                                    002 IT 24180000
                CR      R7,R1                  IS IT THIS INTERVAL SMALLER    GFC IT 24200000
                BNL     IBUMP                  NO, BUMP AND TEST END          GFC IT 24220000
                LR      R1,R7                  LOAD SMALLER INTERVAL          GFC IT 24240000
IBUMP           DS      0H                                                    GFC IT 24260000
                LA      R9,0+(IMONITOR-ILOGAGAT)(,R9) BUMP TO NEXT ELEMENT    002 IT 24280000
                BCT     R10,ICOMPARE                                          GFC IT 24300000
                C       R1,IMAX                IS THE TIMER TO BE SET             24320000
                BE      COMMUTAT               NO, WAIT                           24340000
*                                                                             GFC IT 24360000
*                       SET OS TIMER TO THE LOWEST REQUESTED VALUE            GFC IT 24380000
*                                                                             GFC IT 24400000
                ST      R1,INTVLCUR            STORE INTERVAL TO BE SET       GFC IT 24420000
                STIMER  REAL,INTCRUPT,TUINTVL=INTVLCUR                        GFC IT 24440000
                QWAIT                                                             IT 24460000
                SPACE 5                                                       GFC IT 24480000
ITTIMER         DS      0H                                                    GFC IT 24500000
                TTIMER  CANCEL                                                GFC IT 24520000
                SSM     *+1                    ENABLE                         GFC IT 24540000
                ORG     *-3                    INTERVAL                       GFC IT 24560000
                DC      X'FF'                  TIMER                          GFC IT 24580000
                ORG     ,                                                     GFC IT 24600000
                L       R1,INTVLCUR            GET SET INTERVAL               GFC IT 24620000
                SR      R1,R0                  COMPUTE EXPIRED TIME           GFC IT 24640000
                BAL     R15,ISUBPOST           UPDATE                         GFC IT 24660000
                B       ISMALL                 BR TO RESET THE TIMER          GFC IT 24680000
        TITLE 'M A I N L I N E                 SUBTRACT AND POST SUBROUTINE'  GFC IT 24700000
                SPACE 5                                                       GFC IT 24720000
ISUBPOST        DS      0H                                                    GFC IT 24740000
                LA      R10,0+(IQEND-IQSTART)/(IMONITOR-ILOGAGAT) LOAD CNT    002 IT 24760000
                LA      R9,IQSTART             LOAD STARTING ADDRESS          GFC IT 24780000
INEXT           DS      0H                                                    GFC IT 24800000
                LM      R7,R8,0(R9)            GET TIMER VALUE AND POST ADDR  GFC IT 24820000
                LTR     R7,R7                  IS ROUTINE WAITING             GFC IT 24840000
                BNP     ITEST                  NO, BRANCH TO TEST END         GFC IT 24860000
                SR      R7,R1                  SUBTRACT ELAPSED TIME          GFC IT 24880000
                BP      ITEST                  NOT EXPIRED, BR TO TEST END    GFC IT 24900000
                SR      R7,R7                  ZERO TIME                      GFC IT 24920000
                MVI     1(R8),X'F0'            $POST ROUTINE                  000 IT 24940000
                                                                              GFC IT 24960000
ITEST           DS      0H                                                    GFC IT 24980000
                ST      R7,0(,R9)              STORE REMAINING TIME           GFC IT 25000000
                LA      R9,0+(IMONITOR-ILOGAGAT)(,R9) BUMP TO NEXT ELEMENT    012 IT 25000000
                BCT     R10,INEXT              TEST END                       GFC IT 25020000
                BR      R15                    RETURN                         GFC IT 25040000
        TITLE 'M A I N L I N E                                     CONSTANTS' GFC IT 25060000
                SPACE 5                                                       GFC IT 25080000
QCMLDISP        DC      A(X'&START'-QCMLOGIC)                                     25100000
        TITLE 'O S   E X T E N S I O N S                                EQUS' GFC TM 25120000
                                                                                  25140000
*                       FIRST DEVICE STATUS BYTE FLAG DEFINITION                  25160000
*                                                                                 25180000
TCHANBSY        EQU     X'80'                                                 GFC TM 25200000
TCHARGE         EQU     X'40'                                                 GFC TM 25220000
T2305           EQU     X'20'                  2305 DRUM INDICATOR                25240000
TCUBILL         EQU     X'10'                                                 GFC TM 25260000
TCONTNT         EQU     X'08'                                                 GFC TM 25280000
TCUEINT         EQU     X'04'                                                 GFC TM 25300000
TIOINTER        EQU     X'02'                  INDICATES AN I/O INTERRUPT     GFC TM 25320000
TDISK           EQU     X'01'                  DISK IO BIT                    GFC TM 25340000
                                                                                  25360000
*                       SECOND DEVICE STATUS BYTE FLAG DEFINITION                 25380000
*                                                                                 25400000
TINTLUST        EQU     X'80'                  INTERRUPT LOST FLAG                25420000
                SPACE 2                                                           25440000
CSW             EQU     X'40'                                                 GFC TM 25460000
CAW             EQU     X'48'                                                 GFC TM 25480000
ICREG           EQU     9                                                     GFC TM 25500000
TSTREG          EQU     1                                                     GFC TM 25520000
IOPSWO          EQU     X'38'                                                 GFC TM 25540000
***                     REFERENCES TO THE FOLLOWING EQU ARE CORRECTED BY INIT     25560000
IEAPSW          EQU     *-*                    MVT RESUME PSW                     25580000
RESUMPSW        EQU     *-*                    MFT RESUME PSW                     25600000
RBOPSW          EQU     X'10'                                                 GFC TM 25620000
TCBGRS          EQU     X'30'                                                 GFC TM 25640000
GJSTCB          EQU     124                                                   GFC TM 25660000
GTCBOTC         EQU     132                                                   GFC TM 25680000
UAREG           EQU     6                                                     GFC TM 25700000
```

```
TWAITBIT  EQU    X'80'              INDICATES WAIT WAS DISPATCHED  GFC WA 25720000
TIOBIT    EQU    X'40'              INDICATES WAIT WAS FOR I/O     GFC WA 25740000
TCBTCB    EQU    116                                               GFC TM 25760000
TCBUSER   EQU    168                                               GFC TM 25780000
TCBNTC    EQU    128                                               GFC TM 25800000
TCBOTC    EQU    132                                               GFC TM 25820000
TCBLTC    EQU    136                                               GFC TM 25840000
TCBIDF    EQU    112                MFT TCB IDENTIFIER NUMBER             25860000
CVTBTERM  EQU    X'34'                                             GFC TM 25880000
IOBXTENT  EQU    32                 IOB OFFSET TO EXTENT NUMBER    GFC TM 25900000
IEASAV    EQU    X'218'             I/O FLIH SAVE AREA             GFC TM 25920000
TCBTIO    EQU    12                 T I O T POINTER IN TCB         GFC TM 25940000
CVTPTR    EQU    16                 CVT POINTER                    GFC TM 25960000
TCBFLGS   EQU    29                                                GFC TM 25980000
CVTTPC    EQU    88                                                GFC TM 26000000
          SPACE  5                                                 GFC TM 26020000
TIMEXTEN  NULL                                                     GFC TM 26040000
          TITLE  'O S   E X T E N T I O N S         DISPATCHER'    GFC TM 26060000
          SPACE  5                                                 GFC TM 26080000
*************************************************************     GFC TM 26100000
*                                                           *     GFC TM 26120000
*           D I S P A T C H E R                             *     GFC TM 26140000
*                                                           *     GFC TM 26160000
*************************************************************     GFC TM 26180000
          SPACE  5                                                 GFC TM 26200000
TDISPTCH  NULL                                                     GFC TM 26220000
          LR     R14,R11 .          SAVE TCB REG TO BE CONSISTANT         26240000
*                                   WITH OS TRACE OPTION                  26260000
          AIF    ('&SYS' EQ 'MVT').NOOSTM .                               26280000
          STM    R2,R9,TCBGRS+32(R11) SAVE OTHER REGS IN THE TCB          26300000
.NOOSTM   ANOP .                                                          26320000
TDISCOPY  DS     0H .               PAD NOPR CODE WHICH IS                26340000
          DC     10X'0700' .          OVERLAYED BY QCM INIT WITH          26360000
TDISCEND  DS     0H .                 OS DISPATCHER INSTRUCTIONS          26380000
          BALR   R11,0 .            LOAD BASE REG                         26400000
          USING  *,R11                                             GFC TM 26420000
          USING  TTTDSECT,R4                                       GFC TM 26440000
          USING  QCMTABLE,R10                                      GFC TM 26460000
          USING  PCEDSECT,R13                                      GFC TM 26480000
          NI     TDEVSTAT,255-TIOINTER TURN OFF THE INTERRUPT BIT  GFC TM 26500000
          LA     R5,TSCSUBS         LOAD SUBROUTINE BASE REG       GFC TM 26520000
          L      R10,TQCMTBLE                                      GFC TM 26540000
          LR     R4,R14             LOAD R4 WITH TCB FOR SEARCH    GFC TM 26560000
          ENTRY  TRESPSW1 .                                               26580000
TRESPSW1  EQU    *+2 .              ADDR FILLED IN BY QCM INIT            26600000
          AIF    ('&SYS' EQ 'MVT').VWAITST                                26620000
          TM     RESUMPSW+1,X'02' . IS CPU GOING TO HARD WAIT             26640000
          AGO    .WAITBR1 .                                               26660000
.VWAITST  ANOP .                                                          26680000
          TM     IEAPSW+1,X'02' .   IS CPU GIONG TO HARD WAIT             26700000
.WAITBR1  ANOP .                                                          26720000
          BO     TDISWAIT .         YES, BR AROUND TCBSEARCH              26740000
          BAL    R8,TTTPCEGT        GET NEW PCE AND TTT            GFC TM 26760000
          ST     R13,TPCENEW        STORE NEW PCE                  GFC TM 26780000
          ST     R4,TTTNEW          STORE NEW TTT                  GFC TM 26800000
TDISWAIT  NULL                                                     GFC TM 26820000
          L      R0,TIMENEW         SAVE THE PREVIOUS              GFC TM 26840000
          ST     R0,TIMEOLD         DISPATCH TIME                  GFC TM 26860000
          BAL    R8,TTIME           GET THE TIME                   GFC TM 26880000
          TM     TIOWAIT,TWAITBIT   WAS THE CPU HARD WAITING       GFC WA 26900000
          BZ     TDISNOWA           NO, SKIP WAIT ANALYSIS         GFC WA 26920000
          BAL    R15,TWAITANA       PERFORM WAIT ANALYSIS          GFC WA 26940000
TDISNOWA  NULL                                                     GFC WA 26960000
          ST     R0,TIMENEW         STORE THE CURRENT TIME         GFC TM 26980000
TNOPDISP  NULL                                                     GFC TM 27000000
          B      TDISINIT           BR THE FIRST TIME THRU         GFC TM 27020000
*         NOP                       PREV INSTRUCTION IS A NOP      GFC TM 27040000
*                                   AFTER THE VERY FIRST TIME      GFC TM 27060000
*                                   THRU THE DISPATCHER            GFC TM 27080000
          TM     TDEVSTAT,TCHARGE   IS INTERRUPT CPU TIME          GFC TM 27100000
*                                   CHARGEABLE                     GFC TM 27120000
          BZ     TDISCHGE           NO BR TO CHARGE FOR PREVIOUS   GFC TM 27140000
*                                   DISPATCH                       GFC TM 27160000
          S      R0,TDEVTIME        COMPUTE INTERRUPT CPU DELTA    GFC TM 27180000
          BNM    TOK1               BR IF DELTA IS NOT MINUS (OK)  GFC TM 27200000
          BAL    R8,T6HRCYCL        BAL TO CORRECT THE DELTA       GFC TM 27220000
TOK1      NULL                                                     GFC TM 27240000
          L      R13,TDEVPCE        LOAD INTERRUPT PCE ADDRESS     GFC TM 27260000
          L      R4,TDEVTTT         LOAD INTERRUPT TTT ADDRESS     GFC TM 27280000
          LA     R4,0(,R4)          C H D H                        GFC TM 27300000
```

```
         LTR   R4,R4              MONITORED                    GFC TM 27320000
         BZ    TINTCPUP           NO, BR TO ADD TO PCE ONLY    GFC TM 27340000
         LR    R2,R0              SAVE DELTA                   GFC TM 27360000
         AL    R2,TTTCPU          ADD OLD TCB TOTAL            GFC TM 27380000
         ST    R2,TTTCPU          STORE NEW TOTAL              GFC TM 27400000
TINTCPUP NULL                                                  GFC TM 27420000
         CLC   TDEVTTT(1),QMONPRTY WHAT PRTY WAS TCB               TM 27440000
         BH    TSKIPHA1           ABOVE MONITOR, SKIP PHASE ADD    TM 27460000
         LR    R2,R0              LOAD DELTA                       TM 27480000
         BL    TBELOWA1           BELOW MONITOR OR WAIT BRANCH     TM 27500000
         AL    R2,QMONTIME        MONITORED, UPDATE                TM 27520000
         ST    R2,QMONTIME          MONITORE PHASE TIME            TM 27540000
         B     TSKIPHA1           BR TO ADD TO PCE                 TM 27560000
TBELOWA1 DS    0H                                                  TM 27580000
         AL    R2,QBELOWAI        UPDATE                           TM 27600000
         ST    R2,QBELOWAI          PHASE TIME                     TM 27620000
TSKIPHA1 DS    0H                                                  TM 27640000
         AL    R0,PCECPUTM        ADD OLD PCE TOTAL            GFC TM 27660000
         ST    R0,PCECPUTM        STORE NEW TOTAL              GFC TM 27680000
TDISTART DS    0H                                              GFC TM 27700000
         NI    TDEVSTAT,255-TCHARGE-TCUEINT-TCONTNT TURN OFF   GFC MT 27720000
*                                 STATUS BITS                  GFC MT 27740000
         L     R0,TDEVTIME        LOAD INTERRUPT TIME          GFC TM 27760000
TDISCHGE NULL                                                  GFC TM 27780000
         S     R0,TIMEOLD         COMPUTE DELTA FOR THE PREVIOUSGFC TM 27800000
*                                 DISPATCH                     GFC TM 27820000
         BNM   TOK2               BR IF DELTA IS NOT MINUS (OK) GFC TM 27840000
         BAL   R8,T6HRCYCL        BAL TO CORRECT THE DELTA     GFC TM 27860000
TOK2     NULL                                                  GFC TM 27880000
         L     R13,TPCEOLD        GET PREVIOUS PCE POINTER     GFC TM 27900000
         L     R4,TTTOLD          GET OLD TTT ADDRESS          GFC TM 27920000
         LA    R4,0(,R4)          C H O B                      GFC TM 27940000
         LTR   R4,R4              MONITORED                    GFC TM 27960000
         BZ    TDISCPUP           NO, SKIP TTT ADD             GFC TM 27980000
         LR    R2,R0              SAVE DELTA                   GFC TM 28000000
         AL    R2,TTTCPU          ADD OLD TCB TOTAL            GFC TM 28020000
         ST    R2,TTTCPU          STORE NEW TOTAL              GFC TM 28040000
TDISCPUP NULL                                                  GFC TM 28060000
         CLC   TTTOLD(1),QMONPRTY WHAT PRTY WAS TCB                TM 28080000
         BH    TSKIPHA2           ABOVE MONITOR, SKIP PHASE ADD    TM 28100000
         LR    R2,R0              LOAD DELTA                       TM 28120000
         BL    TBELOWA2           BELOW MONITOR OR WAIT BRANCH     TM 28140000
         AL    R2,QMONTIME        MONITORED, UPDATE                TM 28160000
         ST    R2,QMONTIME          MONITORED PHASE TIME           TM 28180000
         B     TSKIPHA2           BR TO ADD TO PCE                 TM 28200000
TBELOWA2 DS    0H                                                  TM 28220000
         AL    R2,QBELOWAI        UPDATE                           TM 28240000
         ST    R2,QBELOWAI          PHASE TIME                     TM 28260000
TSKIPHA2 DS    0H                                                  TM 28280000
         TM    TIOWAIT,TIOBIT     WAS THE LAST DISPATCH A WAIT GFC WA 28300000
*                                 FOR I/O                      GFC WA 28320000
         BZ    TDISNOIO           NO, BR TO ADD TO CPU TIME    GFC WA 28340000
         AL    R0,PCEIOTM         ELSE ADD TO I/O WAIT TOTAL   GFC WA 28360000
         ST    R0,PCEIOTM         STORE THE NEW TOTAL          GFC WA 28380000
         NI    TIOWAIT,255-TIOBIT TURN OFF THE I/O WAIT BIT    GFC WA 28400000
         B     TDISEXIT           GO TO DISPATCH               GFC WA 28420000
TDISNOIO NULL                                                  GFC WA 28440000
         AL    R0,PCECPUTM        ADD OLD TOTAL                GFC TM 28460000
         ST    R0,PCECPUTM        STORE NEW TOTAL              GFC TM 28480000
TDISEXIT NULL                                                  GFC TM 28500000
         ENTRY TRESPSW2 .                                             28520000
TRESPSW2 EQU   *+2 .              ADDR FILLED IN BY QCM INIT          28540000
         AIF   ('&SYS' EQ 'MFT').FWAITST .                            28560000
         TM    IEAPSW+1,X'02' .   IS CPU GOING TO HARD WAIT           28580000
         AGO   .WAITBR2 .                                             28600000
.FWAITST ANOP .                                                       28620000
         TM    PFSUMPSW+1,X'02' . IS CPU GOING TO HARD WAIT           28640000
.WAITBR2 ANOP .                                                       28660000
         BZ    TACTIVEL .         NO, BR TO UPDATE PCE AND TTT        28680000
         LA    R13,WAITPCE        GET THE WAIT PCE             GFC TM 28700000
         SR    R4,R4              ZERO R4 (NO TTT)             GFC TM 28720000
         OI    TIOWAIT,TWAITBIT   TURN ON THE WAIT BIT         GFC TM 28740000
         B     TACTIVES           BR TO STORE NEW POINTERS     GFC TM 28760000
TACTIVEL DS    0H                                              GFC TM 28780000
         L     R13,TPCENEW        LOAD NEW PCE                 GFC TM 28800000
         L     R4,TTTNEW          LOAD NEW TTT                 GFC TM 28820000
TACTIVES DS    0H                                              GFC TM 28840000
         ST    R13,TPCEOLD        UPDATE PCE POINTER           GFC TM 28860000
         ST    R4,TTTOLD          UPDATE TTT POINTER           GFC TM 28880000
         ENTRY TRESPSW3 .                                             28900000
```

```
TRESPSW3 EQU    *+6 .               ADDR FILLED IN BY QCM INIT        29920000
         AIF    ('&SYS' EQ 'MFT').TMFTLM .                            28940000
         LM     R0,R15,TCRGRS(R14)  RESTORE REGS FROM TCB       GFC TM 28960000
         LPSW   IEAPSW              GO MAN GO (DISPATCHER)      GFC TM 28980000
.TMFTLM  AIF    ('&SYS' EQ 'MVT').TMVTLM .                            29000000
         LM     R10,R9,TCRGRS(R14)  .RESTORE REGS FROM TCB             29020000
         LPSW   RESUMPSW .          GO MAN GO (DISPATCH)               29040000
.TMVTLM  ANOP   .                                                      29060000
TDISINIT NULL                                                   GFC TM 29080000
         MVI    TNOPDISP+1,0        MAKE BR A NOP FOREVER AFTER GFC TM 29100000
         NI     TDEVSTAT,255-TCHARGE TURN OFF CHARGE FLAG       GFC TM 29120000
         B      TDISEXIT            RETURN                      GFC TM 29140000
 TITLE 'O S  E X T E N T I O N S              START I/O'        GFC TM 29160000
         SPACE  5                                                GFC TM 29180000
*********************************************************       GFC TM 29200000
*                                                    *           GFC TM 29220000
*              S T A R T   I/O   R O U T I N E       *           GFC TM 29240000
*                                                    *           GFC TM 29260000
*********************************************************       GFC TM 29280000
         SPACE  5                                                GFC TM 29300000
TSIO     NULL                                                    GFC TM 29320000
         DROP   R11 .                                                  29340000
         USING  *,R10 .                                                29360000
         USING  CUENTRY,R7                                      GFC TM 29380000
         USING  DEVENTRY,R6                                     GFC TM 29400000
         SIO    0(UAREG)            START I/O FROM OS           GFC TM 29420000
         BC     3,TSIORET           RETURN IF CC IS NOT EQUAL TO GFC TM 29440000
*                                   ZERO OR ONE                  GFC TM 29460000
         ST     R11,TR11SAVE .      SAVE R11                            29480000
         LR     R11,R10 .           LOAD COMMON EXTENTION BASE REG      29500000
         USING  TSIO,R11 .                                              29520000
         USING  QCMTABLE,R10                                            29540000
         L      R10,TQCMTBLE        LOAD QCM TABLE BASE REG      GFC TM 29560000
         BC     4,TCCNDCD1          BR IF CC=1                   GFC TM 29580000
         ST     R7,TRCGSAVE         SAVE R7                      GFC TM 29600000
         LR     R7,R6               GET UNIT ADDRESS INTO R7     GFC TM 29620000
         SRA    R7,4                SHIFT OUT DEVICE DIGIT       GFC TM 29640000
         LA     R7,TCUINDEX(R7)     GET ADDR OF CU INDEX BYTE    GFC TM 29660000
         TM     0(R7),X'FF'         TEST CONTROL UNIT'S STATUS   GFC TM 29680000
         BNM    TSIORET0            UNTIMED, RETURN              GFC TM 29700000
*                                   TIMED                        GFC TM 29720000
         IC     R7,0(,R7)           GET CONTROL UNIT INDEX       GFC TM 29740000
         N      R7,TCUMASK          ZERO ALL BUT INDEX BYTE      GFC TM 29760000
         STM    R8,R6,TSAVR8R6      SAVE THE REST OF THE REGS    GFC TM 29780000
         LA     R5,TSCSUBS          LOAD SUBROUTINE BASE REG     GFC TM 29800000
         BAL    R8,TTIME            GET THE TIME                 GFC TM 29820000
         BAL    R8,TMPXSIO .        PROCESS MPX CHANNEL OVERLAP          29840000
         BAL    R8,TCUDEFND         GET CONTR UNIT +DEVICE ENTRY GFC TM 29860000
         TM     DEVSTAT,TDISK       IS IT A DISK                 GFC TM 29880000
         BZ     TSIOTCB             NO, SKIP SEEK TEST           GFC TM 29900000
*****                                                                   29920000
*                                                                       29940000
*        TO CAUSE QCM TO MEASURE SEEKS ONLY ON DISKS CHANGE THE          29960000
*        NEXT TWO BRANCHES FROM TSIOTCB TO TSIORETZ                      29980000
*                                                                        30000000
*****                                                                    30020000
         L      R9,CAW              LOAD ADDR OF FIRST CCW       GFC TM 30040000
         CLI    0(R9),X'07'         IS IT A SEEK                 GFC TM 30060000
         BNE    TSIOTCB             NO, GO LOAD TCH ADDR         GFC TM 30080000
         L      R15,0(,R9) .        LOAD DATA ADDR FROM CCW              30100000
         CLC    DEVCYLIN,1(R15) .   IS IT THE SAME CYLINDER              30120000
         BNE    TNEWSEEK .          NO, BR                               30140000
         TM     4(R9),X'40' .       IS IT STAND ALONE SEEK               30160000
         BZ     TSIORETZ .          YES, TREAT AS NOP                    30180000
TNEWSEEK DS     0H .                                                     30200000
         MVC    DEVCYLIN,1(R15) .   NO MOVE IN NEW CYL ADDR              30220000
         MVI    TSEEKSW,0 .         SET THE SEEK SWITH                   30240000
         TM     4(R9),X'40' .       STAND ALONE SEEK                     30260000
         BZ     TSIOTCB             YES, SKIP CHAN TURN ON               30280000
         CI     CUSTATUS,TCHANBSY . INDICATE CHANNEL BUSY                30300000
TSIOTCB  DS     0H .                                                     30320000
         BAL    R8,TTTPCEST .       GET PCE AND TTT                      30340000
         TM     DEVSTAT,TCHARGE .   WAS AN INTERRUPT LOST                30360000
         BZ     TNOTLOST .          NO, BR                               30380000
         OI     DEVSTAT+1,TINTLOST .INDICATE INTERRUPT LOST              30400000
TNOTLOST DS     0H .                                                     30420000
         OI     DEVSTAT,TCHARGE     TURN ON DEVICE CHARGE FLAG   GFC TM 30440000
TSEEKSW  EQU    *+1                 SEEK SWITCH                  GFC TM 30460000
         B      TCHANON .           BR FOR NON SEEKS                     30480000
*                                                                        30500000
```

```
             MVI   TSEEKSW,X'FJ'          RESET THE SEEK SWITCH           GFC TM 30520000
             C     R13,DEVPCESK           DID THIS PCE DO LAST SEEK ON    GFC TM 30540000
*                                         THIS DEVICE                     GFC TM 30560000
             BNE   TCONTENP               NO SET UP TO MEASURE CONTEN.    GFC TM 30580000
             C     R4,DEVTTTSK            IS IT THE SAME TTT              GFC TM 30600000
             BNE   TCONTENT               NO SET UP TO MEASURE CONT.      GFC TM 30620000
             CLC   DEVDEB,9(TSTREG)       IS IT THE SAME DEB              GFC TM 30640000
             BNE   TSTDEB                 NO MOVE IN NEW DEB PPT          GFC TM 30660000
             L     R9,4(,TSTREG)          LOAD IOB ADDRESS                GFC TM 30680000
             CLC   DEVXTENT,IOBXTENT(R9)  IS IT THE SAME                  GFC TM 30700000
*                                         EXTENT WITHIN THE DEB           GFC TM 30720000
             BNE   TLPCESK                NO INDICATE DEGRADING SEEK      GFC TM 30740000
TSIOCHGE  NULL                                                            GFC TM 30760000
             ST    R4,DEVTTT              STORE BILLABLE TTT              GFC TM 30780000
             ST    R13,DEVPCE             STORE BILLABLE PCE              GFC TM 30800000
             ST    R0,DEVTIME             STORE TIME OF SIO               GFC TM 30820000
TSIORETZ  NULL                                                            GFC TM 30840000
             SR    R0,R0                  SET CC=0                        GFC TM 30860000
TSIOLM    NULL                                                            GFC TM 30880000
             LM    R7,R8,TREGSAVE         RESTORE THE REGS                GFC TM 30900000
             L     R11,TR11SAVE           RESTORE R11 CORRECTLY                  30920000
TSIORET   NULL                                                            GFC TM 30940000
*                                                                                30960000
*                                         THIS IS THE RETURN LINK TO IOS         30980000
*                                         OCM INIT FILLS IN THE CORRECT CODE     31000000
*                                                                                31020000
             DC    16X'00'                SPACE FOR RET LINK                     31040000
TSIORETO  NULL                                                            GFC TM 31060000
             L     R7,TREGSAVE            RELOAD R7                       GFC TM 31080000
             LR    R10,R11                LOAD HOOK BASE REG                     31100000
             DROP  R11                                                           31120000
             USING TSIO,R10                                                      31140000
             L     R11,TR11SAVE           RESTORE R11                            31160000
             TM    *,0                    SET CC=0 FOR FAST RETURN        GFC TM 31180000
             B     TSIORET                RETURN                          GFC TM 31200000
             DROP  R10                                                           31220000
             USING TSIO,R11                                                      31240000
TLRTRET1  DS    0H                                                        GFC TM 31260000
             L     R7,TREGSAVE            RESTORE R7                      GFC TM 31280000
TSIORETI  NULL                                                            GFC TM 31300000
             LR    R10,R11                LOAD HOOK BASE REG                     31320000
             DROP  R11                                                           31340000
             USING TSIO,R10                                                      31360000
             L     R11,TR11SAVE           RESTORE R11                            31380000
             TM    *,X'FF'                SET CC=1                        GFC TM 31400000
             B     TSIORET                FAST RETURN                     GFC TM 31420000
TCHANON   NULL                                                            GFC TM 31440000
             USING QCMTABLE,R10                                                  31460000
             USING TSIO,R11                                                      31480000
             OI    CUSTATUS,TCHANBSY      TURN ON THE CHANBUSY FLAG IN    GFC TM 31500000
*                                         THE CONTROL UNIT ENTRY          GFC TM 31520000
             B     TSIOCHGE               START TIMING I/O                GFC TM 31540000
TSTTCB    NULL                                                            GFC TM 31560000
             ST    R4,DEVTTTSK            STORE NEW SEEK TTT              GFC TM 31580000
TSTDEB    NULL                                                            GFC TM 31600000
             MVC   DEVDEB,9(TSTREG)       MOVE IN THE NEW DEB             GFC TM 31620000
             L     R9,4(,TSTREG)          LOAD ADDRESS OF IOB             GFC TM 31640000
             MVC   DEVXTENT,IOBXTENT(R9)  MOVE IN NEW EXTENT              GFC TM 31660000
             B     TSIOCHGE               BR TO START TIMING              GFC TM 31680000
TLPCESK   NULL                                                            GFC TM 31700000
             MVC   DEVXTENT,IOBXTENT(R9)  MOVE IN NEW EXTENT              GFC TM 31720000
             OI    DEVSTAT,TCONTNT        TURN ON THE DEGRADATION FLAG    GFC TM 31740000
             B     TSIOCHGE               BR TO START TIMING              GFC TM 31760000
TCONTENP  NULL                                                            GFC TM 31780000
             ST    R13,DEVPCESK           STORE NEW SEEK PCE              GFC TM 31800000
TCONTENT  NULL                                                            GFC TM 31820000
             L     R3,DEVTTTSK            SAVE OLD SEEK TTT               GFC TM 31840000
             ST    R4,DEVTTTSK            STORE NEW SEEK TTT              GFC TM 31860000
             LR    R4,R3                  LOAD OLD TCB SEEK INTO R4       GFC TM 31880000
             OI    DEVSTAT,TCONTNT        TURN ON THE CONTENTION BIT      GFC TM 31900000
             B     TSTDEB                 BR TO STORE THE DEB ETC         GFC TM 31920000
TCONDCO1  NULL                                                            GFC TM 31940000
             TM    CSW+4,X'50'            IS IT CONTROL UNIT BUSY         GFC TM 31960000
             BNO   TSIORETI               NO, RETURN                      GFC TM 31980000
             ST    R7,TREGSAVE            SAVE R7                         GFC TM 32000000
             LR    R7,R6                  GET UNIT ADDRESS INTO R7        GFC TM 32020000
             SRA   R7,4                   SHIFT OUT DEVICE DIGIT          GFC TM 32040000
             LA    R7,TCUINDEX(R7)        GET ADDR OF CU INDEX BYTE       GFC TM 32060000
             TM    0(R7),X'FF'            TEST CONTROL UNIT'S STATUS      GFC TM 32080000
             BNM   TLRTRET1               UNTIMED, RETURN                 GFC TM 32100000
*                                         TIMED                           GFC TM 32120000
```

```
                STM    R6,R6,TSAVR8R6      SAVE THE REST OF THE REGS      GFC TM 32140000
                IC     R7,0(,R7)           GET CONTROL UNIT INDEX         GFC TM 32160000
                N      R7,TCUMASK          ZERO ALL BUT INDEX BYTE        GFC TM 32180000
                MH     R7,TENTRYLN         MULT BY THE CU'S ENTRY LENGTH  GFC TM 32200000
                A      R7,QADCUTAB         COMPUTE ENTRY ADDRESS          GFC TM 32220000
                TM     CUSTATUS,TCHANBSY+TCUBILL ANY CHAN BUSY ON THIS    GFC TM 32240000
*                                          CONTROL UNIT                   GFC TM 32260000
*                                          OR IS THE TIME ALREADY BEING   GFC TM 32280000
*                                          BILLED                         GFC TM 32300000
                BNZ    TLP7RFT1            YES, RETURN                    GFC TM 32320000
                LA     R5,TSCSUBS          LOAD SUBROUTINE BASE REG       GFC TM 32340000
                BAL    R8,TTTPCESI .       GET PCE AND TTT                        32360000
                C      R13,CUPCECF         IS IT SELFCAUSED CU BUSY       GFC TM 32380000
                BNE    TCUCONTN            NO, BR TO CU CONTENTION        GFC TM 32400000
                NI     CUSTATUS,255-TCONTNT TURN OFF CONTENTION FLAG      GFC TM 32420000
                OI     CUSTATUS,TCUBILL    TURN ON CU BUSY BILLABLE FLAG  GFC TM 32440000
TCUTCHON  NULL                                                            GFC TM 32460000
                OI     CUSTATUS,TCHARGE    TURN CHARGE FLAG ON            GFC TM 32480000
TCUSTORE  NULL                                                            GFC TM 32500000
                ST     R13,CUPCE           STORE PCE                      GFC TM 32520000
                ST     R4,CUTT             STORE TTT                      GFC TM 32540000
TSIOCC1   NULL                                                            GFC TM 32560000
                TM     *,X'FF'             SET CC=1                       GFC TM 32580000
                B      TSIOLM              BR TO LOAD MULT AND RETURN     GFC TM 32600000
TCUCONTN  NULL                                                            GFC TM 32620000
                TM     CUSTATUS,TCHARGE    CHARGE FLAG ON                 GFC TM 32640000
                BO     TSIOCC1             YES, RETURN                    GFC TM 32660000
                OI     CUSTATUS,TCONTNT    TURN ON CU CONTENTION FLAG     GFC TM 32680000
                B      TCUTCHON            BR TO TURN ON CHARGE FLAG      GFC TM 32700000
        TITLE 'O S  E X T E N T I O N S               I/O INTERRUPT'      GFC TM 32720000
                SPACE 5                                                   GFC TM 32740000
*********************************************************                 GFC TM 32760000
*                                                          *              GFC TM 32780000
*              I N T E R R U P T   ROUTINE                 *              GFC TM 32800000
*                                                          *              GFC TM 32820000
*********************************************************                 GFC TM 32840000
                SPACE 5                                                   GFC TM 32860000
TINTRTN   NULL                                                            GFC TM 32880000
                ST     R15,8               SAVE ONE REG IN LOW CORE       010 TM 32900000
                BALR   R15,0               GET ADDRESSABILITY IN R15      GFC TM 32920000
                USING  TINTSAVE,R15                                       GFC TM 32940000
TINTSAVE  DS    0H                                                        GFC TM 32960000
                STM    R7,R6,TREGSAVE      SAVE ALL OF THE REGS           GFC TM 32980000
                MVC    TREGSAVE+32(4),8    MOVE IN ORIGINAL R15           010 TM 33000000
                DROP   R15                                                GFC TM 33020000
                BALR   R11,0               GET ADDRESSABILITY             GFC TM 33040000
                USING  *,R11                                              GFC TM 33060000
TINTBASE  DS    0H                                                        GFC TM 33080000
                LH     R6,IOPSW0+2         LOAD INTERRUPT UNIT ADDRESS    GFC TM 33100000
                SR     R9,R9               ZERO R9                        GFC TM 33120000
                IC     R9,IOPSW0+2         LOAD INTERRUPT CHANNEL ADDR    GFC TM 33140000
                L      R10,TQCMTBLE        LOAD ADDR OF THE QCM TABLE     GFC TM 33160000
                LA     R5,TSCSUBS          LOAD SUBROUTINE BASE REG       GFC TM 33180000
                BAL    R8,TTIME            GET THE TIME                   GFC TM 33200000
                TM     TDEVSTAT,TIOINTER   IS THIS A STACKED INTERRUPT    GFC TM 33220000
                BO     TSTACKED            YES DON'T STORE THE TIME       GFC TM 33240000
                OI     TDEVSTAT,TIOINTER   NO TURN ON THE I/O INT BIT     GFC TM 33260000
                ST     R0,TDEVTIME         AND STORE INTERRUPT TIME       GFC TM 33280000
TSTACKED  NULL                                                            GFC TM 33300000
                ST     R0,TINTIME          STORE THE TIME OF THIS INT     GFC TM 33320000
                TM     TIOWAIT,TWAITBIT    WAS THE CPU HARD WAITING       GFC WA 33340000
                BZ     TINTNOWA            NO, SKIP WAIT ANALYSIS         GFC WA 33360000
                BAL    R15,TWAITANA        ELSE ANALYZE WAIT              GFC WA 33380000
TINTNOWA  NULL                                                            GFC WA 33400000
                LR     R7,R6               GET UNIT ADDR IN R7            GFC TM 33420000
                SRA    R7,4                SHIFT OUT DEVICE DIGIT         GFC TM 33440000
                LA     R7,TCUINDEX(R7)     GET ADDR OF CU INDEX BYTE      GFC TM 33460000
                TM     0(R7),X'FF'         WHAT IS THE CU'S STATUS        GFC TM 33480000
                BM     TIMED               US TIMED BR TO PROCESS         GFC TM 33500000
*                                          OS UNTIMED MAKE SURE INTERRUPT GFC TM 33520000
*                                          CPU TIME IS NOT BILLED         GFC TM 33540000
                SR     R4,R4               INSURE NO TTT ACCUMULATION     GFC TM 33560000
                LA     R13,ESOPCE          LOAD ADDR OF ESOTERIC PCE      GFC TM 33580000
                OI     TDEVSTAT,TCHARGE    CHARGE NTF FOR INTER CPU TIME  GFC TM 33600000
                B      TINSTORE            RETURN                         GFC TM 33620000
TIMED     DS    0H                                                        GFC TM 33640000
                OI     TDEVSTAT,TCHARGE    CHARGE FOR INTERRUPT CPU TIME  GFC TM 33660000
                IC     R7,0(,R7)           GET CONTROL UNIT INDEX         GFC TM 33680000
                N      R7,TCUMASK          ZERO ALL BUT INDEX BYTE        GFC TM 33700000
                BAL    R8,TCUDEFND         GET CONTR UNIT +DEVICE ENTRY   GFC TM 33720000
*                                          GET CUENTRY IN R7              GFC TM 33740000
                L      R13,DEVPCE          GET PCE ADDR                   GFC TM 33760000
```

```
              L      R4,DEVTTT             GET TTT ADDR                        GFC TM 33780000
                                                                               GFC TM 33800000
TNOPCI        NULL
              TM     CSW+4,X'08'           TEST FOR CHANNEL END                GFC TM 33820000
              BO     TCHANEND              YES BR TO PROCESS CE                GFC TM 33840000
                                                                               GFC TM 33860000
TESTCUE       NULL
              TM     CSW+4,X'20'           TEST FOR CONTROL UNIT END           GFC TM 33880000
              BO     TCUEND                YES BR TO PROCESS CUE               GFC TM 33900000
                                                                               GFC TM 33920000
TESTDE        NULL
              TM     CSW+4,X'04'           TEST FOR DEVICE END                 GFC TM 33940000
              BZ     TINSTORE              STORE TCB AND PCE AND RETURN        GFC TM 33960000
                                                                               GFC TM 33980000
TDEEND        NULL
              TM     DEVSTAT,TCHARGE       IS IT AN UNSOLICITED DEVICE         GFC TM 34000000
*                                          END OR A DEVICE END AFTER JOB       GFC TM 34020000
*                                          TERMINATION                         GFC TM 34040000
              BZ     TOFFDEC               YES RETURN                          GFC TM 34060000
              L      R0,TINTIME            RELOAD R0 WITH THE TIME             GFC TM 34080000
*                                          A CONCURRENT CUE COULD HAVE         GFC TM 34100000
*                                          DESTROYED R0                        GFC TM 34120000
              BAL    R8,TMPXDE             PROCESS MPX CHANNEL OVERLAP                34140000
              L      R13,DEVPCE            GET PCE ADDR                        GFC TM 34160000
              L      R4,DEVTTT             GET TTT ADDR                        GFC TM 34180000
              LR     R9,R7                 SWAP                                       34200000
              LR     R7,R6                    R7 AND                                  34220000
              LR     R6,R9                       R6                                   34240000
              TM     DEVSTAT-DEVENTRY(R7),TCONTNT DEGRADING SEEK                      34260000
              BO     TCBPICK               YES DETERMINE LOW PRIORITY          GFC TM 34280000
*                                          TCB AND ACCOUNT FOR CONTENTION      GFC TM 34300000
*                                                                              GFC TM 34320000
*                        BILLABLE TIMING                                       GFC TM 34340000
*     THIS SUBROUTINE IS USED ON CUE AND DE.  WHEN ENTERED                     GFC TM 34360000
*     BY DE R7 MUST POINT TO THE DEVENTRY NOT THE CUENTRY.                     GFC TM 34380000
*     SINCE THE CTRL BLOCKS HAVE THE SAME STRUCTURE THE SAME                   GFC TM 34400000
*     CODE WORKS.  THE PROPER RETURN IS CHOSEN BY COMPARING                    GFC TM 34420000
*     R7 TO R6.  IF THEY ARE = IT IS PROCESSING A DEVICE AND                   GFC TM 34440000
*     IT RETURNS TO OS.  OTHERWISE IT RETURNS TO CHECK FOR                     GFC TM 34460000
*     DEVICE END.                                                              GFC TM 34480000
*                                                                              GFC TM 34500000
              SPACE  3                                                         GFC TM 34520000
TBILLABL      NULL                                                             GFC TM 34540000
              SL     R0,CUTIME-DEVTIME     COMPUTE THE DELTA                   GFC TM 34560000
              BNM    TOK3                  BE IF DELTA IS NOT MINUS (OK)       GFC TM 34580000
              BAL    R8,TCHRCYCL           FAL TO CORRECT THE DELTA            GFC TM 34600000
TOK3          NULL                                                             GFC TM 34620000
              CL     R0,HRSCNVRT           DID I/O OP TAKE 1 HR OR MORE        026 TM 34640000
              BNL    TBADIO1               YES, ASSUME HARDWARE ERROR AND      026 TM 34660000
*                                          SKIP CHARGE                         026 TM 34680000
              LA     R4,0(,R4)             CH O B                              GFC TM 34700000
              LTR    R4,R4                 ZERO                                GFC TM 34720000
              BZ     TCUDEVIO              YES,BR TO SKIP TTT ADD              GFC TM 34740000
              LH     R9,DEVPSUCH-DEVENTRY(,R7) LOAD PSUEDO CHAN INDEX                 34760000
              LTR    R9,R9                 ZERO                                       34780000
              BNZ    TPATHADD              NO, BR TO ADD                              34800000
              IC     R9,IUPSW0+2           YES GET CHAN ADDR                          34820000
              BAL    R8,TCHAINDX           GET CHA INDEX                              34840000
TPATHADD      DS     0H                                                               34860000
              LR     R1,R0                 ADD I/O                                 TM 34880000
              AL     R1,TTTIO(R9)             TIME TO                              TM 34900000
              ST     R1,TTTIO(R9)                CHANNEL PATH IN TTT              TM 34920000
              LH     R9,CUBOTTLE           IS THIS A QCM                              34940000
              LTR    R9,R9                 DEFINED BOTTLENECK                         34960000
              BZ     TBOTTLE2              NO TEST CUE                                34980000
              LR     R1,R0                 YES, ADD I/O TIME                       TM 35000000
              AL     R1,TTTIO(R9)             TO THE                               TM 35020000
              ST     R1,TTTIO(R9)                CONTROL UNIT PATH IN TTT         TM 35040000
TBOTTLE2      DS     0H                                                               35060000
              CR     R7,R6                 IS IT A CUE                                35080000
              BL     TCUDEVIO              YES, DONE                                  35100000
              LH     R9,CUBOTTLE-CUENTRY(,R6) IS THERE A QCM                          35120000
              LTR    R9,R9                 DEFINED BOTTLENECK                         35140000
              BZ     TCUDEVIO              NO ADD TIME TO COMPONENT                   35160000
              LR     R1,R0                 YES, ADD I/O TIME                       TM 35180000
              AL     R1,TTTIO(R9)             TO THE                               TM 35200000
              ST     R1,TTTIO(R9)                DEVICE PATH IN TTT               TM 35220000
TCUDEVIO      NULL                                                              GFC TM 35240000
              LR     R1,R0                 GET DELTA                            GFC TM 35260000
              AL     R1,CUTIMET-DEVTIMET   ADD OLD TIME FOR CU DEV              GFC TM 35280000
              ST     R1,CUTIMET-DEVTIMET   STORE NEW TOTAL FOR CU OR DEV        GFC TM 35300000
                                                                                GFC TM 35320000
TCPCEIO       NULL
              AL     R0,PCEIOTM            ADD OLD I/O TOTAL                    GFC TM 35340000
              ST     R0,PCEIOTM            STORE THE NEW                        GFC TM 35360000
TBADIO1       DS     0H                                                         026 TM 35380000
```

```
          NI      CUSTATUS,255-TCHARGE-TCONTNT-TCUBILL              GFC TM 35400000
*                                         TURN OFF THE CHARGE        GFC TM 35420000
*                                         THE CONTENTION FLAG        GFC TM 35440000
*                                         AND CU BUSY BILLABLE       GFC TM 35460000
*                                         FLAG IN THE CU OR DEV ENTRY GFC TM 35480000
          CR      R6,R7                   IS IT DEVICE END           GFC TM 35500000
          BH      TESTDE                  NO BR TO TEST FOR IT           35520000
TINSTORE  NULL                                                       GFC TM 35540000
          ST      R4,TDEVTTT              STORE TTT IN HEAD          GFC TM 35560000
          ST      R13,TDEVPCE             STORE PCE IN HEAD          GFC TM 35580000
TINTLM    NULL                                                       GFC TM 35600000
          MVC     8(8,0),OICNPSW          MOVE IN NEW I/O NEW PSW    010 TM 35620000
          LM      R7,R6,TREGSAVE          RESTORE REGS AS OF INTERRUPT GFC TM 35640000
          LPSW    8                       GO MAN GO                  010 TM 35660000
TCHANEND  NULL                                                       GFC TM 35680000
          USING   TINTBASE,R11                                       GFC TM 35700000
          ST      R13,CUPCECE             STORE CHAN END PCE FOR POTEN- GFC TM 35720000
*                                         TIAL CONTROL UNIT BUSY     GFC TM 35740000
          ST      R4,CUTTICE              STORE CHAN END TTT LIKE WISE GFC TM 35760000
          ST      R0,CUTIME               STORE TIME OF CE INTERUPT FOR GFC TM 35780000
*                                         CU BUSY TIMING             GFC TM 35800000
          TM      DEVSTAT,TCHARGE         DID SIO OCCUR PRIOR TO INIT GFC TM 35820000
          BZ      TOFFDEC                 YES RETURN                 GFC TM 35840000
          SL      R0,DEVTIME              SUBTRACT TIME OF SIO (DELTA) GFC TM 35860000
          BNM     TOK4                    BR IF DELTA IS NOT MINUS (OK) GFC TM 35880000
          BAL     R8,T6HRCYCL             BAL TO CORRECT THE DELTA   GFC TM 35900000
TOK4      NULL                                                       GFC TM 35920000
          LR      R1,R0                   SAVE IT IN R1              GFC TM 35940000
          BAL     R8,TCHAINDX .           GET CHA INDEX                  35960000
          L       R3,SPICHAA              GET ADDR OF 1ST CHANNEL ENTRY GFC TM 35980000
          AL      R0,0(R9,R3)             ADD OLD TOTAL              GFC TM 36000000
          ST      R0,0(R9,R3)             STORE NEW TOTAL            GFC TM 36020000
          AL      R1,CUTIMET              ADD OLD CONTROL UNIT TOTAL GFC TM 36040000
          ST      R1,CUTIMET              STORE NEW TOTAL            GFC TM 36060000
          NI      CUSTATUS,255-TCHANBSY   TURN OFF CHAN BUSY FLAG    GFC TM 36080000
          L       R0,TINTIME              RELOAD R0 WITH THE TIME    GFC TM 36100000
          B       TESTCUE                 BR TO TEST FOR CUE         GFC TM 36120000
TCUEND    NULL                                                       GFC TM 36140000
          TM      CUSTATUS,TCHARGE        CHARGE FLAG ON             GFC TM 36160000
          BZ      TESTCUEF                BR TO TEST FOR CUE ALREADY GFC TM 36180000
*                                         PROCESSED                  GFC TM 36200000
          OI      TDEVSTAT,TCUEINT        TURN ON THE CUE PROCESSED BIT GFC TM 36220000
          L       R13,CUPCE               GET PCE ADDR               GFC TM 36240000
          L       R4,CUTTT                GET TTT ADDR               GFC TM 36260000
          C       R13,CUPCECE             IS IT SELF CAUSED CU BUSY  GFC TM 36280000
          BNE     TCBPICK                 NO BR TO ANALYZE CONTENTION GFC TM 36300000
          B       THTLLABL                BR TO CHARGE CU TIME       GFC TM 36320000
TESTCUEF  NULL                                                       GFC TM 36340000
          TM      TDEVSTAT,TCUEINT        CUE PROCESSED ALREADY      GFC TM 36360000
          BZ      TOFFCUC                 NO BR TO TURN OFF CHARGE FLAG GFC TM 36380000
*                                         IN THE HEAD                GFC TM 36400000
          TM      CSW+4,X'04'             TEST FOR DE                GFC TM 36420000
          BO      TOFEND                  BR YES TO PROCESS          GFC TM 36440000
          B       TINTLM                  ELSE RETURN                GFC TM 36460000
TOFFCUC   NULL                                                       GFC TM 36480000
          SR      R4,R4                   INSURE NO TTT ACCUMULATION GFC TM 36500000
          LA      R13,FSOPCE              LOAD ADDR OF ESOTERIC PCE  GFC TM 36520000
          B       TESTDE                  BR TO TEST DEVICE END      GFC TM 36540000
TOFFDEC   NULL                                                       GFC TM 36560000
          NI      TDEVSTAT,255-TCHARGE    TURN OFF CHARGE FLAG IN THE GFC TM 36580000
*                                         HEAD                       GFC TM 36600000
          B       TINTLM                  BR TO RETURN               GFC TM 36620000
*                                                                    GFC TM 36640000
*                         CONTENTION TIMING                          GFC TM 36660000
*         THIS SUBROUTINE IS USED ON CUE AND DE. WHEN ENTERED         GFC TM 36680000
*         BY DE R7 MUST POINT TO THE DEVENTRY NOT THE CUENTRY.        GFC TM 36700000
*         SINCE THE CTRL BLOCKS HAVE THE SAME STRUCTURE THE SAME      GFC TM 36720000
*         CODE WORKS. THE PROPER RETURN IS CHOSEN BY COMPARING        GFC TM 36740000
*         R7 TO R6. IF THEY ARE = IT IS PROCESSING A DEVICE AND       GFC TM 36760000
*         IT RETURNS TO US. OTHERWISE IT RETURNS TO CHECK FOR         GFC TM 36780000
*         DEVICE END.                                                 GFC TM 36800000
*                                                                    GFC TM 36820000
          SPACE 3                                                    GFC TM 36840000
TCBUSP    EQU     35                      OFFSET TO TCB'S PRIORITY   GFC TM 36860000
TCBTTT    EQU     168                     OFFSET TO TTT POINTER      GFC TM 36880000
          SPACE 3                                                    GFC TM 36900000
TCBPICK   NULL                                                       GFC TM 36920000
*                                         THE HEAD                   GFC TM 36940000
          SL      R0,CUTIME DEVTIME       COMPUTE DELTA              GFC TM 36960000
          BNM     TOK5                    BR IF DELTA IS NOT MINUS (OK) GFC TM 36980000
          BAL     R8,T6HRCYCL             BAL TO CORRECT THE DELTA   GFC TM 37000000
```

```
TOK5    NULL                                                                GFC TM 37020000
        CL      R0,HRSCNVRT     DID I/O OP TAKE 1 HR OR MORE    026 TM 37040000
        BNL     TBADI02         YES, ASSUME HARDWARE ERROR AND  026 TM 37060000
*                               SKIP CHARGE                     026 TM 37080000
        CLC     CUTTT(1),CUTTTCE COMPARE OS PRTYS                   TM 37100000
        BH      TCDEVCON        OLD HIGH CHARGE IT DEGRADATION      TM 37120000
        BL      TLOTHERS        LOW LOAD R4 AND R13 AND CHARGE GFC TM 37140000
*                               EQUAL CONTINUE                  GFC TM 37160000
        LA      R4,0(,R4)       C H O B                         GFC TM 37180000
        LTR     R4,R4           MONITORED                       GFC TM 37200000
        BZ      TTTOK           NO, BR TO ADD TO DEV AND PCE    GFC TM 37220000
        C       R4,TTTTTT       TTT VALID                       GFC TM 37240000
        BNE     TCDEVCON        NO, BR TO ADD TO DEV AND PCE    GFC TM 37260000
        L       R3,CUTTTCE      LOAD THE OTHER TTT POINTER      GFC TM 37280000
        LA      R3,0(,R3)       C H O B                         GFC TM 37300000
        LTR     R3,R3           MONITORED                           TM 37320000
        BZ      TCDEVCON        NO, BR TO ADD TO DEV AND PCE    GFC TM 37340000
        C       R3,MTTTTT(,R3)  TTT VALID                           TM 37360000
        BNE     TCDEVCON        NO, BR TO ADD TO DEV AND PCE    GFC TM 37380000
        CLC     MTTIOPR(1,R3),TTTIOPR COMPARE OCM I/O PRIORITIES    37400000
        BH      TTTGOOD         HIGH CHARGE NONPROD I/O         GFC TM 37420000
        BL      TSWAP           LOW, CHARGE OTHER                   37440000
        CLC     TTTCPUPR(1),MTTCPUPR(R3) EQUAL, CHECK ORDER         37460000
        BL      TTTGOOD         BR R4 ABOVE TO CHARGE IT            37480000
TSWAP   DS      0H              R4 BELOW                            37500000
        LR      R4,R3           LOAD R4 WITH TTT TO CHARGE      GFC TM 37520000
        L       R13,CUPCECE     LOAD R13 WITH PCE TO CHARGE     GFC TM 37540000
        B       TTTGOOD         CHARGE THEM                     GFC TM 37560000
TLOTHERS DS     0H                                              GFC TM 37580000
        L       R13,CUPCECE     GET OTHER PCE POINTER           GFC TM 37600000
        B       TCDEVCON        SKIP TTT CHARGE                     TM 37620000
TTTGOOD DS      0H                                              GFC TM 37640000
        LR      R1,R0           GET DELTA                       GFC TM 37660000
        AL      R1,TTTDEGRA     ADD DEGRADATION TIME                TM 37680000
        ST      R1,TTTDEGRA     STORE NEW TOTAL                     TM 37700000
        B       TTTOK           BR TO ADD TO DEV AND PCE        GFC TM 37720000
TCDEVCON DS     0H                                              GFC TM 37740000
        SR      R4,R4           DONT CHARGE ANY TTT INT CPU TM  GFC TM 37760000
TTTOK   DS      0H                                              GFC TM 37780000
        LR      R1,R0           GET DELTA                       GFC TM 37800000
        AL      R1,CUTIMEC      ADD OLD TIME                    GFC TM 37820000
        ST      R1,CUTIMEC      STORE NEW TOTAL                 GFC TM 37840000
        AL      R0,PCECONT      ADD OLD TIME                    GFC TM 37860000
        ST      R0,PCECONT      STORE NEW TOTAL                 GFC TM 37880000
TBADI02 DS      0H                                              026 TM 37900000
        NI      CUSTATUS,255-TCHARGE-TCONTNT-TCUBILL            GFC TM 37920000
*                               TURN OFF THE CHARGE             GFC TM 37940000
*                               CONTENTION                      GFC TM 37960000
*                               AND CONTROL UNIT BUSY BILLABLE  GFC TM 37980000
*                               FLAG IN DEVICE OR CU ENTRY      GFC TM 38000000
        SR      R4,R4           INSURE NO TTT ACCUMULATION      GFC TM 38020000
        LA      R13,ESOPCE      LOAD ADDR OF ESOTERIC PCE       GFC TM 38040000
        CR      R6,R7           WAS IT A DEVICE END             GFC TM 38060000
        BH      TESIDE          NO BR TO TEST FOR IT                   38080000
        B       TINSTORE        BR TO STORE AND RETURN                 38100000
        TITLE 'O S  E X T E N T I O N S        SUB - TTT+PCE GET' GFC TM 38120000
        SPACE 5                                                 GFC TM 38140000
***************************************************************  GFC TM 38160000
*                                                             *  GFC TM 38180000
*          T T T + P C E   G E T   SUBROUTINE                 *  GFC TM 38200000
*                                                             *  GFC TM 38220000
***************************************************************  GFC TM 38240000
                                                                GFC TM 38260000
        SPACE 5                                                 GFC TM 38280000
TSCSUBS NULL                                                    GFC TM 38300000
        USING TSCSUBS,R5
TTTPCESI DS     0H .                                                   38320000
        AIF   ('&SYS' EQ 'MFT').MFTCB .                                38340000
        L       R4,12(,TSTREG) .GET TCB ADDR FROM RQE                  38360000
        LTR     R4,R4 .         IS IT A VALID RQE                      38380000
        BNZ     TTTPCEGT .      YES, BR                                38400000
        L       R4,QMSTCB .     NO, LOAD MS TCB ADDR                   38420000
        AGO     .VTCBFND .                                             38440000
.MFTCB  ANOP .                                                         38460000
        L       R4,16 .         LOAD THE CVTPTR                        38480000
        L       R4,CVTHEAD(,R4) . LOAD TOP OF THE CPU QUEUE            38500000
TCBFFIND DS     0H .                                                   38520000
        CLC     TCBIDE(1,R4),4(TSTREG) IS IT THIS TCB                  38540000
        BE      TTTPCEGT .      YES, GO GET PCE + TTT                  38560000
        L       R4,TCBTCB(,R4) . GET NEXT LOWER TCB                    38580000
        LTR     R4,R4 .         END OF CHAIN                           38600000
        BZ      TLOMSTCB .      YES, GIVE UP AND LOAD MSTCB            38620000
        B       TCBFFIND .      TEST IT                                38640000
```

```
TLOMSTCB DS    OH .                     BAD POE FIX                                38660000
         L     R4,QMSTCB .              LOAD MS TCB TO FIX BAD RQE                 38680000
*                                                                                  38700000
*        THIS CODE FINDS THE PARTITION TCB.                                        38720000
*                                                                                  38740000
TTTPCEGT DS    OH .                                                                38760000
         LR    R12,R4 .                 LOAD TCB PTR INTO WK REG                   38780000
TCBFIND  DS    OH .                                                                38800000
         L     R15,TCBOTC(,R12) .       GO UP ONE                                  38820000
         LTR   R15,R15 .                WAS R12 TASK THE PARTITION TCA             38840000
         BZ    TPCELOAD .               YES, GO LOAD PCE                           38860000
         LR    R12,R15 .                SET TO GO UP ONE MORE                      38880000
         B     TCBFIND .                BR TO GO UP ONE MORE                       38900000
         AGO   .FPCELOA .                                                          38920000
                                                                                   38940000
.VTCBFND ANOP  .                                                           GFC TM  38960000
TTTPCEGT NULL                                                                      38980000
         C     R4,QMSTCB                IS IT THE MASTER SCHEDULER         GFC TM  39000000
         BNE   TUPONE                   NO, GO UP THE CHAIN                GFC TM  39020000
         L     R13,TCBUSER(,R4)         YES, LOAD PCE ADDR                 GFC TM  39040000
         B     TTTGET                   BR TO GET TTT                      GFC TM  39060000
TUPONE   NULL                                                              GFC TM  39080000
         L     R12,TCBOTC(,R4)          GET ORIGINATING TCB ADDRESS        GFC TM  39100000
         C     R12,QMSTCB               IS IT THE MASTER SCHEDULER                 39100000
         BNE   TCBFIND                  NO, GO UP AGAIN                    GFC TM  39120000
         L     R13,TCBUSER(,R4)         YES, GET PCE ADDR                  GFC TM  39140000
         LR    R12,R4                   GET PROCESS TCB INTO R12           GFC TM  39160000
         B     TPCEEST                  GO CHECK FOR NEW PROCESS TASK      GFC TM  39180000
TCBFIND  NULL                                                              GFC TM  39200000
         L     R15,TCBOTC(,R12)         LOAD ADDR OF ORIGINATING TCB       GFC TM  39220000
         C     R15,QMSTCB               IS IT THE MASTER SCHEDULER                 39240000
         BE    TPCELOAD                 YES, GO LOAD PCE                   GFC TM  39260000
         LR    R12,R15                  NO, SETUP TO GO UP AGAIN           GFC TM  39280000
         B     TCBFIND                  BR TO GO UP ONE MORE               GFC TM  39300000
.FPCELOA ANOP  .                                                                   39320000
TPCELOAD NULL                                                              GFC TM  39340000
         L     R13,TCBUSER(,R12)        LOAD PCEADDR                       GFC TM  39360000
TPCEEST  NULL                                                              GFC TM  39380000
         LTR   R13,R13                  IS THIS A NEW PROCESS TASK         GFC TM  39400000
         BZ    TNOPCE .                 YES, BR TO GET PCE                         39420000
         CL    R13,PCETTT .             IS IT A PCE AND NOT A TTT                  39440000
         BNE   TTTGET .                 YES, BR                                    39460000
TNOPCE   DS    OH .                                                                39480000
         SPACE 5                                                           GFC TM  39500000
         AIF   ('&SYS' EQ 'MFT').FPCENAM .                                         39520000
*                                       YES, CHECK FOR MASTER SCHEDULE    GFC TM  39540000
*                                       COMMAND SUBTASKS. IF NOT           GFC TM  39560000
*                                       SEARCH EXISTING PCE'S FOR          GFC TM  39580000
*                                       DORMANT TASK MATCH ON TIOT         GFC TM  39600000
*                                       NAME                               GFC TM  39620000
         L     R15,TCBTIO(,R12)         GET TIOT ADDR                      GFC TM  39640000
         CLC   0(8,R15),TMASTER         IS IT A TEMPORARY TASK             013 TM  39660000
         BE    TCOMMAND                 YES, BR TO LOAD MASER PCER         GFC TM  39680000
         CLC   0(8,R15),TMOUNT          IS IT A TEMPORARY TASK             016 TM  39700000
         BE    TCOMMAND                 YES, BR TO LOAD MASTER PCER        016 TM  39720000
         CLC   8(8,R15),TSTARTIN        IS PROCESS JUST STARTING           GFC TM  39740000
         BE    TCOMMAND                 YES, CHARGE MASTER SCHEDULR        GFC TM  39760000
.FPCENAM ANOP  .                                                                   39780000
         L     R13,QPCETOP              GET FIRST PCE ADDR                 GFC TM  39800000
         LTR   R13,R13                  IS THE Q EMPTY                     GFC TM  39820000
         BZ    TPCEGET1                 YES, BR TO INITIALIZE Q            GFC TM  39840000
         AIF   ('&SYS' EQ 'MFT').FNODOR .                                          39860000
TESTNAME NULL                                                              GFC TM  39880000
         CLC   0(16,R15),PCENAMF        SAME NAME                          GFC TM  39900000
         BE    TDORMANT                 YES, GO TEST FOR DORMANCY          GFC TM  39920000
TPCESRCH NULL                                                              GFC TM  39940000
         L     R13,PCECHAIN             GET NEXT PCE                       GFC TM  39960000
         LTR   R13,R13                  END OF CHAIN                       GFC TM  39980000
         BNZ   TESTNAME                 NO, BR TO TEST NEW NAME            GFC TM  40000000
.FNODOR  ANOP  .                                                                   40020000
TPCEGET  DS    OH                                                          GFC TM  40040000
         L     R13,QFREQTOP             YES, TRY TO GET A NEW PCE          GFC TM  40060000
         LTR   R13,R13                  ANY MORE                           GFC TM  40080000
         BZ    TQABEND                  NO, ABEND THE TASK                 GFC TM  40100000
TPCELINK DS    OH                                                          GFC TM  40120000
         L     R2,PCECHAIN              LOAD ADD OF NEXT FREE PCE          GFC TM  40140000
         ST    R2,QFREQTOP              STORE NEW FREE Q TOP               GFC TM  40160000
         L     R2,QPCEBOT               LOAD BOTTOM PCE                    GFC TM  40180000
         ST    R13,0(,R2)               LINK NEW ONE AT THE BOTTOM         GFC TM  40200000
         ST    R13,QPCEBOT              STORE NEW BOTTOM POINTER           GFC TM  40220000
         SR    R2,R2                    TERMINATE                          GFC TM  40240000
         ST    R2,PCECHAIN               CHAIN                             GFC TM  40260000
         XC    PCETTT(PCEEND-PCETTT),PCETTT CLEAR NEW PCE                  GFC TM  40280000
```

```
            AIF   ('&SYS' EQ 'MFT').FNAMVC .                              GFC TM 40300000
            MVC   PCENAME,0(R15)    MOVE IN TIOT NAME                     GFC TM 40320000
            AGO   .MVTNAME .                                                     40340000
.FNAMVC     ANOP  .                                                              40360000
            MVI   PCENAME,C' ' .    MOVE IN BLANK FOR PROPOGATION                40380000
            MVC   PCENAME+1(7),PCENAME PROPOGATE BLANKS THROUGH NAME             40400000
            MVI   PCENAME,C'P' .    MOVE FIRST CHARACTER                         40420000
            SR    R2,R2 .           ZERO WORK REG                                40440000
            IC    R2,TCBIDF(,R12) . LOAD THE TCB'S ID OR NUMBER                  40460000
            SI    R2,QFSYSTCB .     CONVERT TO PART NUMBER                       40480000
            SL    R2,TEN .          SUBTRACT 10                                  40500000
            BM    TIDIGIT .         MINUS BR TO PROCESS ONE DIGIT                40520000
            MVI   PCENAME+1,C'1' H  MOVE IN FIRST DIGIT                          40540000
            STC   R2,PCENAME+2 .    STORE SECOND DIGIT                           40560000
            OI    PCENAME+2,X'F0' . CONVERT TO EBCDIC                            40580000
            B     TNAMDONE .        BR DONE                                      40600000
TIDIGIT     DS    0H .                                                           40620000
            LA    R2,10(,R2) .      ADD TEN                                      40640000
            STC   R2,PCENAME+1 .    STORE DIGIT                                  40660000
            OI    PCENAME+1,X'F0' . CONVERT TO EBCDIC                            40680000
.MVTNAME    ANOP  .                                                              40700000
TNAMDONE    DS    0H .                                                           40720000
                                                                          GFC TM 40740000
*                       DETERMINE IF TASK IS OVERHEAD OR                  GFC TM 40760000
*                       PRODUCTIVE AND MARK ACCORDINGLY                   GFC TM 40780000
*                                                                         GFC TM 40800000
            L     R2,QNUMOVHD       LOAD COUNT OF OVERHEADS                GFC TM 40820000
            LTR   R2,R2 .           IS THE OVERHEAD TABLE EMPTY                  40821000
            BZ    TPCESTOR .        YES, BR TO FILL IN PCE PTR                   40822000
            L     R15,QADPOVHD      LOAD ADDR OF FIRST OVERHEAD            GFC TM 40840000
TOVHDTST    DS    0H                                                       GFC TM 40860000
            CLC   PCENAME,0(R15)    IS IT THIS OVERHEAD TASK               GFC TM 40880000
            BE    TOVERHED          YES, BR TO MARK IT                     GFC TM 40900000
            LA    R15,16(R15)       BUMP TO NEXT ENTRY                     GFC TM 40920000
            BCT   R2,TOVHDTST       CHECK ALL ENTRIES                      GFC TM 40940000
            B     TPCESTOR          BR TO FILL IN PCE POINTER              GFC TM 40960000
TOVERHED    DS    0H                                                       GFC TM 40980000
            LA    R2,1              MARK                                   GFC TM 41000000
            LNR   R2,R2                OVERHEAD                            GFC TM 41020000
            ST    R2,PCEJALPM                PCE                           GFC TM 41040000
            B     TPCESTOR          BR TO FILL IN PCE POINTER              GFC TM 41060000
TPCEGET1    DS    0H                                                       GFC TM 41080000
            L     R13,QFREQTOP      TRY TO GET A PCE                       GFC TM 41100000
            LTR   R13,R13           ANY MORE                               GFC TM 41120000
            BZ    TQABEND           NO, ABEND THE TASK                     GFC TM 41140000
            ST    R13,QPCETOP       YES, INITIALIZE THE ACT PCE Q          GFC TM 41160000
            B     TPCELINK          BR TO LINK THE PCE                     GFC TM 41180000
TOORMANT    DS    0H                                                       GFC TM 41200000
            AIF   ('&SYS' EQ 'MFT').FOORMNT .                                    41220000
            L     R9,QMSTCB         GET ADDR OF MASTER SCHED TCB                 41240000
            L     R9,TCBLTC(,R9)    GET M.S.'S LAST DAUGHTER TASK          GFC TM 41260000
TPCECOMP    NULL                                                           GFC TM 41280000
            C     R13,TCBUSER(,R9)  IS THIS PCE ACTIVE ON THIS TCB         GFC TM 41300000
            BE    TPCESRCH          YES, BR TO CONTINUE PCE SEARCH         GFC TM 41320000
            L     R9,TCBNTC(,R9)    GET PREVIOUS DAUGHTER TASK             GFC TM 41340000
            LTR   R9,R9             END OF CHAIN                           GFC TM 41360000
            BNZ   TPCECOMP          NO, COMPARE THIS TCB                   GFC TM 41380000
.FOORMNT    ANOP  .                                                              41400000
TPCESTOR    NULL                                                           GFC TM 41420000
            L     R9,TCBUSER(,R12)  LOAD TTT PTR IF ANY                          41440000
            ST    R13,TCBUSER(,R12) PUT PCE POINTER IN TCB                 GFC TM 41460000
            ST    R9,PCETTT .       STORE TTT PTR IF ANY                         41480000
*                                                                          GFC TM 41500000
            L     R9,PCECONTB       I N D I C A T E                        GFC TM 41520000
            LNR   R9,R9                                                    GFC TM 41540000
            ST    R9,PCECONTB                                              GFC TM 41560000
*                                                                          GFC TM 41580000
            L     R9,PCEIOJ                                                GFC TM 41600000
            LNR   R9,R9                                                    GFC TM 41620000
            ST    R9,PCEIOJ                                                GFC TM 41640000
*                                                                          GFC TM 41660000
            L     R9,PCECPUJ                                               GFC TM 41680000
            LNR   R9,R9                                                    GFC TM 41700000
            ST    R9,PCECPUJ                                               GFC TM 41720000
            B     TTTGET            BRANCH TO GET TTT                      GFC TM 41740000
TCOMMAND    DS    0H                                                       GFC TM 41760000
            L     R13,QMSPCE        LOAD ADDR OF MAST SCHED PCE            GFC TM 41780000
            B     TTTGET            BRANCH TO GET ITS TTT                  GFC TM 41800000
TQABEND     NULL                                                           GFC TM 41820000
            TM    TCBFLGS(R4),X'F6' IS TASK ALREADY TERMINATING            GFC TM 41840000
            BNZ   TSKABEND          YES,SKIP ABEND                         GFC TM 41860000
            TM    TCBFLGS+1(R4),X'18' IS TASK ABENDABLE                    GFC TM 41880000
```

```
          BNZ    TSKABEND              NO, SKIP ABEND                        GFC TM 41900000
          TM     TCBFLGS+4(R4),X'C5'   IS ABEND WISE                         GFC TM 41920000
          BNZ    TSKABEND              NO, SKIP ABEND                        GFC TM 41940000
          STM    R0,R15,TABENDSA       SAVE REGS ACROSS ABTERM               GFC TM 41960000
          LR     R0,R4                 PUT TCB ADDR INTO R0                  GFC TM 41980000
          L      R1,TABENDCC           LOAD THE COMPLETION CODE              GFC TM 42000000
          L      R15,CVTPTR            LOAD PTR TO CVT                       GFC TM 42020000
CVTQABST  EQU    212                                                         025 TM 42040000
          LA     R14,CVTQABST(,R15)    LOAD ADDR OF SVC 13 IN CVT            025 TM 42060000
          ST     R14,348               STORE IN PSW TO BE DISPATCHED         025 TM 42080000
          L      R15,CVTBTERM(,R15)    LOAD ADDRESS OF ABTERM                GFC TM 42100000
*                                                                            GFC TM 42120000
          BALR   R14,R15               K I L L    K I L L                    GFC TM 42140000
*                                                                            GFC TM 42160000
          USING  *,R14                                                       GFC TM 42180000
          LM     R0,R15,TABENDSA       RESTORE REGS                          GFC TM 42200000
          DROP   R14                                                         GFC TM 42220000
TSKABEND  DS     0H                                                          GFC TM 42240000
          LA     R13,ESOPCE            LOAD ADDR OF ESOTERIC PCE             GFC TM 42260000
          L      R15,TQCMLOGI          GET ADDR TO COMUTTATOR                GFC TM 42280000
          USING  QCMLOGIC,R15                                                GFC TM 42300000
          OI     WMESSAGE,X'80'        TURN ON INSUFF PCES MSG FLAG          GFC TM 42320000
          QPOST  CMESSAGE              POST THE MESSAGE PROCESSOR                TM 42340000
          DROP   R15                                                         GFC TM 42360000
          B      TPCESTOR              BR STORE NOPCE PCE                    GFC TM 42380000
TTTGET    DS     0H                                                          GFC TM 42400000
          IC     R15,TCBDSP(,R4)       INSERT TCB PRIORITY                   GFC TM 42420000
          SLL    R15,24                SHIFT TO HIGH ORDER BYTE              GFC TM 42440000
          L      R4,TCBUSER(,R4)       GET PCE OR TTT POINTER                GFC TM 42460000
          LTR    R4,R4                 ZERO                                  GFC TM 42480000
          BZ     TORPRTY               YES,BR TO OR IN PRIORITY              GFC TM 42500000
          L      R4,TTTTTT             GET TTT POINTER                       GFC TM 42520000
TORPRTY   DS     0H                                                          GFC TM 42540000
          OR     R4,R15                OR PRIORITY AND TTT ADDRESS           GFC TM 42560000
          BR     R8                    RETURN                                GFC TM 42580000
   TITLE 'O S   E X T E N T I O N S             SUB - 6 HR CLOCK FIX'        GFC TM 42600000
          SPACE  5                                                           GFC TM 42620000
***********************************************************                  GFC TM 42640000
*                                                          *                 GFC TM 42660000
*       S I X   H O U R   CHECK SUB-ROUTINE                *                 GFC TM 42680000
*                                                          *                 GFC TM 42700000
***********************************************************                  GFC TM 42720000
          SPACE  5                                                           GFC TM 42740000
T6HRCYCL  NULL                                                               GFC TM 42760000
          C      R0,TNEGCLK            DID THE CLOCK RUN BACKWARDS           GFC TM 42780000
          BL     TADD6HR               NO, GO CORRECT FOR 6 HR CYCLE         GFC TM 42800000
          B      *                     THIS INSTRUCTION SCHOULD              GFC TM 42820000
*                                      NE VER BE EXECUTED, IT                GFC TM 42840000
*                                      INDICATES THAT THE TIME RAN           GFC TM 42860000
*                                      BACKWARDS                             GFC TM 42880000
TADD6HR   NULL                                                               GFC TM 42900000
          A      R0,06HRS              ADD 6 HOURS TO FIX SHPC               GFC TM 42920000
          BR     R8                    RETURN                                GFC TM 42940000
   TITLE 'O S   E X T E N T I O N S             SUB - CU+DEV FIND'           GFC TM 42960000
          SPACE  5                                                           GFC TM 42980000
***********************************************************                  GFC TM 43000000
*                                                          *                 GFC TM 43020000
*      C O N T R O L   U N I T  +  D E V I C E   F I N D   *                 GFC TM 43040000
*                                                          *                 GFC TM 43060000
***********************************************************                  GFC TM 43080000
          SPACE  5                                                           GFC TM 43100000
TCUDEFND  DS     0H                                                          GFC TM 43120000
          MH     R7,TENTRYLN           MULT BY THE ENTRY LENGTH              GFC TM 43140000
          A      R7,QADCUTAB           COMPUTE ENTRY ADDRESS                 GFC TM 43160000
*                                      ENTRY INTO R7                         GFC TM 43180000
          N      R6,TDEVMASK           ZERO ALL BUT LAST DIGIT               GFC TM 43200000
          MH     R6,TENTRYLN           MULT BY THE ENTRY LENGTH              GFC TM 43220000
          A      R6,CUDFVSTR           ADD THE STARTING ADDR OF DEVS         GFC TM 43240000
*                                      FOR THIS CONTROL UNIT TO GET          GFC TM 43260000
*                                      ADDR OF THIS PARTICULAR ENTRY         GFC TM 43280000
          BR     R8                    RETURN                                GFC TM 43300000
   TITLE 'O S   E X T E N T I O N S             SUB - GET TIME'              GFC TM 43320000
          SPACE  5                                                           GFC TM 43340000
***********************************************************                  GFC TM 43360000
*                                                          *                 GFC TM 43380000
*              G T I M E   SUB/ROUTINE                     *                 GFC TM 43400000
*                                                          *                 GFC TM 43420000
***********************************************************                  GFC TM 43440000
          SPACE  5                                                           GFC TM 43460000
TTIME     NULL                                                               GFC TM 43480000
```

```
        L      R3,16                    GET CVT POINTER                              GFC TM 43500000
        L      R3,CVTTPCI,R3)           LOAD PTR TO SHPC                             GFC TM 43520000
        L      R0,0(,R3)                LOAD CURRENT VALUE OF SHPC                   GFC TM 43540000
        L      R3,80                    LOAD CURRENT TIMER VALUE                     GFC TM 43560000
        SRA    R3,1                     CONVERT TO 26 USEC UNITS                     GFC TM 43580000
        SR     R0,R3                    GET THE CURRENT TIME                         GFC TM 43600000
        SRA    R0,2                     CONVERT TO 104 USEC UNITS                    GFC TM 43620000
        BR     R8                       RETURN                                       GFC TM 43640000
    TITLE 'OS EXTENTIONS                      SUB - WAIT ANALYSES'                   GFC TM 43660000
        SPACE 5                                                                      GFC TM 43680000
***********************************************************                         GFC WA 43700000
*                                                        *                           GFC WA 43720000
*          WAIT  ANALYSIS   SUBROUTINE                   *                           GFC WA 43740000
*                                                        *                           GFC WA 43760000
***********************************************************                         GFC WA 43780000
        SPACE 5                                                                      GFC WA 43800000
                                                                                     GFC WA 43820000
TWAITANA NULL                                                                        GFC WA 43840000
        NI     TIOWAIT,255-TWAIT3IT     TURN OFF THE WAIT BIT                        GFC WA 43860000
        LR     R12,R0                   SAVE THE CURRENT TIME                        GFC WA 43880000
        S      R0,TIMENEW               COMPUTE CPU WAIT TIME                        GFC WA 43900000
        BNM    TWOK1                    BR IF TIME WAS NOT MINUS                     GFC WA 43920000
        BAL    R8,T6HPCYCL              ELSE FIX THE TIME                            GFC WA 43940000
TWOK1   NULL                                                                         GFC WA 43960000
        LR     R4,R0                    SAVE THE DELTA                               GFC WA 43980000
        L      R7,SPICONA               GET 1ST CONTROL UNIT ENTRY                   GFC WA 44000000
        LA     R2,DEVEND-DEVENTRY       LOAD INDEX                                   GFC WA 44020000
        L      R3,QDEVLAST              GET ADDR OF LAST DEV ENTRY                   GFC WA 44040000
TWAITLOP NULL                                                                        GFC WA 44060000
        TM     CUSTATUS,TCHARGE         I/O OUTSTANDING                              GFC WA 44080000
        BZ     TWABUMP                  NO, CHECK NEXT ENTRY                         GFC WA 44100000
        AL     R0,CUWAIT                ADD OLD TOTAL                                GFC WA 44120000
        ST     R0,CUWAIT                STORE THE NEW TOTAL                          GFC WA 44140000
        LR     R0,R4                    RESTORE THE DELTA                            GFC WA 44160000
        OI     TIOWAIT,TIOBIT           INDICATE THAT THE CPU WAS                    GFC WA 44180000
                                        WAITING FOR AN I/O INTERRUPT                 GFC WA 44200000
TWABUMP NULL                                                                         GFC WA 44220000
        BXLE   R7,R2,TWAITLOP           ANY MORE ENTRIES BR IF YES                   GFC WA 44240000
        LR     R0,R12                   NO, RESTORE TIME IN R0                       GFC WA 44260000
        BR     R15                      RETURN
    TITLE 'OS EXTENTIONS                      SUB - CHANNEL INDEX COMPUTE'               44280000
        SPACE 5                                                                          44300000
                                                                                         44320000
*****                                                                                    44340000
*                                                                                        44360000
*          CHANNEL INDEX COMPUTING SUBROUTINE                                            44380000
*                                                                                        44400000
*****                                                                                    44420000
        SPACE 5                                                                          44440000
TCHAINDX DS    0H                                                                        44460000
        LTR    R9,R9 .                  CHAN 0                                           44480000
        BNZ    TSHIFT .                 NO, BR TO SHIFT                                  44500000
        CLI    IOPSW0+3,X'C0' .         IS IT A SEL-SUB-CHAN                             44520000
        BCR    4,R8 .                   NO, RETURN                                       44540000
        IC     R9,IOPSW0+3 .            GET SEL-SUB ADDR                                 44560000
        SRL    R9,4 .                   SHIFT OUT UNIT ADDR                              44580000
        AL     R9,QSELSUBI .            CONVERT TO SEL-SUB INDEX                         44600000
TSHIFT  DS     0H .                                                                      44620000
        SLL    R9,2 .                   MULT BY 4                                        44640000
        BR     R8 .                     RETURN
    TITLE 'QCM OS EXTENTIONS           SUB - MPX CHAN OVERLAP'                           44660000
        SPACE 5                                                                          44680000
                                                                                         44700000
****                                                                                     44720000
*                                                                                        44740000
*          MULTIPLEXOR CHANNEL OVERLAP PROCESSOR. WHEN A                                 44760000
*          SELECTOR CHANNEL IS DEFINED THE OVERLAP WILL BE THAT                          44780000
*          CAUSED BY CONCURRENT SEEKS                                                    44800000
*                                                                                        44820000
****                                                                                     44840000
        SPACE 5                                                                          44850200
TMPXRES DS     0H .                     RESET ENTRY                                      44850400
        XC     TSTATE,TSTATE .          SET STATE ADDER TO ZERO                          44850600
        LR     R3,R2 .                  GET CHANNEL                                      44850800
        S      R3,TMINUS1 .                     ADDER INTO R3                            44851000
        B      TMPXTEST .               BR TO MPX TEST                                   44851200
        SPACE 5                                                                          44860000
TMPXSIO DS     0H .                     START I/O ENTRY                                  44880000
        MVC    TSTATE,TPLUS1 .          SET STATE ADDER TO +1
```

```
              LR      R3,R6 .              LOAD INIT ADDR INTO WORK REG      44900000
              SRL     R3,8 .               SHIFT OUT ALL BUT CHAN ADDRESS    44920000
              B       TMPXTEST .           BR TO MPX TEST                    44940000
              SPACE   2                                                      44960000
TMPXDE        DS      0H .                 DEVICE END INTERRUPT ENTRY        44980000
              MVC     TSTATE,TMINUS1 .     SET STATE ADDER TO -1             45000000
              SR      R3,R3 .              GET CHANNEL                       45020000
              IC      R3,IOPSW0+2 .           ADDR INTO R3                   45040000
              SPACE   2 .                                                    45060000
TMPXTEST      DS      0H .                                                   45080000
              IC      R3,OMPXTEST(R3) .    GET MPX INDEX BYTE                45100000
              LTR     R3,R3 .              IS IT A MPX CHANNEL               45120000
              BCR     8,R8 .               NO, RETURN                        45140000
              SLL     R2,2 .               YES, LOAD                         45160000
              AL      R3,SPIMPXA .            MPXDSECT BASE REG              45180000
              USING   MPXDSECT,R3 .                                          45200000
              LR      R9,R0 .              LOAD TIME INTO WORK REG           45220000
              SL      R9,MPXCLOCK .        COMPUTE STATE DELTA               45240000
              BNM     TOK6 .               BR IF DELTA NOT MINUS (OK)        45260000
              C       R9,TNEGCLK .         DID THE CLOCK RUN BACKWARDS       45280000
              BL      TADDSIX .            NO, BR                            45300000
              B       * .                  YES, DIE DIE DIE                  45320000
TADDSIX       DS      0H .                                                   45340000
              A       R9,Q6HPS .           CORRECT SIX HOUR PSEUDO CLOCK     45360000
TOK6          DS      0H .                                                   45380000
              LH      R15,MPXSTATE .       LOAD CURRENT STATE                45400000
              CH      R15,MPXMAX .         IS OVERLAP HIGHER THAN MAX        45420000
              BNH     TSTGOOD .            NO, BR                            45440000
              LH      R15,MPXMAX .         YES, LOAD MAX                     45460000
TSTGOOD       DS      0H .                                                   45480000
              SLL     R15,2 .              COMPUTE BYTE OFFSET               45500000
              AL      R9,MPXTIMES(R15) .   UPDATE STATE                      45520000
              ST      R9,MPXTIMES(R15) .      OVERLAP TIME                   45540000
              LH      R9,MPXSTATE .        UPDATE                            45560000
              A       R9,TSTATE .             OVER-                          45580000
              BM      TSCLOCK                    LAP                         45600000
              STH     R9,MPXSTATE .              STATE                       45620000
TSCLOCK       DS      0H .                                                   45640000
              ST      R0,MPXCLOCK .        UPDATE STATE CLOCK                45660000
              BR      R6 .                 RETURN                            45680000

TITLE 'O S  E X T E N T I O N S                  CONSTANTS' GFC TM 45700000
         SPACE 5                                                 GFC TM 45720000
TDEVPCE   DC    F'0'                                             GFC TM 45740000
TDEVTTT   DC    F'0'                                             GFC TM 45760000
TDEVTIME  DC    F'0'                                             GFC TM 45780000
TDEVSTAT  DC    F'0'                                             GFC TM 45800000
TQCMTBLE  DC    A(QTABLE)                                        GFC TM 45820000
TPCENEW   DC    F'0'                                             GFC TM 45840000
TTTNEW    DC    F'0'                                             GFC TM 45860000
TIMENEW   DC    F'0'                                             GFC TM 45880000
TIMEOLD   DC    F'0'                                             GFC TM 45900000
TPCEOLD   DC    F'0'                                             GFC TM 45920000
TTTOLD    DC    F'0'                                             GFC TM 45940000
TR11SAVE  DC    F'0' .                                                  45960000
TREGSAVE  DC    F'0'                                             GFC TM 45980000
TSAVR0R6  DC    15F'0'                                           GFC TM 46000000
TMOUNT    DC    C'MOUNT   '                                      016 TM 46020000
TMASTER   DC    C'MASTER  '                                      013 TM 46040000
TSTARTIN  DC    C'STARTING'                                      GFC TM 46060000
TOCMLOGI  DC    A(OCMLOGIC)                                      GFC TM 46080000
TINTIME   DC    F'0'                                             GFC TM 46100000
TABENDSA  DC    16F'0'                    ABEND SAVE AREA        GFC TM 46120000
TABENDCC  DC    0F'0',X'40000000'         NO DUMP SYS CC=000     GFC TM 46140000
TNEGCLK   DC    F'-10000'                                        GFC TM 46160000
TIONPSW   DC    0D'0',X'00040000'                                GFC IN 46180000
TIUNPSWA  DC    A(0)                                             GFC IN 46200000
TDEVMASK  DC    F'15'                     ZEROES ALL BUT LAST DIGIT  GFC TM 46220000
TCUMASK   DC    F'255'                    ZERO ALL BUT THE LAST BYTE GFC TM 46240000
TENTRYLN  DC    Y(CULEN)                  LENGTH OF CU ENTRY     GFC TM 46260000
TIOWAIT   DC    X'00'                                            GFC TM 46280000
TEN       DC    F'10' .                                                 46300000
TSTATE    DC    F'0' .                    STATE CONSTANT                46320000
TPLUS1    DC    F'1'                                                    46340000
TMINUS1   DC    F'-1'                                                   46360000
```

```
            AIF    ('COMMON' EQ 'NO').NOENQCD .                       46380000
     TITLE 'O S  E X T E N T I O N S           I/O REQUEST QUEUING'    46400000
            SPACE 5                                                    46420000
     ****************************************************************  46440000
     *                                                              *  46460000
     *      THIS SECTION IS AN EXTENSION TO THE OS PRIORITY         *  46480000
     *      ENQUEUE ROUTINE. QCM INIT PATCHES THE NUCLEUS           *  46500000
     *      TO COME HERE WHEN AN I/O REQUEST IS PRIORITY QUEUED.    *  46520000
     *      THIS OS HOOK ALLOWS QCM TO INDEPENDENTLY CONTROL        *  46540000
     *      THE I/O PRIORITY OF MONITORED TASKS. THE I/O FOR        *  46560000
     *      UNMONITORED TASKS IS QUEUED THE NORMAL OS PRIORITY      *  46580000
     *      MANNER.                                                 *  46600000
     *                                                              *  46620000
     *      ENTRY IS ON LNKRG3 = R12                                *  46640000
     *                                                              *  46660000
     *      EXIT   IS ON LNKRG2 = R14       OR TO XCPENQ1 IN OS     *  46680000
     *                                                              *  46700000
     ****************************************************************  46720000
            SPACE 5                                                    46740000
     *                                    OS EQUS                      46760000
     TSTLNK  EQU    0                                                  46780000
     XCPENQ1 EQU    0                     EQU TO PREVENT ASSEMBLY ERROR 46800000
     WKREG1  EQU    10                                                 46820000
     WKREG2  EQU    11                                                 46940000
     LNKRG2  EQU    14                                                 46960000
     LNKRG3  EQU    12                                                 46980000
     *                                                                 46900000
     *                                                                 46920000
     *          QCM INIT MOVES IN THE NEXT 4 NUCLEUS INSTRUCTIONS       46940000
     *                                                                 46960000
     *                                                                 46980000
     XCPPRQ1 DS     0H                                                 47000000
             LR     WKREG2,WKREG1         SAVE BACK-UP                 47020000
             LH     WKREG1,TSTLNK(0,WKREG2) ADVANCE TO NEW RQE         47040000
             LTR    WKREG1,WKREG1         TEST FOR DUMMY               47060000
             BC     4,XCPENQ1             TO NORMAL ENQUEUE            47080000
             SPACE 5                                                   47100000
             USING XCPPRQ1,LNKRG3         GET ADDR TO LOCAL CODE       47120000
             CLC    RQEPR(1,TSTREG),RQEPR(WKREG1) COMPARE OS PRTYS     47140000
             BL     XCPPRQ1               NEW RQE LOW GET NEXT RQE     47160000
             BH     XINSEPT NEW RQE HIGH INSEPT IN CHAIN               47180000
             CLC    RQEPR(1,TSTREG),XMONPRTY IS I/O FOR MONITORED TCB  47200000
             BNE    XCPPRQ1               NO, GET NEXT RQE             47220000
             STM    WKREG1,WKREG2,XSAVE SAVE WORK REGS FOR I/O PRTY TST 47240000
             AIF    ('&SYS' EQ 'MFT').MFTRQE3 .                        47260000
             L      WKREG2,RQETCB(,TSTREG) LOAD TCB FOR I/O            47280000
     .MFTRQE3 AIF   ('&SYS' EQ 'MVT').MVTRQE3 .                        47300000
             L      WKREG2,16             LOAD ADDR OF THE             47320000
             L      WKREG2,CVTHEAD(,WKREG2) FIRST TCB                  47340000
     XRQETCB3 DS    0H .                                               47360000
             L      WKREG2,TCBTCB(,WKREG2) DOWN ONE TCB                47380000
             CLC    TCBIDF(1,WKREG2),RQEID(TSTREG) IS RQE FOR THIS TCB 47400000
             BNE    XRQETCB3 .            NO, CONTINUE SEARCH          47420000
     .MVTRQE3 ANOP .                                                   47440000
             L      WKREG2,TCBUSER(,WKREG2) LOAD PCE/TTT PTR           47460000
             LTR    WKREG2,WKREG2         VALID                        47480000
             BZ     XCPPRQ1               NO, GET NEXT RQE             47500000
             L      WKREG2,MTTTTT(,WKREG2) GET TTT PTR                 47520000
             LTR    WKREG2,WKREG2         VALID                        47540000
             BZ     XCPPRQ1               NO, GET NEST RQE             47560000
             CLI    MTTIOPR(WKREG2),0                                  47580000
             BE     XCPPRQ1                                            47600000
             AIF    ('&SYS' EQ 'MFT').MFTRQE4 .                        47620000
             L      WKREG1,RQETCB(,WKREG1) GET TCB PTR                 47640000
     .MFTRQE4 AIF   ('&SYS' EQ 'MVT').MVTRQE4 .                        47660000
             MVC    XTCBIDF,RQEID(WKREG1) SAVE TCB ID                  47680000
             L      WKREG1,16 .           LOAD ADDR OF THE             47700000
             L      WKREG1,CVTHEAD(,WKREG1) FIRST TCB                  47720000
     XRQETCB4 DS    0H .                                               47740000
             L      WKREG1,TCBTCB(,WKREG1) DOWN ONE TCB                47760000
             CLC    TCBIDF(1,WKREG1),XTCBIDF IS RQE FOR THIS TCB       47780000
             BNE    XRQETCB4 .            NO, CONTINUE SEARCH          47800000
     .MVTRQE4 ANOP .                                                   47820000
             L      WKREG1,TCBUSER(,WKREG1) GET PCE/TTT PTR            47840000
             LTR    WKREG1,WKREG1         VALID                        47860000
```

```
            BZ      XLMWKREG                 NO, LM AND BR                47880000
            L       WKREG1,MTTTTT(,WKREG1)   GET TTT PTP                  47900000
            LTR     WKREG1,WKREG1            VALID                        47920000
            BZ      XLMWKREG                 NO, LM AND BR                47940000
            CLC     MTTIOPR(1,WKREG2),MTTIOPR(WKREG1) COMPARE QCM PRTY    47960000
            LM      WKREG1,WKREG2,XSAVE      RESTORE WORK REGS TO RQE PTRS 47980000
            BNH     XCPPRQ1                  NOT HIGH BR TO GET NEXT RQE  48000000
            B       XINSERT                  HGIH, INSERT IN Q            48020000
XLMWKREG    DS      0H                                                    48040000
            LM      WKREG1,WKREG2,XSAVE      RESTORE WORK REGS TO RQE PTRS 48060000
XINSERT     DS      0H                                                    48080000
            MVC     TSTLNK(2,TSTREG),TSTLNK(WKREG2) INSERT IN             48100000
            STH     TSTREG,TSTLNK(,WKREG2)                                48120000
            BR      LNKRG2                   EXIT                         48140000
            SPACE   5                                                     48160000
XSAVE       DC      2F'0'                    TEMP SAVE AREA               48180000
XMONPRTY    DC      X'00'                    FILLED IN BY OCM INIT        48200000
XTCBIDF     DC      X'00' .                  SAVE AREA FOR TCBIDF         48220000
.NOENQCD    ANJP    .                                                     48240000
QCMLEND     DS      0H        * * * * E N D  O F  Q C M  M A I N L I N E  48260000
            END                                                           48280000
```

25

Having thus described the invention with the detail and particularity as required by the Patent Laws, what is desired protected by Letters Patent is set forth in the following claims.

1. A method of operating a computing system upon more than one processing program concurrently for improving total resource utilization, said computing system comprising at least one central processing unit, having a logic and main memory function and an interrupt capability, and a plurality of peripheral resources capable of functioning in parallel with the central processing unit, comprising steps for:
  (1) accumulating system utilization data for at least one processing program for at least one resource, said system utilization data comprising resource activity and/or resource degradation data;
  (2)(a) at spaced intervals interrupting the processing programs and analyzing the system utilization of at least one processing program;
  (2)(b) based on this analysis regulating resource access by assigning an individual resource access priority and/or preventing resource access altogether in an unlike manner to at least two resources for at least one processing program to increase thruput;
  (3) resuming the operation of the computing systems on the processing programs; and,
  (4) continually repeating steps (1) to (3).

2. A method according to claim 1 in which the regulation in step (2) (b) comprises regulating resource access substantially to favor the more overlapped programs, said overlapped programs being those that can use two or more resources in parallel.

3. A method according to claim 2 in which processing program resource access regulated in step (2) is determined according to the following algorithm:

if CPU activity $\geq$ the Maximum Peripheral activity $$CPU \text{ PRIORITY} = \frac{\sum_{i=1}^{n} \text{PERIPHERAL ACTIVITY}_i}{CPU \text{ ACTIVITY}},$$

where n is equal to the number of peripherals measured, where PERIPHERAL ACTIVITY$_i$ is the activity of the ith peripheral resource, and where C.P.U. ACTIVITY is the activity of the C.P.U. or if CPU activity < the Maximum Peripheral activity $$CPU \text{ PRIORITY} = n + \frac{\text{MAXIMUM PERIPHERAL ACTIVITY}}{\text{TOTAL RESOURCE ACTIVITY}},$$

where n is equal to the number of peripherals measured, where MAXIMUM PERIPHERAL ACTIVITY is the total activity on the most active peripheral resource, and where TOTAL RESOURCE ACTIVITY is the sum of all C.P.U. and all peripheral resource activities, and all PERIPHERAL RESOURCE ACCESS PRIORITIES are assigned inversely to the CPU priorities.

4. A method according to claim 1 in which during step (1) degradation activity is accumulated and assigned to programs having a preselected degradation priority and during step (2) (a) comparing degradation activity to the total resource activity and during step (2) (b) regulating the resource access of the programs having accumulated substantial degradation activity such that degradation may be reduced.

5. A method according to claim 1 in which during step (1) degradation activity is accumulated and assigned to the program having the lowest previous productivity factor calculated by the algorithm, $$\text{PRODUCTIVITY FACTOR} = \frac{\text{TOTAL RESOURCE ACTIVITY}}{\text{MAXIMUM RESOURCE ACTIVITY}}$$

where TOTAL RESOURCE ACTIVITY is the sum of CPU and all peripheral activity, where MAXIMUM RESOURCE ACTIVITY is the total activity on the most active resource and during step (2) (a) comparing the accumulated degradation activity to the total resource activity and during step (2) (b) regulating the resource access of the programs having accumulated substantial degradation activity so that the degradation is reduced.

6. A method according to claim 1 in which the regulation in step (2) (a) comprises regulating resource access substantially on an inverse need basis.

7. A method according to claim 6 in which the resource priorities are assigned in step (2)(b) according to the following algorithms:

$$\text{ACTIVE RESOURCE PRIORITY}_i = \frac{\text{TOTAL RESOURCE ACTIVITY}}{\text{RESOURCE ACTIVITY}_i}$$

where TOTAL RESOURCE ACTIVITY is the sum of CPU and all peripheral resource activity, and where RESOURCE ACTIVITY$_i$ is the activity of the ith resource, and INACTIVE RESOURCE PRIORITY = P, a large positive number.

8. A method according to claim 6 in which the resource priorities are assigned in step (2)(b) according to the following algorithms:

$$\text{ACTIVE RESOURCE PRIORITY}_i = \frac{\text{MAXIMUM RESOURCE ACTIVITY}}{\text{RESOURCE ACTIVITY}_i}$$

where MAXIMUM RESOURCE ACTIVITY is the total activity on the most active resource, and where RESOURCE ACTIVITY$_i$ is the activity on the ith resource and INACTIVE RESOURCE PRIORITY = P, a large positive number.

9. A method according to claim 1 in which during step (1) degradation activity is accumulated and in which the regulation in step (2)(b) comprises assigning resource access priorities by the following substeps for:
   A. determining if the old phase (integral number of processing intervals) is over and a new phase is to be started; if a new phase is to be started:
   B. setting all of the resource priorities to the same high value;
   C. assigning degradation priorities such that the first program is given a degradation priority equal to the resource access priorities and succeeding programs are given degradation priorities of one less than their predecessor: if a new phase is not to be started:
   D. setting the resource access priorities of all programs that have degradation activity equal to their degradation priority;
   E. decrementing degradation and resource access priorities by a number greater than the maximum number of programs that can be run in parallel by the computing system for any program that hogs a resource; and,
   F. when the substep (D) has failed to eliminate degradation and if the program's resource priority was unique during the previous interval and if its degradation activity is greater than its resource activity, stopping execution of that program for at least the next processing interval.

10. A method according to claim 1 in which the regulation of resource access during step (2) changes from one regulating embodiment to another with time.

11. A method of operating a computing system upon more than one processing program concurrently for improving total resource utilization, said computing system comprising at least one central processing unit, having a logic and main memory function and an interrupt capability, and a plurality of peripheral resources capable of functioning in parallel with the central processing unit, comprising the steps for:
   (1) accumulating system utilization data for at least two processing programs for at least one peripheral resource, said system utilization data comprising resource activity and/or resource degradation;
   (2)(a) at spaced intervals interrupting the processing programs and dynamically analyzing the program resource contention of at least two of the processing programs for at least two resources;
   (2)(b) based on this analysis regulating resource access by assigning resource access priorities and/or preventing resource access altogether for at least one processing program to increase thruput;
   (3) resuming the operation of the computing system on the processing programs; and,
   (4) continually repeating steps (1) to (3).

12. A method according to claim 11 in which resource access is regulated in step (2) (b) by selecting a subset of programs to substantially maximize the following linear function:

$$Z = PF_1 x_1 + PF_2 x_2 + \ldots PF_n x_n,$$

where PF is equal to the program productivity factor and n is equal to the number of programs executing in parallel, subject to the restrictions that no two programs can use all of the same resource during a given interval and a program is either processed or not processed.

13. A method according to claim 12 in which the regulation in step (2)(b) comprises imposing access priorities within the subsets of programs on a substantially inverse need basis.

14. A method of operating a computing system upon more than one processing program concurrently for improving total resource utilization, said computing system comprising at least one central processing unit resource, having a logic and main memory function and interrupt capability, a plurality of peripheral resources capable of functioning in parallel with the central processing unit, comprising the steps for:
   (1) accumulating system utilization data comprising data on at least one peripheral resource for at least one processing program said system utilization data comprising resource activity and/or degradation data;
   (2)(a) at spaced intervals interrupting the processing programs and dynamically analyzing the system utilization of step (1) for at least one processing program;
   (2)(b) based on this analysis regulating peripheral resource access by assigning an individual resource access priority and/or preventing resource access altogether for at least one processing program to increase thruput;
   (3) resuming the operation of the computing system on the processing programs; and,
   (4) continually repeating steps (1) to (3).

* * * * *